US012260692B2

(12) United States Patent
Cheng et al.

(10) Patent No.: US 12,260,692 B2
(45) Date of Patent: Mar. 25, 2025

(54) ARTIFICIAL INTELLIGENCE-ENABLED ACTIVITY DETECTION AND MONITORING DEVICE

(71) Applicants: Fred Tun-Jen Cheng, Los Altos Hills, CA (US); Herman Yau, Sunnyvale, CA (US)

(72) Inventors: Fred Tun-Jen Cheng, Los Altos Hills, CA (US); Herman Yau, Sunnyvale, CA (US)

( * ) Notice: Subject to any disclaimer, the term of this patent is extended or adjusted under 35 U.S.C. 154(b) by 177 days.

(21) Appl. No.: 18/190,155

(22) Filed: Mar. 27, 2023

(65) Prior Publication Data

US 2024/0071157 A1 Feb. 29, 2024

Related U.S. Application Data

(60) Provisional application No. 63/402,710, filed on Aug. 31, 2022.

(51) Int. Cl.
*G07C 9/00* (2020.01)
*G08B 13/22* (2006.01)

(52) U.S. Cl.
CPC ......... *G07C 9/00571* (2013.01); *G08B 13/22* (2013.01)

(58) Field of Classification Search
None
See application file for complete search history.

(56) References Cited

U.S. PATENT DOCUMENTS

| | | | | |
|---|---|---|---|---|
| 2019/0059725 | A1* | 2/2019 | Greiner | G16H 50/20 |
| 2020/0012883 | A1* | 1/2020 | Kuo | G08B 29/188 |
| 2022/0122361 | A1* | 4/2022 | Nadler | G06V 10/22 |

* cited by examiner

*Primary Examiner* — Thomas S McCormack
(74) *Attorney, Agent, or Firm* — Ashok Tankha

(57) ABSTRACT

An artificial intelligence (AI)-enabled device including a sensor unit, an AI analysis unit, and an action execution unit, for detecting and monitoring objects and their activities within an operating field, is provided. The sensor unit captures multi-modal sensor data elements including sound, image, thermal, radio wave, and other environmental data associated with the objects along with timing data in the operating field. The AI analysis unit includes one or more AI analyzers that, in communication with an AI data library, receive and locally analyze each and an aggregate of the multi-modal sensor data elements. Based on the analysis, the AI analyzers distinguish between the objects detected and identified in the operating field, distinguish non-related sensor data, determine and monitor the activities of the identified objects, and generate and validate activity data from the activities. The action execution unit executes one or more actions in real time based on the validation.

20 Claims, 34 Drawing Sheets

ARTIFICIAL INTELLIGENCE-ENABLED ACTIVITY DETECTION AND MONITORING DEVICE

CROSS-REFERENCE TO RELATED APPLICATIONS

This application claims priority to and the benefit of the provisional patent application titled "A Smart Threshold Activity Sensor", application No. 63/402,710, filed in the United States Patent and Trademark Office on Aug. 31, 2022. The specification of the above referenced patent application is incorporated herein by reference in its entirety.

BACKGROUND

In many situations and applications such as surveillance, security, and tracking applications, there is a need for monitoring objects, for example, humans such as babies, children, patients, elderly persons, etc., animals such as pets, vehicles, pedestrians, etc., within an area and performing actions based on activities of the objects. For example, a caregiver may need to know where an infant, a pet, or an elderly person is at all times, whether they had a fall or are injured, whether they entered, exited, or passed by a door or any threshold, whether the door is unlocked or locked, etc. Conventional monitoring devices, for example, surveillance cameras, internet protocol (IP) cameras, sound detection devices, etc., perform singularly defined functions, independent of each other. Some of these monitoring devices capture and analyze sensor data, for example, images, thermal data, videos, soundbites, etc., to detect objects and patterns using simple image or pattern recognition techniques that result in low detection accuracy and high false detection rates. Many of these monitoring devices also fail to distinguish between objects having similar characteristics. Some of these monitoring devices generate alarms or send notifications to a central server to notify a remote user when particular conditions are met. Furthermore, some of these monitoring devices send the captured sensor data to a server system, for example, an online server, for further analytical processing to enhance detection accuracy. The server system then determines whether to send out alerts or pre-decided notifications or execute actions after the results of the analytical processing are obtained. Integrating and maintaining a series of different sound, image, thermal, and video detection devices into a single monitoring system is complicated and tedious. Most efforts to integrate these detection devices result in unreliable and false object detection as non-related sensor data, for example, soundbites coming from outside the monitoring area, false images detected due to moving sunlight, etc., distort, hinder, and substantially impact the analytical processing, resulting in false alarms. Moreover, when a real detection is made, sending notifications through the central server delays the action or notification time due to intermediate communication from an edge device to the central server and then from the central server to a user device. This delayed action or notification time is problematic and may have adverse effects in applications that require real-time responses. Furthermore, having image data transmitted to a remote central server may cause concerns or violate personal privacy rights in a consumer application. Furthermore, most conventional monitoring devices have high power requirements, thereby rendering these devices impractical.

Hence, there is a long-felt need for a compact, artificial intelligence (AI)-enabled device comprising multiple integrated multi-modal sensors and AI analyzers in a single unit that utilizes AI techniques for detecting, validating, and monitoring objects and their activities within an operating field of the AI-enabled device with improved accuracy, while executing actions in real time, reducing false alarms, maintaining privacy, and reducing power consumption.

SUMMARY OF THE INVENTION

This summary is provided to introduce a selection of concepts in a simplified form that are further disclosed in the detailed description of the invention. This summary is not intended to determine the scope of the claimed subject matter.

The device disclosed herein addresses the above-recited need for a compact, artificial intelligence (AI)-enabled device comprising multiple integrated multi-modal sensors and AI analyzers in a single unit that utilizes AI techniques for detecting, validating, and monitoring objects and their activities within an operating field of the AI-enabled device with improved accuracy, while executing actions in real time, reducing false alarms, maintaining privacy, and reducing power consumption. The AI-enabled device disclosed herein comprises a sensor unit, an AI analysis unit, and an action execution unit. The sensor unit is configured to operate in a substantially low power mode. The sensor unit comprises an array of sensors configured to capture multi-modal sensor data elements. The array of sensors of the sensor unit comprises, for example, sound sensors with an array of microphones, image sensors, motion sensors, environmental sensors, etc. The multi-modal sensor data elements comprise, for example, sound data, image data, and environmental data associated with objects along with timing data in the operating field of the AI-enabled device. The environmental data comprises, for example, thermal data, radio wave data, and other radiation data. The AI analysis unit is operably coupled to the sensor unit. The AI analysis unit comprises at least one processor, a memory unit, one or more databases, and one or more of multiple AI analyzers. The memory unit is operably and communicatively coupled to the processor(s) and is configured to store computer program instructions executable by the processor(s). The database(s) is configured to store an AI data library comprising multiple select datasets for facilitating an AI-based analysis of the multi-modal sensor data elements.

The AI analyzers are built into the AI analysis unit. One or more of the AI analyzers, in operable communication with the AI data library, are configured to receive and locally analyze each and an aggregate of the multi-modal sensor data elements captured by the sensor unit. In an embodiment, the AI analyzers comprise a sound analyzer, an image analyzer, and an environment analyzer. The sound analyzer is configured to receive and analyze the sound data captured by one or more of the microphones for identifying a type of a sound and a location of a source of the sound and excluding non-related sound data coming from outside and/or inside the operating field of the AI-enabled device. The sound analyzer is further configured to communicate with the image sensors to validate the analyzed sound data using the image data along with the timing data. The image analyzer is configured to receive and analyze the image data comprising, for example, still image data, moving image data, and thermal image data captured by the image sensor(s), and exclude non-related image data. In an embodiment, the AI-enabled device further comprises a full high-definition (HD) imager operably coupled to the AI analysis unit. The full HD imager is configured to capture one or more HD images of the detected objects, in communication with one or more of the image sensors of the sensor unit, for improved analysis of the image data by the image analyzer. The environment analyzer is configured to receive and analyze the environmental data comprising, for example, the thermal data, the radio wave data, and the other radiation data captured by the environmental sensor(s), and exclude non-related environmental data coming from outside the operating field of the AI-enabled device. Based on the analysis of each and the aggregate of the multi-modal sensor data elements, the AI analyzers detect and identify the objects in the operating field of the AI-enabled device; distinguish between the identified objects; distinguish non-related sensor data; determine and monitor activities of the identified objects; and generate and validate activity data from the determined activities. The activity data comprises, for example, a type of a sound, a location of a source of the sound, type of each of the objects, location of each of the objects, trajectory and speed of movement and travel of each of the objects, etc. In an embodiment, the AI analysis unit further comprises a wake-up module in operable communication with a power management module built into the AI analysis unit. The wake-up module is configured to wake up the AI analysis unit from a sleep mode on detection of incoming objects by the sensor unit. The AI analysis unit is maintained in the sleep mode until awoken by the wake-up module.

The action execution unit is operably coupled to the AI analysis unit. The action execution unit is configured to execute one or more of multiple actions in real time based on the validation of the activity data. The actions comprise, for example, controlling a lock mechanism of an external member, for example, a door, to which the AI-enabled device is attached, to change a state of the external member; transmitting a notification to an electronic device via a network; activating one or more light indicators operably coupled to the AI-enabled device; and sounding an alarm operably coupled to the AI-enabled device. In an embodiment, one or more of the AI analyzers preclude the execution of the action(s) and return the AI analysis unit to the sleep mode if the activity data is invalid. In an embodiment, the AI-enabled device is configured to be remotely controlled to execute one or more of the actions. In another embodiment, the AI-enabled device is configured to be programmatically controlled to execute one or more of the actions.

In an embodiment, the AI analysis unit further comprises one or more input ports and output ports. The output ports are operably connected to multiple output devices for the execution of the actions based on the validation of the activity data. The output devices comprise, for example, a speaker configured to emit an audio output, a control lock mechanism configured to lock and unlock an external member, for example, a door, and one or more light indicators configured to emit light indications.

In an embodiment, the AI analysis unit further comprises a communication module configured to communicate with an electronic device, for example, a client device, a server, a networking device, a network of servers, a cloud server, etc., via a network. The communication module is operably coupled to an antenna configured to communicate the activity data to the electronic device via the network. In an embodiment, the communication module is configured to selectively communicate the activity data to the electronic device via the network to maintain privacy. In another embodiment, the communication module is configured to selectively communicate the activity data to a mobile application deployed on the electronic device of a predetermined, authorized user via the network to maintain privacy. The mobile application is configured to compile the activity data along with physiological data, for example, vital signs data, of the identified objects and generate a timed data chart.

In an embodiment, the AI-enabled device is configured to be positioned on or proximal to a barrier, for example, a door, for detecting, recognizing, monitoring, and reporting a state of the barrier and the objects entering, exiting, and passing by the barrier. In this embodiment, the AI-enabled device is operably coupled to a lock mechanism of the barrier and configured to activate and deactivate the lock mechanism for locking and unlocking the barrier, respectively, based on the state of the barrier.

Disclosed herein is also an AI-enabled device operably coupled to a locking assembly positioned on or proximal to a barrier, for example, a door, for detecting and monitoring a state of the barrier and objects and their activities within an operating field of the AI-enabled device. The AI-enabled device comprises the sensor unit and the AI analysis unit as disclosed above. Based on the analysis of each and an aggregate of multi-modal sensor data elements captured by one or more of the sensors of the sensor unit, one or more of the AI analyzers of the AI analysis unit detect and identify objects entering, exiting, and passing by the barrier, in the operating field of the AI-enabled device; distinguish between the identified objects; distinguish non-related sensor data; determine and monitor the state of the barrier and activities of the identified objects; and validate the determined state of the barrier and the determined activities. On successful validation, one or more of the AI analyzers trigger a command to activate and deactivate a lock mechanism of the locking assembly for locking and unlocking the barrier, respectively, based on the state of the barrier.

In one or more embodiments, related systems comprise circuitry and/or programming for executing the methods disclosed herein. The circuitry and/or programming comprise one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific components, structures, and methods disclosed herein. The description of a component, or a structure, or a method step referenced by a numeral in a drawing is applicable to the description of that component, or structure, or method step shown by that same numeral in any subsequent drawing herein.

DETAILED DESCRIPTION OF THE INVENTION

Various aspects of the disclosure herein are embodied as a device, a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "device", a "system", a "module", a "circuit", or a "unit".

Figure 1:
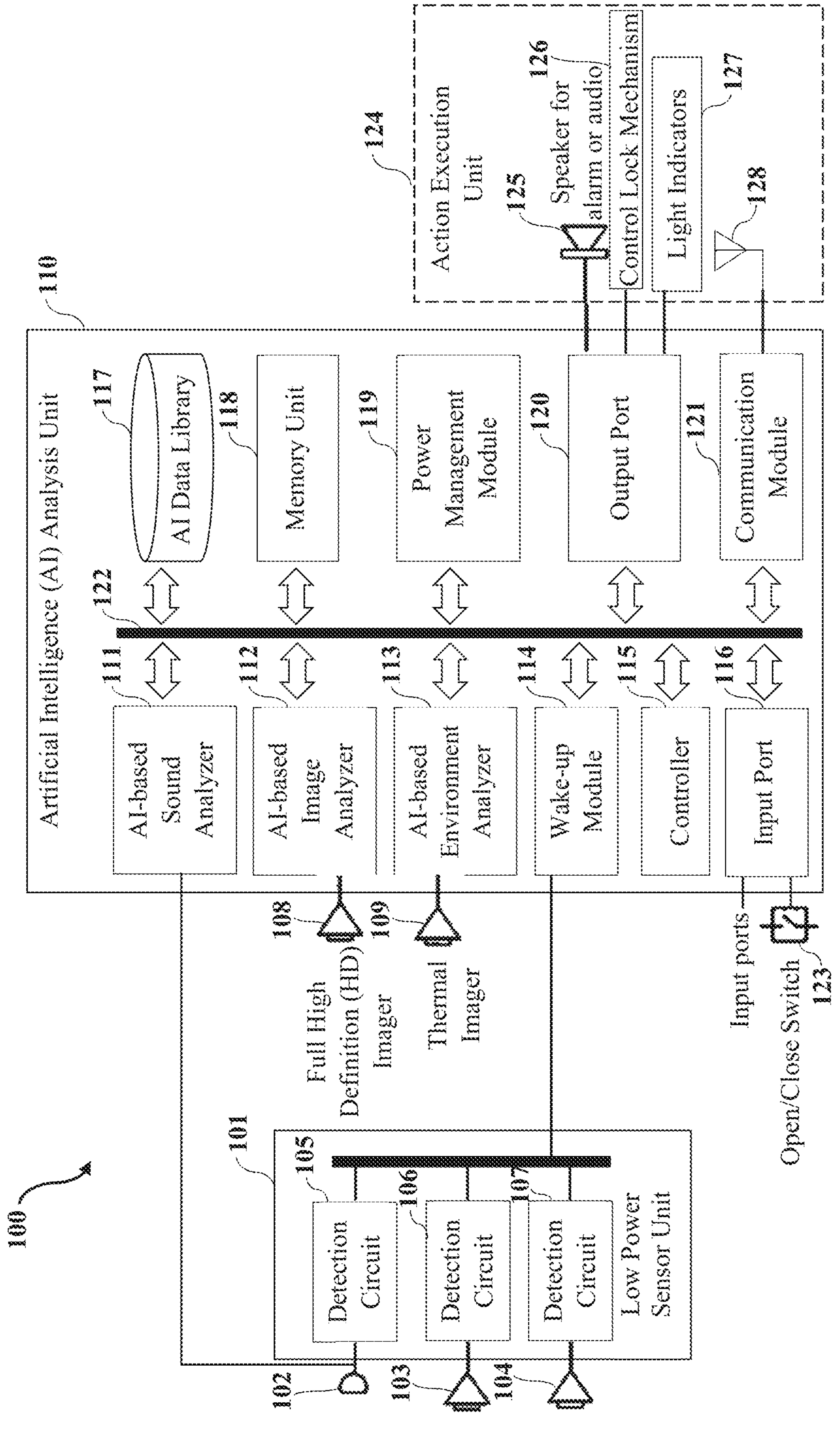
FIG. 1 illustrates a block diagram of an embodiment of an artificial intelligence (AI)-enabled activity detection and monitoring device.

FIG. 1 illustrates a block diagram of an embodiment of an artificial intelligence (AI)-enabled activity detection and monitoring device 100, herein referred to as the AI-enabled device 100. The AI-enabled device 100 detects and monitors objects and their activities within an operating field. As used herein, the term "object" refers to any element of interest, for example, a human such as a baby, a child, an elderly person, a patient, etc., an animal such as a pet, a thing such as a vehicle, etc., that enters, exits, or passes by a threshold or any area, and/or performs activities in the operating field of the AI-enabled device 100. Also, as used herein, "operating field" refers to a predetermined area around or within which the AI-enabled device 100 operates for detecting and monitoring objects and their activities. The AI-enabled device 100 incorporates multiple sensing technologies, for example, image, sound, thermal, and radio wave sensing technologies. In an embodiment, the AI-enabled device 100 is configured as a sound, image, thermal, and radio wave interactive device to check an environmental status of a location where the AI-enabled device 100 is placed. The AI-enabled device 100 captures sensor data comprising, for example, sound, standard image, thermal image, video, and radio wave data, and utilizes AI techniques to analyze the sensor data with improved and reliable detection and analytical accuracy.

In an embodiment, to save operating power, majority of the AI-enabled device 100 is maintained in a sleep mode during device operation. The sleep mode of the AI-enabled device 100 is a power-saving mode of operation in which parts or an entirety of the AI-enabled device 100 are switched off until needed. The AI-enabled device 100 is configured to be woken up when a sensor data signal, for example, a sound, radio wave/radar, thermal, and/or image signal, is detected by sensors operating in an extreme low power mode in the AI-enabled device 100. As majority of the AI-enabled device 100 is maintained in the sleep mode during the operation, the overall power consumption of the AI-enabled device 100 is low. The operating life of a power source of the AI-enabled device 100, for example, a battery, is extendable to a further length of time, thereby rendering the AI-enabled device 100 suitable for use in portable power applications. When the AI-enabled device 100 is woken up, related AI analyzers, for example, an AI-based sound analyzer 111, an AI-based image analyzer 112, and an AI-based environment analyzer 113, that are built into the AI-enabled device 100, analyze the captured sensor data, for example, soundbites, images, and/or thermal data. Furthermore, when the AI-enabled device 100 is woken up, the AI-enabled device 100 follows object and activity detection procedures and protocols to send notifications or execute actions if the object and activity detection is valid and true. If the object and activity detection is invalid, no notification or action is performed and the AI-enabled device 100 returns to the sleep mode to save operating power.

In an embodiment as illustrated in FIG. 1, the AI-enabled device 100 disclosed herein comprises a sensor unit 101, an AI analysis unit 110, and an action execution unit 124. The sensor unit 101 is configured to operate in a substantially low power mode, thereby extending the life of the power source of the AI-enabled device 100. The sensor unit 101 comprises an array of sensors configured to capture multi-modal sensor data elements. As used herein, "multi-modal sensor data elements" refer to data elements of different modes or modalities, for example, audio, image, thermal, video, radio waves, etc., captured by different sensors integrated in the sensor unit 101. The multi-modal sensor data elements comprise, for example, sound data, image data, and environmental data associated with objects along with timing data in the operating field of the AI-enabled device 100. The environmental data comprises, for example, thermal data, radio wave data, and other radiation data. The sensors generate output electrical signals corresponding to variations in input levels. The array of sensors of the sensor unit 101 comprises, for example, sound sensors with an array of microphones, image sensors, motion sensors, environmental sensors, etc. The environmental sensors comprise, for example, temperature sensors, pressure sensors, radiation sensors such as radio wave sensors or radio detection and ranging (radar) sensors, etc. In an exemplary implementation illustrated in FIG. 1, the sensors comprise a sound sensor with a microphone 102, an image sensor 103 such as a low power quarter video graphics array (QVGA) imager, and a low power radio wave sensor 104. The sensor unit 101 further comprises detection circuits 105, 106, and 107 of the sensors 102, 103, and 104, respectively. The microphone 102 operates as a transducer and is connected to the detection circuit 105. The detection circuit 105 of the sound sensor comprises, for example, a potentiometer to adjust intensity, a low power audio amplifier, and other passive components such as resistors and capacitors. The detection circuit 105 of the sound sensor converts vibrations into audio signals in the form of voltage or current using the microphone 102. The microphone 102 comprises an inbuilt diaphragm made of magnets coiled by a metal wire. When sound waves hit the diaphragm, the magnets vibrate and simultaneously, the coil induces a current.

The detection circuit 106 of the image sensor 103 detects light or other electromagnetic radiation waves and converts variable attenuations of the waves into signals, for example, bursts of current, that convey information used to create an image. In an embodiment, the image sensor 103 comprises one or more still/motion daylight, infrared (IR), ultraviolet (UV), or other spectrum cameras. The detection circuit 106 of the image sensor 103 comprises, for example, light sensitive elements, micro lenses, color filters, photodiodes, transistors, etc. The detection circuit 107 of the low power radio wave sensor 104 detects the presence, location, movement, and direction of travel of an object and measures distance of the object from the AI-enabled device 100. In an embodiment, the detection circuit 107 of the low power radio wave sensor 104 comprises a built-in antenna, a radio circuit, an analog-to-digital converter (ADC), and a range calculation circuit. In an embodiment, the detection circuit 107 detects a moving object using a radio frequency signal, for example, a Wi-Fi® radio signal, and then wakes up the AI analysis unit 110, which uses a full high-definition (HD) imager 108 to capture an image of the detected moving object for further analysis. In an embodiment, the full HD imager 108 of the AI-enabled device 100 is operably coupled to the AI-based image analyzer 112 of the AI analysis unit 110 as disclosed below. When there is no movement in a space filled with a radio signal, the environment in the space is stable and reaches a normal steady state. When an object moves around the space, the object disturbs the radio signal in the space and causes a multipath radio propagation in the steady state radio signal. The detection circuit 107 captures the different signal levels of the radio signal caused by the moving object and then generates a signal to wake up the AI analysis unit 110. In an embodiment, the detection circuit 107 is a low power Wi-Fi®-enabled device configured to implement a Wi-Fi® sensing protocol, for example, the Institute of Electrical and Electronics Engineers (IEEE) 802.11bf protocol, and serve as a low power radio wave detection tool. The detection circuit 107 is configured to perform wireless local area network (WLAN) sensing. WLAN sensing uses Wi-Fi® signals to perform sensing functions by exploiting prevalent Wi-Fi® infrastructures and ubiquitous Wi-Fi® signals over surrounding environments. Wi-Fi® radio waves bounce, penetrate, and bend on the surface of objects during their propagation. By executing proper signal processing, the detection circuit 107 harnesses the received Wi-Fi® signals to sense surrounding environments, detect objects and obstructions, and interpret target movement.

The AI analysis unit 110 is operably coupled to the sensor unit 101. The AI analysis unit 110 comprises at least one controller 115, a non-transitory, computer-readable storage medium such as a memory unit 118, one or more databases 117, and one or more of multiple AI analyzers 111, 112, and 113. As used herein, "non-transitory, computer-readable storage medium" refers to all computer-readable media that contain and store computer programs and data. Examples of the computer-readable media comprise storage memory, hard drives, solid state drives, optical discs or magnetic disks, memory chips, a static storage device such as a read-only memory (ROM), a register memory, a processor cache, a dynamic storage device such as a random-access memory (RAM), etc. The memory unit 118 is configured as a storage memory to store computer program instructions executable by the controller 115. The memory unit 118 is operably and communicatively coupled to the controller 115 via an internal bus 122 as illustrated in FIG. 1. The memory unit 118 records, stores, and reproduces data, computer program instructions, and applications. In an embodiment, the memory unit 118 serves as a read and write internal memory and provides storage for information and computer program instructions executable by the controller 115. The memory unit 118 also stores temporary variables and other intermediate information used during execution of the computer program instructions by the controller 115. In another embodiment, the memory unit 118 stores firmware, static information, and computer program instructions for execution by the controller 115. In an embodiment, the memory unit 118 is also configured to store results of analyses performed by the AI analyzers 111, 112, and 113.

In an embodiment, the controller 115 is configured to execute computer program instructions defined by the AI analyzers 111, 112, and 113. The AI analyzers 111, 112, and 113, when loaded into the memory unit 118 and executed by the controller 115, transform the AI analysis unit 110 into a specially-programmed, special purpose computing device configured to implement the functionality disclosed herein. In an embodiment, the controller 115 is configured as a microcontroller or any other processor, for example, a microprocessor, a central processing unit (CPU) device, a finite state machine, a computer, a digital signal processor, logic, a logic device, an application specific integrated circuit (ASIC), a field-programmable gate array (FPGA), a chip, etc., or any combination thereof, capable of executing computer programs or a series of commands, instructions, or state transitions. In another embodiment, the controller 115 is implemented as a processor set comprising, for example, a programmed microprocessor and a math or graphics co-processor. In another embodiment, the controller 115 comprises a chipset that integrates a microprocessor and an interface for communicating different computer program instructions and commands to output devices, for example, 125, 126, and 127, via an output port 120 of the AI analysis unit 110.

The database(s) 117 is configured to store an AI data library comprising multiple select datasets for facilitating an AI-based analysis of the multi-modal sensor data elements. The select datasets comprise, for example, sound datasets used for analyzing the sound data; image datasets used for analyzing the image data; radio wave datasets for analyzing radio wave data; etc. In an embodiment, the database(s) 117 is configured to store different AI data libraries, where each AI data library comprises datasets for facilitating the AI-based analysis of a particular sensor data element. For example, the database(s) 117 is configured to store sound data libraries, image data libraries, and radiation and other environmental data libraries. The AI data library contains the chosen or select datasets for use by the AI analyzers 111, 112, and 113. The AI data library operates with each of the AI analyzers 111, 112, and 113 to accurately analyze and detect the captured image, soundbite, and/or radio wave patterns and to perform analysis on the aggregate multi-modal sensor data elements received from all the sensors of the sensor unit 101. The AI data library helps to reduce the false detection rate. The AI analyzers 111, 112, and 113 are built into the AI analysis unit 110. In an embodiment, the AI analyzers 111, 112, and 113 are implemented in the AI analysis unit 110 using programmed and purposeful hardware. One or more of the AI analyzers 111, 112, and 113, in operable communication with the AI data library, are configured to receive and locally analyze each and an aggregate of the multi-modal sensor data elements captured by the sensor unit 101. During the analysis, the AI analyzers 111, 112, and 113 are configured to distinguish non-related sensor data comprising, for example, non-related soundbites coming from outside and/or inside the operating field, false images detected due to moving sunlight, external moving light sources, and/or other environmental elements, etc.

In an embodiment, the AI analyzers comprise the AI-based sound analyzer 111, the AI-based image analyzer 112, and the AI-based environment analyzer 113 connected to an internal bus 122 of the AI analysis unit 110. The AI-based sound analyzer 111 is configured to receive and analyze the sound data captured by one or more of the microphones, for example, the microphone 102, for identifying a type of a sound and a location of a source of the sound and excluding non-related sound data coming from outside and/or inside the operating field of the AI-enabled device 100. In an embodiment, the AI-based sound analyzer 111 is further configured to communicate with the image sensor(s) 103 to validate the analyzed sound data using the image data along with the timing data. In an embodiment, during the analysis of the sound data, the AI-based sound analyzer 111, in communication with the AI-based image analyzer 112, distinguishes non-related soundbites from outside the operating field of the AI-enabled device 100 using a combination or an aggregate of sound data and image data captured by an array of microphones and image sensors, respectively, to prevent false alarms. Using the combination of the sound data and the image data, the AI-based sound analyzer 111, in communication with the AI-based image analyzer 112, identifies the actual sound that occurred around an area being monitored by the AI-enabled device 100. In this embodiment, the sensor unit 101 comprises devices that form a part of an array of microphones and image sensors. Each device detects the soundbites coming from its surroundings.

The AI-based sound analyzer 111 analyzes time differences of soundbites detected from among the array of microphones to identify from where the sound originates. Furthermore, when the array of image sensors detects one or more objects in a monitored area, the AI-based image analyzer 112 receives the image data of the detected objects from the array of image sensors and analyzes the image data to validate whether there is any moving object in the monitored area as disclosed in the description of FIGS. 5A-5B. Based on the localities of the soundbites and the image data derived from the array of microphones and image sensors, respectively, the AI-based sound analyzer 111, in communication with the AI-based image analyzer 112, validates whether the detected soundbites originate from the intended monitored area. If a moving object is detected in the monitored area at a particular time, the AI-based sound analyzer 111, in communication with the AI-based image analyzer 112, determines that the detected soundbites at that time may be generated by the detected object. If there is no moving object detected at that particular time, the AI-based sound analyzer 111, in communication with the AI-based image analyzer 112, determines that the detected soundbites are generated outside the monitored area and constitute non-related sound data. Using the select sound datasets from the AI data library, the AI-based sound analyzer 111 executes an AI algorithm configured to recognize relevant sound data elements from the received sound data. The relevant sound data elements comprise, for example, soundbites from a window breaking, a person falling to a floor, a person calling for help, a baby crying, a dog barking, a cat meowing, etc.

Figure 5A:
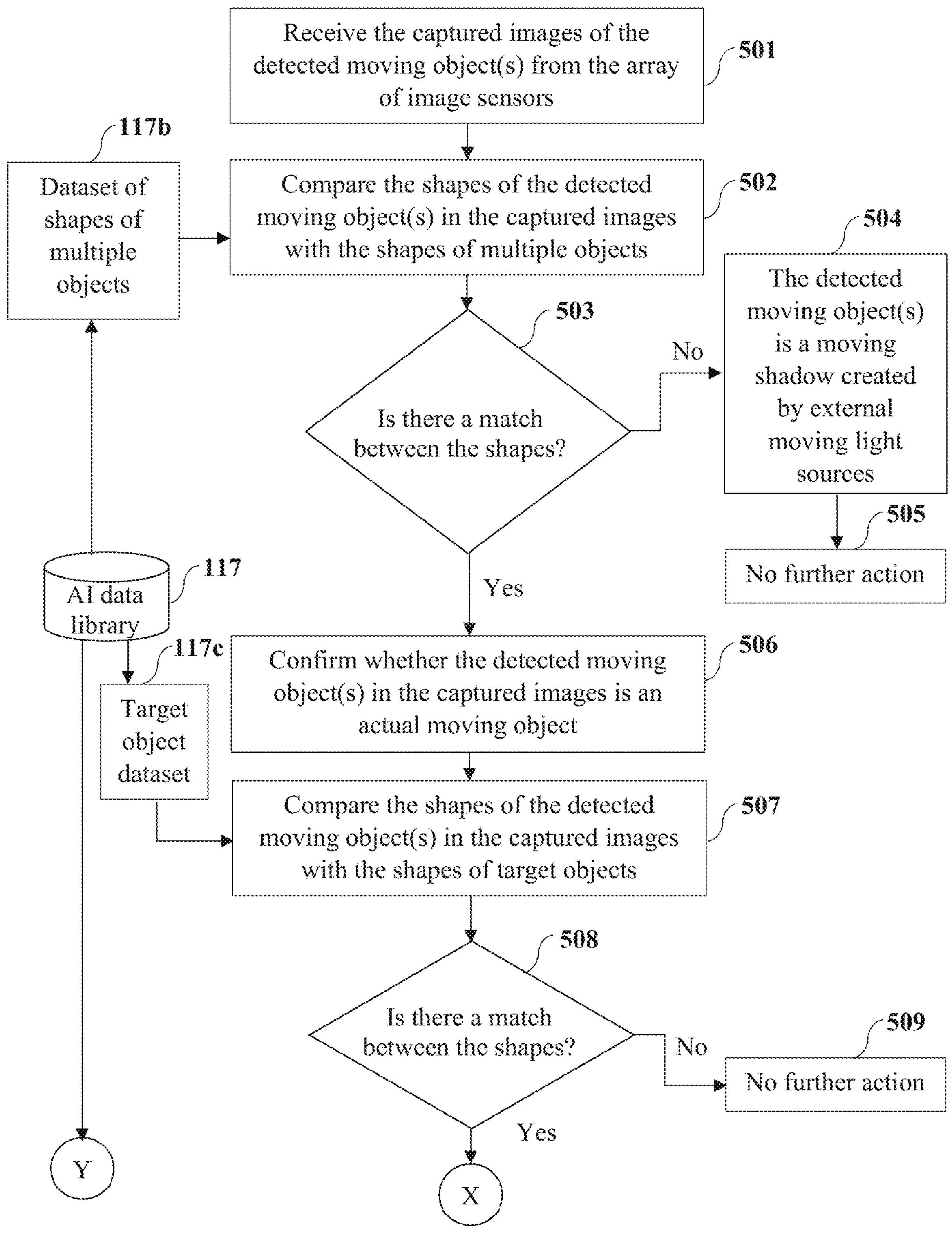
FIGS. 5A-5B illustrate a flowchart of an operation of an embodiment of an AI-enabled image analyzer of the AI-enabled activity detection and monitoring device.
Figure 5B:
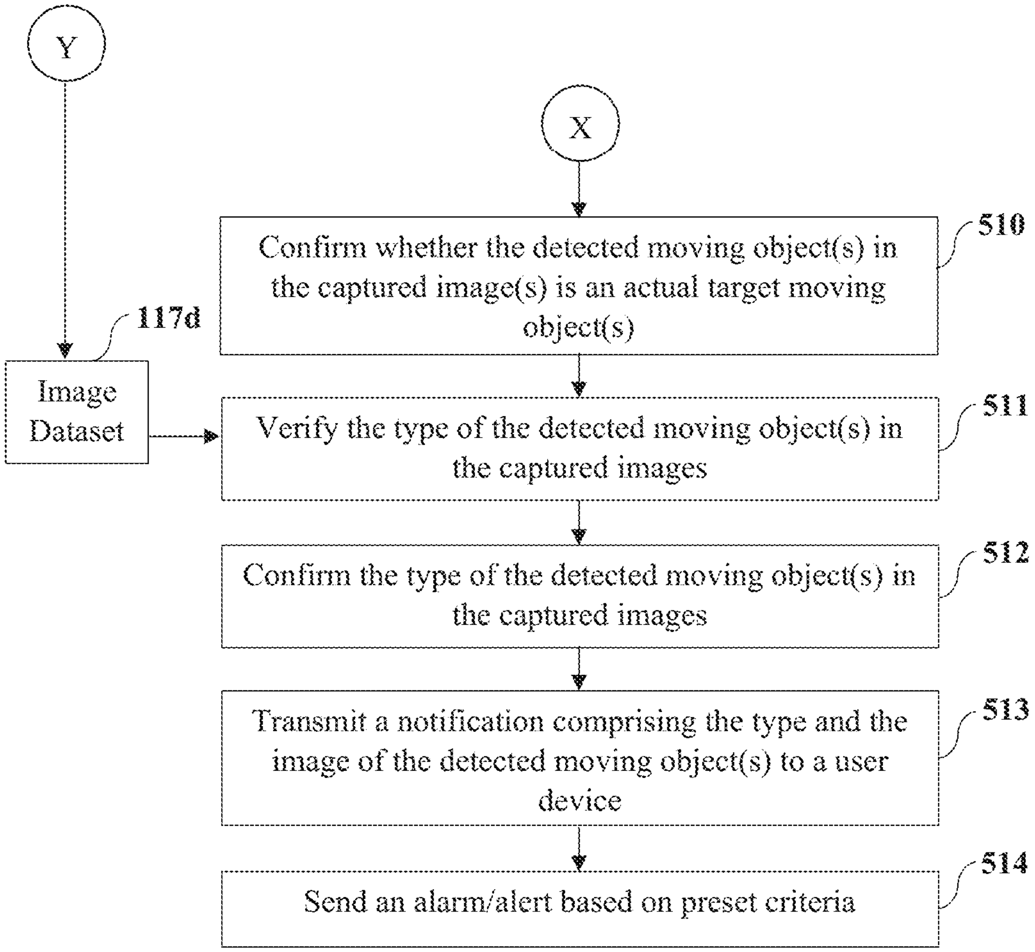

The AI-based image analyzer 112 is configured to receive and analyze the image data comprising, for example, still image data, moving image data such as video data, and thermal image data captured by the image sensor(s) 103, and exclude non-related image data as disclosed in the description of FIGS. 5A-5B. Using the select image datasets from the AI data library, the AI-based image analyzer 112 executes an AI algorithm configured to recognize relevant image data elements from the received image data. The relevant image data elements comprise, for example, images of a person, a baby, an elderly person, a male person or a female person, a dog, a cat, etc. In an embodiment, the full high-definition (HD) imager 108 of the AI-enabled device 100 is configured to capture one or more HD images of the detected objects, in communication with one or more of the image sensors 103 of the sensor unit 101, for improved analysis of the image data by the AI-based image analyzer 112. In an embodiment, the AI-based image analyzer 112 merges both a thermal image created by the image sensor(s) 103 and an HD daylight image created by the full HD imager 108 to generate a useful low-light image for image recognition and/or analysis. In another embodiment, the AI-based image analyzer 112 adds sound data captured by the microphone 102 to images created by the image sensor(s) 103.

The AI-based environment analyzer 113 is configured to receive and analyze the environmental data comprising, for example, the thermal data, the radio wave data, and other radiation data captured by one or more of the environmental sensors, and exclude non-related environmental data coming from outside the operating field of the AI-enabled device 100. Using the select environment datasets from the AI data library, the AI-based environment analyzer 113 executes an AI algorithm configured to recognize relevant environment data elements, for example, radio wave data, from the received environmental data, for example, the radiation data. For example, the AI-based environment analyzer 113 analyzes respiratory data received from the environmental sensors, and in communication with the AI-based image analyzer 112, determines whether a detected object, for example, a detected person, is lying on a bed, is alive, and is asleep. In an embodiment, the AI-based environment analyzer 113 is configured as a thermal analyzer. In this embodiment, the AI-enabled device 100 further comprises a thermal imager 109 operably coupled to the thermal analyzer. The thermal imager 109 is configured to automatically determine temperature of the identified objects. The thermal analyzer is configured to analyze temperature of the identified objects and automatically recognize objects with increased body temperature. In an example, when the environmental sensors comprising the thermal imager 109 detect a warm body temperature, the thermal analyzer analyzes temperature data received from the environmental sensors, and in communication with the AI-based image analyzer 112, determines whether a detected object, for example, a detected person, is lying on a bed, is alive, is unwell, and is asleep.

Based on the analysis of each and the aggregate of the multi-modal sensor data elements, one or more of the AI analyzers 111, 112, and 113 detect and identify objects in the operating field of the AI-enabled device 100; distinguish between the identified objects; distinguish non-related sensor data; determine and monitor activities of the identified objects; and generate and validate activity data from the determined activities. The activities comprise, for example, entering a threshold defined by a barrier such as a door, exiting the threshold, movements such as a fall of a baby or an elderly person in the operating field, etc. The activity data comprises, for example, a type of a sound, a location of a source of the sound, type of each of the objects such as baby, pet, elderly person, etc., location of each of the objects, trajectory and speed of movement and travel of each of the objects, etc. In an embodiment, the AI-based image analyzer 112 includes metadata comprising, for example, time, date, geographic location, time span, security data, object identification, etc., with the image data captured by the image sensor(s) 103 as part of the activity data. By processing the image data and metadata captured by the array of sensors 102, 103, and 104, the AI-based image analyzer 112 identifies a target object and determines location data while the target object is moving in the monitored area. By concatenating the consecutive location data, the AI-based image analyzer 112 determines a moving trajectory of the target object.

One or more select datasets from the AI data library are loaded into a database memory for utilization by one or more of the AI analyzers 111, 112, and 113. The AI data library with the select datasets assists in the accurate detection of soundbites and images. With the help of the AI data library, the AI analyzers 111 and 112 perform accurate identification of a detected sound or object. Moreover, with the help of the AI data library, the AI-based sound analyzer 111 reduces the false detection of non-related sound coming from outside the operating field. In an embodiment, the AI-based sound analyzer 111 reduces the false detection of non-related sound coming from inside the operating field, with the help of the AI data library. Furthermore, with the help of the AI data library, the AI-based image analyzer 112 reduces the false object detection rate caused due to moving sunlight or external moving light sources. The AI analysis unit 110 reduces false detection rate by evaluating the input, multi-modal sensor data elements collected from various dimensions, for example, sound, image, thermal, radiation, etc. By this multi-faceted approach to detection and recognition, the AI-enabled device 100 determines accurately what object is passing through a threshold as well as the trajectory and speed with which the object is traveling, thereby allowing a better understanding of the nature of the threshold activity. The controller 115 retrieves the computer program instructions defined by the AI analyzers 111, 112, and 113, from the memory unit 118 for executing the respective functions disclosed above. In an embodiment, the AI analyzers 111, 112, and 113 are disclosed above as software executed by the controller 115. In another embodiment, the AI analyzers 111, 112, and 113 are implemented completely in hardware. In another embodiment, the AI analyzers 111, 112, and 113 are implemented by logic circuits to carry out their respective functions disclosed above.

In an embodiment, the AI analysis unit 110 further comprises a wake-up module 114 in operable communication with a power management module 119 built into the AI analysis unit 110. The wake-up module 114 is built into the AI analysis unit 110 and is connected to the low power sensor unit 101 comprising the sensors 102, 103, and 104 and their respective detection circuits 105, 106, and 107. The wake-up module 114 is configured to wake up the AI analysis unit 110 from the sleep mode on detection of incoming objects by the sensor unit 101. The AI analysis unit 110 is maintained in the sleep mode until awoken by the wake-up module 114. When the low power sensor unit 101 detects an incoming object, the sensor unit 101 sends a signal to the wake-up module 114 to wake up the AI-enabled device 100 and get ready for activity monitoring. The detection by the low power sensor unit 101 to trigger the wake-up signal is the result of a single sensor or a combination of sensors depending on application. The power management module 119 manages the distribution of power from a power source, for example, a battery, of the AI-enabled device 100, within the AI analysis unit 110. In an embodiment, the power management module 119 is a load protection device configured to protect an electrical circuit of the AI analysis unit 110 from damage caused by an overload condition or a short circuit.

In an embodiment, the wake-up module 114 comprises a data input block (not shown) and a power on/off signal generator (not shown). In an example, when the low power sensor unit 101 detects any sounds, movements, and/or objects, the sensor unit 101 generates a signal and sends the signal to the data input block of the wake-up module 114. The power on/off signal generator then provides a signal to the power management module 119 to power the rest of the AI analysis unit 110 and the action execution unit 124. The power management module 119 also provides power to the full high-definition (HD) imager 108 and the thermal imager 109. The AI analyzers 111, 112, and 113 then analyze the detected data captured and communicated by the sensor unit 101, the full HD imager 108, and the thermal imager 109, respectively. If the detected data is valid, the output port 120 and a communication module 121 receive power from the power management module 119. The controller 115 then sends the desired data and signals out through the output port 120, the communication module 121, and the action execution unit 124 accordingly. The action execution unit 124 is operably coupled to the AI analysis unit 110. The action execution unit 124 is configured to execute one or more of multiple actions in real time based on the validation of the activity data. The actions comprise, for example, controlling a lock mechanism 126 of an external member, for example, a door, to which the AI-enabled device 100 is attached, to change a state of the external member; transmitting a notification to an electronic device via a network; activating one or more light indicators 127 operably coupled to the AI-enabled device 100; sounding an alarm operably coupled to the AI-enabled device 100, etc.

In an embodiment, one or more of the AI analyzers 111, 112, and 113 preclude the execution of the action(s) and return the AI analysis unit 110 to the sleep mode if the activity data is invalid. In this embodiment, the low power sensor unit 101 performs a first level detection to wake up the AI analysis unit 110 via the wake-up module 114. For example, if a soundbite is detected by the microphone 102, the detection circuit 105 sends a signal to the wake-up module 114 to wake up the AI analysis unit 110 after such detection. The AI-based sound analyzer 111 in the AI analysis unit 110 then analyzes the soundbite data received from the sensor unit 101 to determine the location of the sound origin point, that is, the sound source location, as disclosed in the descriptions of FIGS. 3-4. The wake-up module 114 also provides a signal to the power management module 119 to power and activate the full HD imager 108 to capture an image of the monitored area. The AI-based image analyzer 112 analyzes the captured image and determines whether a true moving object is detected as disclosed in the description of FIGS. 5A-5B. If the sound is not from the monitored area, or if there is no moving object in the monitored area, the detection is not valid and the AI analysis unit 110 returns to the sleep mode to save operating power. In an embodiment, the AI-enabled device 100 is configured to be remotely controlled to execute one or more of the actions. In another embodiment, the AI-enabled device 100 is configured to be programmatically controlled to execute one or more of the actions.

In an embodiment, the AI analysis unit 110 further comprises one or more input ports 116 and output ports 120. The output ports 120 are operably connected to multiple output devices 125, 126, 127, etc., for the execution of the actions based on the validation of the activity data. The output devices comprise, for example, a speaker 125 configured to emit an audio output, a control lock mechanism 126 configured to lock and unlock an external member, for example, a door, and one or more light indicators 127 configured to emit light indications. The AI analysis unit 110 further comprises an open/close switch 123 operably coupled to the input port 116 of the AI analysis unit 110 for activating and deactivating the AI-enabled device 100.

In an embodiment, the AI analysis unit 110 further comprises a communication module 121 configured to communicate with an electronic device, for example, a client device such as a home user device or a remote user device, a server, a networking device, a network of servers, a cloud server, etc., via a network. The communication module 121 comprising, for example, a transceiver, is operably coupled to an antenna 128, for example, a Wi-Fi® antenna, a low power Bluetooth® antenna, etc. The communication module 121 is configured to communicate the validated activity data to the electronic device via the network. For example, the communication module 121 transmits valid object detection data and notification signals wirelessly to user devices of predetermined, authorized users and to a cloud server via the network. In an embodiment, the communication module 121 is configured to selectively communicate the activity data to the electronic device via the network to maintain privacy. For example, the communication module 121 does not communicate image data, video data, etc., from the activity data to the electronic device via the network to maintain privacy. In another embodiment, the communication module 121 is configured to selectively communicate the activity data to a mobile application deployed on an electronic device of a predetermined, authorized user via the network. For example, on detecting a fall of an elderly person within the operating field of the AI-enabled device 100, the communication module 121 transmits a notification to the mobile application deployed on a caregiver's smartphone via the network, thereby allowing the caregiver to contact and/or assist the elderly person. In an embodiment, the mobile application is configured to compile the activity data along with physiological data, for example, vital signs data, of the identified objects and generate a timed data chart. For example, the mobile application compiles an elderly person's vital signs, for example, moving path and body temperature data together with a timed data chart, allowing local or remote users to know the elderly person's daily activities and wellness and provide peace of mind to related caring parties.

The modules of the AI analysis unit 110, for example, the AI analyzers 111, 112, and 113, the wake-up module 114, the controller 115, the input port 116, the database(s) 117, the memory unit 118, the power management module 119, the output port(s) 120, and the communication module 121 communicate with each other via the internal bus 122. The internal bus 122 connects the modules of the AI analysis unit 110 to each other and permits communications and exchange of data between the modules of the AI analysis unit 110. The internal bus 122 transfers data to and from the memory unit 118 and into or out of the controller 115.

Figure 2:
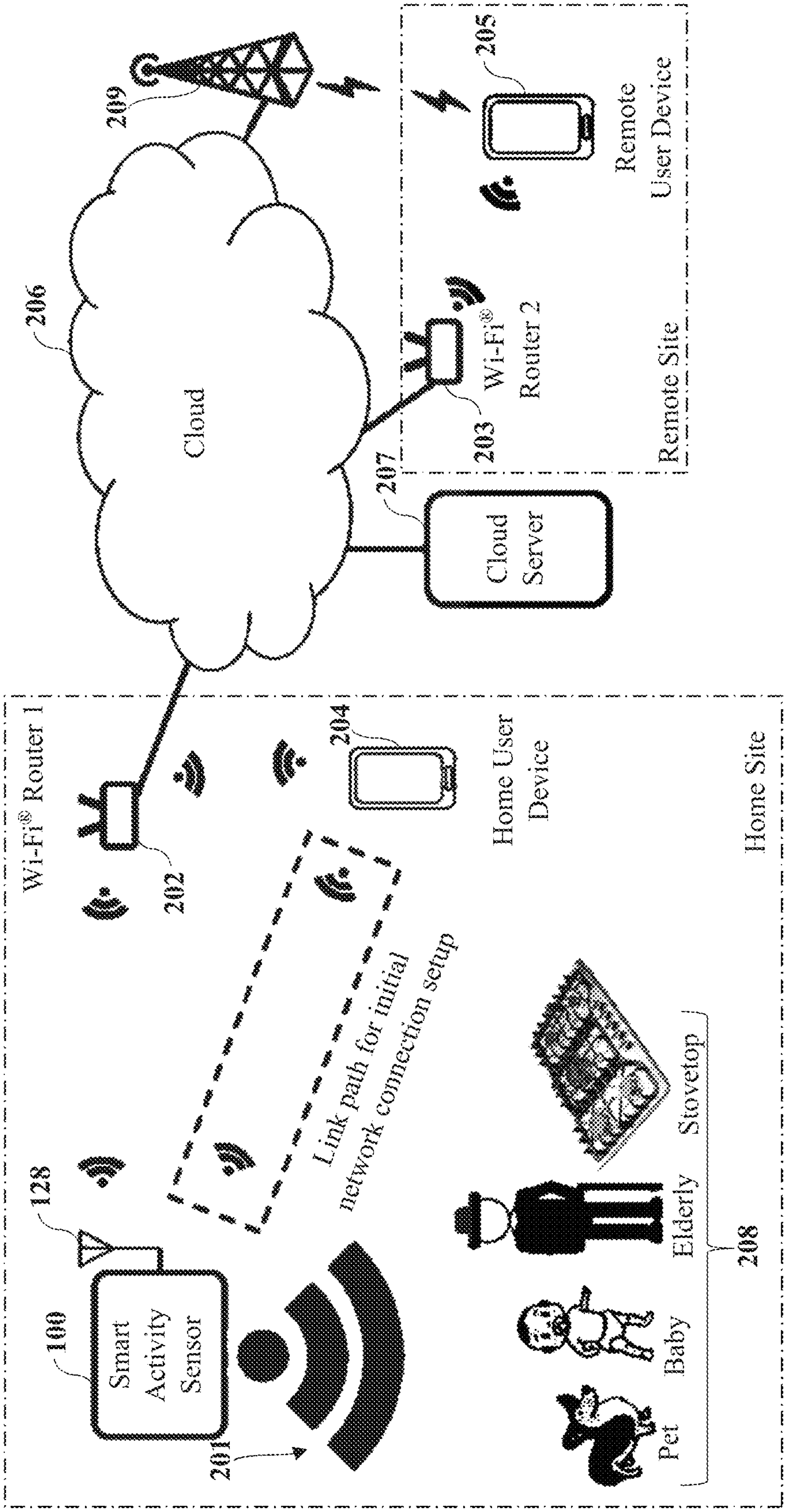
FIG. 2 illustrates an exemplary implementation of the AI-enabled activity detection and monitoring device communicatively coupled to user devices and a cloud server in a cloud computing environment.

FIG. 2 illustrates an exemplary implementation of the artificial intelligence (AI)-enabled activity detection and monitoring device 100 communicatively coupled to user devices, for example, 204 and 205, and a cloud server 207 in a cloud computing environment. In an embodiment, the AI-enabled device 100 disclosed herein is configured as a smart activity sensor. The AI-enabled device 100 utilizes AI techniques for detecting, validating, and monitoring objects 208, for example, pets, babies, elderly persons, a stovetop, etc., and their activities within an operating field 201 of the AI-enabled device 100 in a home or other environment. The AI-enabled device 100 is accessible to users, for example, home users, remote users, etc., through a broad spectrum of technologies and user devices 204 and 205. The user devices 204 and 205 are electronic devices, for example, one or more of personal computers with access to the internet, tablet computing devices, mobile computers, mobile phones, internet-enabled cellular phones, smartphones, portable computing devices, laptops, wearable computing devices such as smart glasses, touch centric devices, workstations, client devices, portable electronic devices, network-enabled computing devices, interactive network-enabled communication devices, image capture devices, any other suitable computing equipment, combinations of multiple pieces of computing equipment, etc.

Through the use of the antenna 128 that is operably coupled to the communication module 121 of the AI-enabled device 100 illustrated in FIG. 1, the AI-enabled device 100 communicates with the user devices 204 and 205 via a network, for example, a short-range network or a long-range network. For example, the AI-enabled device 100 communicates with a home user device 204 via an alternative route, for example, via a short-range network, to complete the setup of the AI-enabled device 100. The alternative route creates a link path between the AI-enabled device 100 and the home user device 204 for an initial network connection setup. Completion of the setup allows the AI-enabled device 100 to communicate through a communication network at a home site, for example, a local network that implements a Wi-Fi® communication protocol of Wi-Fi Alliance Corporation established by a networking device such as a Wi-Fi® router 202. In this example, the antenna 128 is a Wi-Fi® antenna that facilitates the communication between the AI-enabled device 100 and the Wi-Fi® router 202 and thereafter, between the Wi-Fi® router 202 and the home user device 204. In another example, the AI-enabled device 100 communicates with the home user device 204 via an alternative route, for example, via a communication network that implements a Bluetooth® communication protocol of Bluetooth Sig, Inc. In this example, the antenna 128 is a Bluetooth® antenna that facilitates the communication between the AI-enabled device 100 and the home user device 204.

In an embodiment, the AI-enabled device 100 is implemented to operate wirelessly with one or more cloud servers 207 in a cloud computing environment. As used herein, "cloud computing environment" refers to a processing environment comprising configurable, computing, physical, and logical resources, for example, networks, servers, storage media, virtual machines, applications, services, etc., and data distributed over a network. The cloud computing environment provides an on-demand network access to a shared pool of the configurable computing physical and logical resources. The AI-enabled device 100 is configured to communicate through wireless communication protocols, for example, Wi-Fi® or low power Bluetooth®, to a global network of remote servers, referred to as the cloud 206, directly through a network such as a Wi-Fi® network or a Bluetooth® network, or through a bridging device, for example, a mobile phone. The AI-enabled device 100 transmits notifications to home user devices 204 of onsite users connected to the same Wi-Fi® or Bluetooth® network, and to remote user devices 205 of remote users at a remote site through the cloud 206 for safety monitoring and control purposes. In an example, the cloud server 207, that is connected to the cloud 206, communicates with the AI-enabled device 100 wirelessly through a Wi-Fi® network established by the Wi-Fi® router 202 and with the remote user device(s) 205 wirelessly through a Wi-Fi® network established by a Wi-Fi® router 203. In an embodiment, a mobile application deployed on the remote user device 205 is configured to remotely control the AI-enabled device 100 via the cloud 206. In an embodiment, the remote user device 205 connects to and accesses the cloud 206 wirelessly through the Wi-Fi® network established by the Wi-Fi® router 203 at the remote site. In another embodiment, the remote user device 205 connects to and accesses the cloud 206 wirelessly through a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., established by cellular or telecommunications towers 209.

In an embodiment, the AI-enabled device 100 interfaces with the user devices 204 and 205 and the cloud server(s) 207 to implement the activity detection and monitoring service, and therefore more than one specifically programmed computing system is used for implementing the activity detection and monitoring service. The cloud server 207 communicates with the remote user device 205 via the cloud 206. In various embodiments, the cloud 206 represents, for example, one of the internet, satellite internet, an intranet, a wired network, a wireless network, a Bluetooth® communication network, a Wi-Fi® network, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as those disclosed above, a local area network, a wide area network, an internet connection network, an infrared communication network, etc., or a network formed from any combination of these networks.

As illustrated in FIG. 2, the AI-enabled device 100 is implemented in a cloud-based system application. The AI-enabled device 100 configured as a smart activity sensor monitors objects 208, for example, a baby, a pet, an elderly person, a stovetop, etc., and their activities when they cross or are present in the operating field 201 of the AI-enabled device 100. The AI-enabled device 100 transmits notifications to the home user device 204, for example, through the Wi-Fi® network established by the Wi-Fi® router 202 or directly via a Bluetooth® connection to the home user device 204. The AI-enabled device 100 also transmits the captured and analyzed data to the home user device 204, for example, via the Wi-Fi® network established by the Wi-Fi® router 202, or directly via a Bluetooth® connection to the home user device 204. In an embodiment, the home user device 204 is configured to function as a bridge to the cloud server 207. Furthermore, in an embodiment, the AI-enabled device 100 and/or the home user device 204 selectively transmit the captured and analyzed data wirelessly to the cloud server 207. A remote user, using the remote user device 205, can access the captured and analyzed data and receive notifications from the cloud server 207 and/or from the AI-enabled device 100 through the cloud 206.

Figure 3:
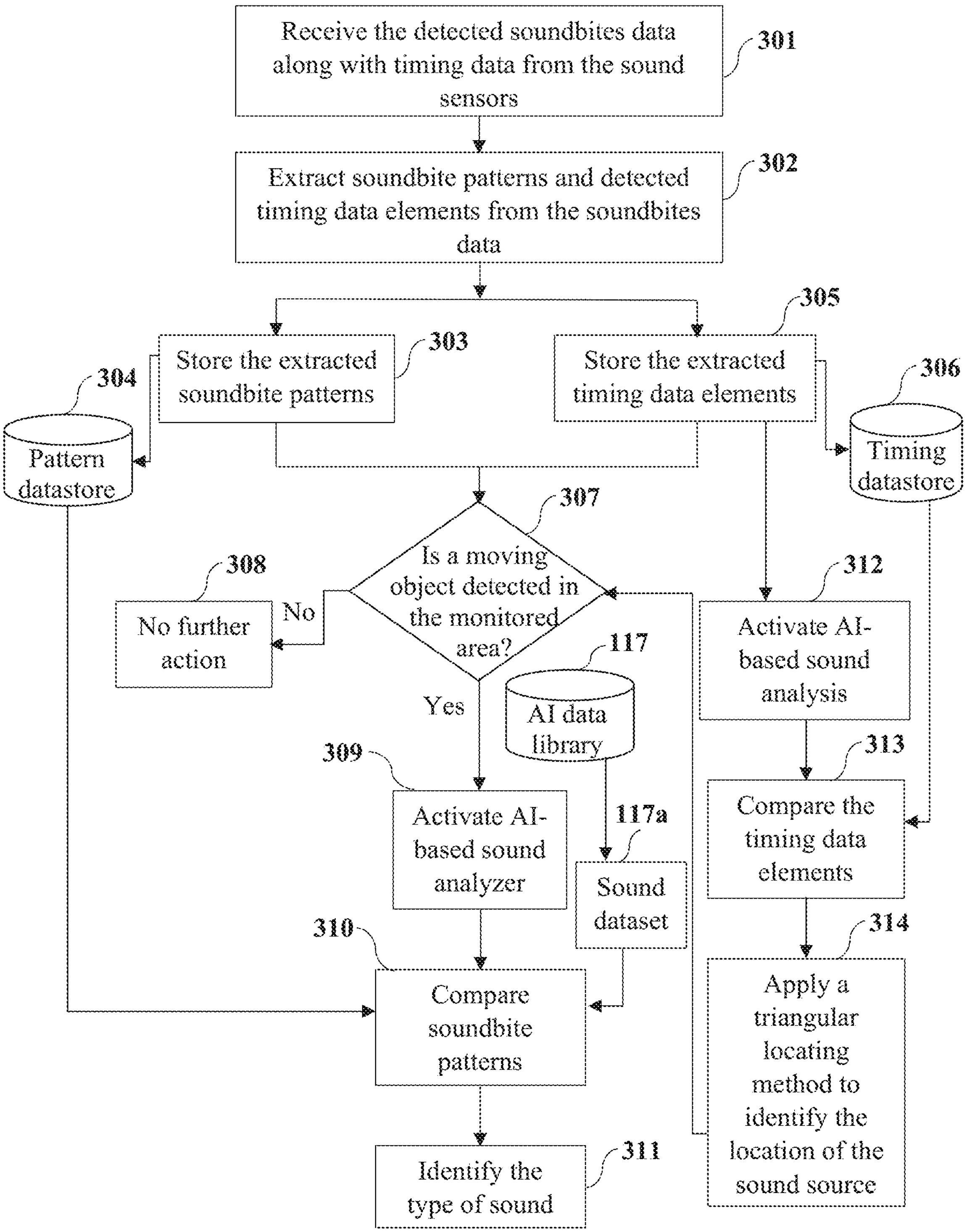
FIG. 3 illustrates a flowchart of an operation of an embodiment of an AI-enabled sound analyzer of the AI-enabled activity detection and monitoring device.

FIG. 3 illustrates a flowchart of an operation of an embodiment of an AI-enabled sound analyzer 111 of the AI-enabled activity detection and monitoring device 100 shown in FIG. 1. The AI-enabled device 100 comprising the sensor unit 101 and the AI analysis unit 110 shown in FIG. 1, is deployed to monitor a target area. When the sensor unit 101 comprising the array of sound sensors detects any soundbites, for example, from a window breaking, a person falling to a floor, a person calling for help, a baby crying, a dog barking, a cat meowing, etc., in the monitored area or a surrounding area, the sensor unit 101 generates and sends a signal to the wake-up module 114 of the AI analysis unit 110 shown in FIG. 1, to wake up the AI analysis unit 110 from the sleep mode. In an embodiment, each sound sensor comprises a built-in clock that is synchronized with internet time. When a sound sensor detects a soundbite, the sound sensor records the actual time of detecting or receiving the soundbite in a predefined format, for example, HH.MM.SS, where HH refers to the hours, MM refers to the minutes, and SS refer to the seconds, of reception time. In an embodiment, each sound sensor records the unit of the second with an accuracy of, for example, 1/1000 of a second. On being woken up from the sleep mode, the sound analyzer 111 in the AI analysis unit 110 receives 301 the detected soundbite data along with timing data from the array of sound sensors. The sound analyzer 111 extracts 302 soundbite patterns and detected timing data elements from the soundbites data. The timing data elements comprise the time at which each sound sensor in the array of sound sensors detects a sound. The sound analyzer 111 stores 303 the extracted soundbite patterns in a pattern datastore 304. The sound analyzer 111 stores 305 the extracted timing data elements in a timing datastore 306.

The array of image sensors in the sensor unit 101 continuously monitors the target area to detect 307 one or more moving objects. If a moving object is not detected by the array of image sensors, the sensor unit 101 performs no further action 308. If a moving object is detected by the array of image sensors, the sensor unit 101 activates 309 the sound analyzer 111 in the AI analysis unit 110. On activation 309, the sound analyzer 111 retrieves the extracted soundbite patterns from the pattern datastore 304 and a sound dataset **117*a* from the database 117 containing the AI data library and compares 310 the soundbite patterns. The sound analyzer 111 analyzes the soundbite patterns against the sound dataset 117*a* to determine the type of sound, for example, glass breaking, people falling, other objects falling, a baby crying, a dog barking, etc. The sound analyzer 111 identifies 311 the type of sound by finding a match between the extracted soundbite patterns and the soundbite patterns in the sound dataset 117*a*. The accuracy of the sound type detection disclosed herein is substantially higher than a mere sound bite pattern comparison. Furthermore, after storing the extracted timing data elements in the timing datastore 306, the sound analyzer 111 activates 312 an AI-based sound analysis function for analyzing the extracted timing data elements. The sound analyzer 111 retrieves the timing data elements from the timing datastore 306 and compares 313 the timing data elements with each other. That is, the sound analyzer 111 compares the time of reception of the soundbite patterns by the sound sensors to determine the differences among the sound sensors. The sound analyzer 111 then applies 314 a triangular locating method to identify the location of the source of the sound as disclosed in the description of FIG. 4. Sound detection accuracy depends on factors comprising, for example, sound source location and type of sound or sound pattern. The sound analyzer 111 applies the triangular locating method for identifying the sound source location and ruling out non-related sound sources as disclosed in the description of FIG. 4. The array of image sensors continues to monitor the target area to detect 307 one or more moving objects for allowing execution of the process steps 308 through to 314**.

Figure 4:
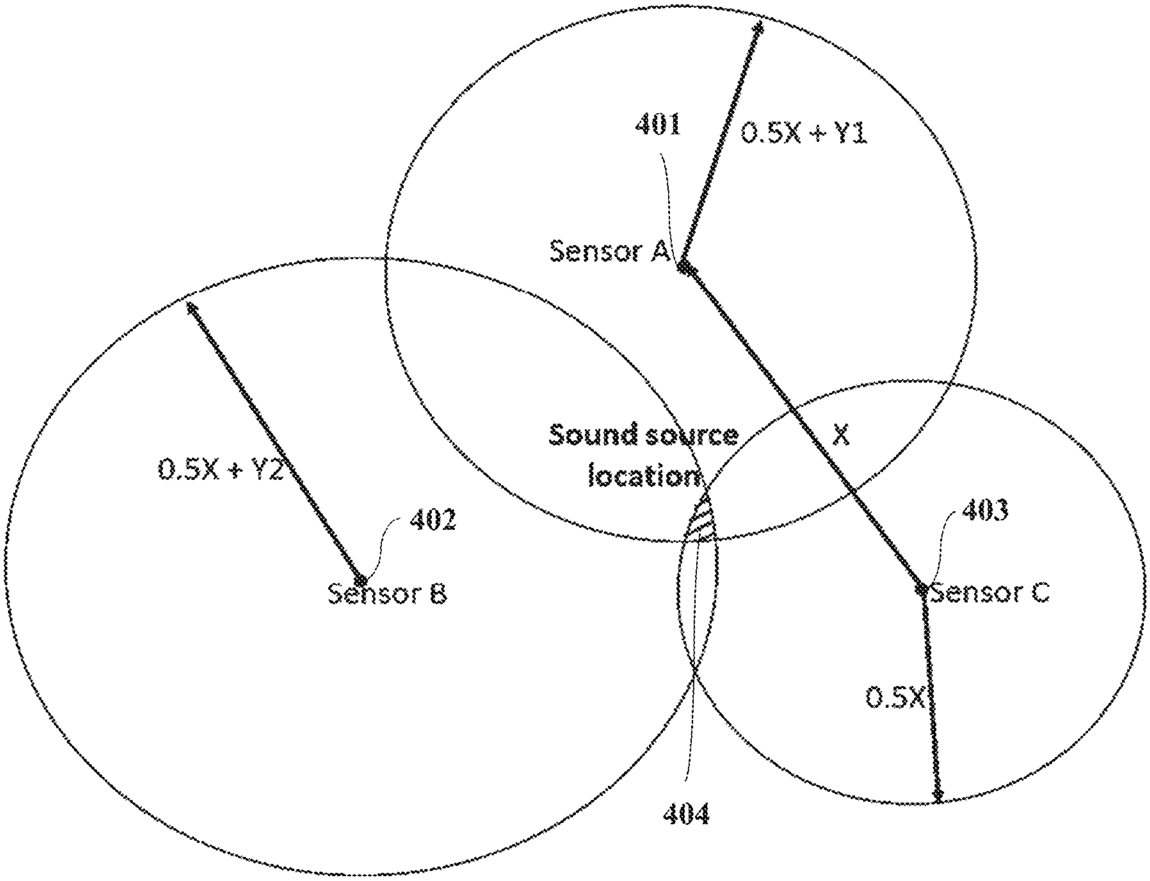
FIG. 4 illustrates a schematic showing a triangular locating method employed by an embodiment of the AI-enabled sound analyzer for identifying a location of a sound source.

FIG. 4 illustrates a schematic showing a triangular locating method employed by an embodiment of the AI-enabled sound analyzer 111 shown in FIG. 1, for identifying a location of a sound source. Consider an example where three sound sensors, namely, sensor A 401, sensor B 402, and sensor C 403, form an array of sensors, namely, a sound detecting array, in the sensor unit 101 of the AI-enabled device 100 shown in FIG. 1. As illustrated in FIG. 4, in an example, consider sensor C 403 detects a sound first at time $t_0$; sensor A 401 detects a sound at $(t_0)$+A milliseconds (m-sec); and sensor B 402 detects a sound at $(t_0)$+B m-sec, where A is less than (<) B. The sound analyzer 111 calculates Y1=A*sound speed and Y2=B*sound speed. Furthermore, in this example, the distance between sensor A 401 and sensor C 403 is X. The sound analyzer 111 creates circles using the following radius sizes: 0.5X+Y1 around sensor A 401; 0.5X+Y2 around sensor B 402; and 0.5X around sensor C 403 as illustrated in FIG. 4. The sound analyzer 111 locates the source of the sound at the intersection area 404 of the three circles as illustrated in FIG. 4. For purposes of illustration, FIG. 4 illustrates three sound sensors 401, 402, and 403 being used to form the sound detecting array. In an embodiment, additional sound sensors are configured to form the sound detecting array around the target area in the operating field of the AI-enabled device 100 illustrated in FIG. 1, to further increase the sound source location detection accuracy.

FIGS. 5A-5B illustrate a flowchart of an operation of an embodiment of the AI-enabled image analyzer 112 of the AI-enabled activity detection and monitoring device 100 shown in FIG. 1. The AI-enabled device 100 comprising the sensor unit 101 and the AI analysis unit 110 shown in FIG. 1, is deployed to monitor a target area. When the sensor unit 101 comprising the array of image sensors detects one or more moving objects and captures images of the moving object(s) in the monitored area, the sensor unit 101 generates and sends a signal to the wake-up module 114 of the AI analysis unit 110 shown in FIG. 1, to wake up the AI analysis unit 110 from the sleep mode. In an embodiment, the image analyzer 112 in the AI analysis unit 110 first performs a fast check by performing a general object detection verification as disclosed in steps 501 to 506 below. The image analyzer 112 receives 501 the captured images of the detected moving object(s) from the array of image sensors. The image analyzer 112 then compares 502 the shapes of the detected moving object(s) in the captured images with a dataset **117*b* comprising shapes of multiple objects retrieved from the database 117 containing the AI data library. The image analyzer 112 determines 503 whether there is a match between the shapes by determining whether the detected moving object(s) in the captured images resembles any of the shapes of the objects in the dataset 117*b*. If there is no match, the image analyzer 112 determines 504 that the detected moving object(s) is a moving shadow created by external moving light sources and performs no further action 505**.

The array of image sensors may capture an image that is not a true moving object. For example, a moving car light may cast a moving shadow of a tree trunk outside the window onto a monitored floor in the operating field of the AI-enabled device 100. Such a moving shadow may appear to be a moving object to the image sensor(s). To preclude such false detection, the image analyzer 112 first verifies the image captured by the image sensor(s) to exclude the false detection. The image analyzer 112 then confirms which type of moving object is detected. As illustrated in FIG. 5A, if the detected moving object(s) in the captured images resembles any of the shapes of the objects in the dataset 117*b*, the image analyzer 112 proceeds to confirm 506 whether the detected moving object(s) in the captured images is an actual moving object by performing a detailed analysis comprising target object detection as disclosed in steps 507 to 510 below. To confirm that the detected moving object(s) in the captured images is an actual moving object, the image analyzer 112 retrieves a target object dataset 117*c* from the database 117 containing the AI data library and compares 507 the shapes of the detected moving object(s) in the captured images with the shapes of target objects in the target object dataset 117*c*. The image analyzer 112 determines 508 whether there is a match between the shapes by determining whether the detected moving object(s) in the captured images resembles any of the shapes of the target objects in the target object dataset 117*c*. If there is no match, the image analyzer 112 performs no further action 509.

If the detected moving object(s) in the captured images resembles any of the shapes of the target objects in the target object dataset 117*c*, the image analyzer 112 proceeds to confirm 510 whether the detected moving object(s) in the captured images is an actual target moving object by performing object recognition as disclosed in the steps 511 and 512 below. The image analyzer 112 verifies 511 the type of the detected moving object(s) in the captured images using an image dataset 117*d* retrieved from the database 117 containing the AI data library. The image analyzer 112 then confirms 512 the type of the detected moving object(s), for example, people, babies, pets, etc., in the captured images. The image analyzer 112 further proceeds to notify a user by transmitting 513 a notification comprising the type and the image of the detected moving object(s) to a user device. In an embodiment, the image analyzer 112 sends 514 an alarm or an alert to the user based on preset criteria. The preset criteria comprise, for example, a type of notification selected by the user such as sending an image of the detected moving object(s) along with a text message notification, sending an alarm to a call center immediately when an unknown person is detected in the monitored area along with a notification to the user, etc.

Image detection accuracy depends on factors comprising, for example, object image resolution and the shape of the image or the image pattern. The image analyzer 112 improves image detection accuracy by performing the fast check through the general object detection verification, by performing the detailed analysis through the target object detection, and by performing the object recognition as disclosed above. As illustrated in FIG. 1, the AI-enabled device 100 uses an image sensor 103 such as a low power quarter video graphics array (QVGA) imager to detect a moving object in the target area in the operating field of the AI-enabled device 100. When the image sensor 103 detects a moving object, the image sensor 103 sends a signal to the wake-up module 114 of the AI analysis unit 110 illustrated in FIG. 1, to wake up the AI analysis unit 110 and activate the image analyzer 112. The image analyzer 112 uses the full high-definition (HD) imager 108 illustrated in FIG. 1, to capture an image of the detected moving object(s) in high definition for further analysis. The full HD imager 108 has a resolution of, for example, 1920×1080. The full HD imager 108 captures substantially high-grade images for improved image recognition and analysis to achieve a high detection accuracy. The high-resolution images contain sharper image shapes and substantially detailed features. The image analyzer 112 perform improved image recognition using the sharper image shapes and detailed features in the high-resolution images. The image analyzer 112 determines the type of detected objects, for example, an adult, a baby, a pet, etc., and even a moving shadow from an outdoor tree. The image analyzer 112 is, therefore, capable of distinguishing between the detected objects and excluding non-related image data.

Figure 6:
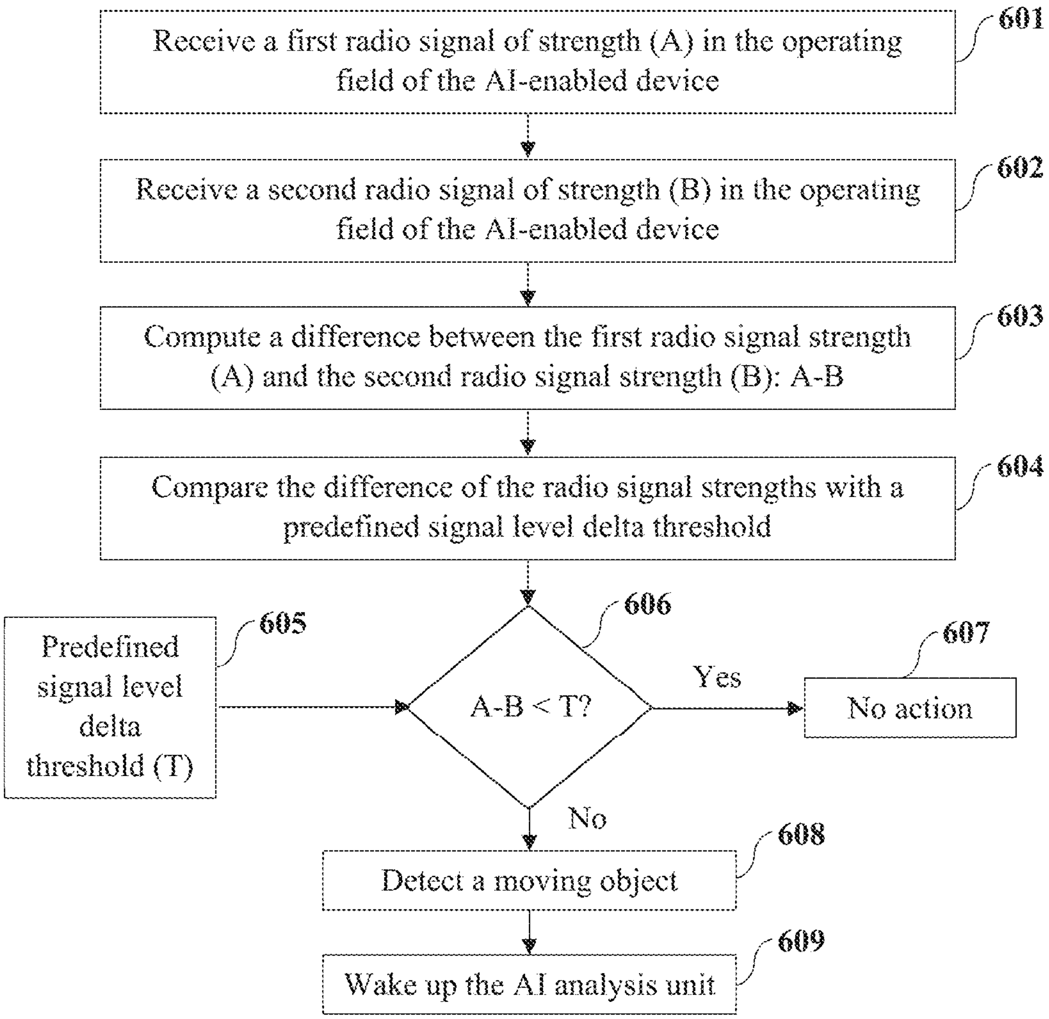
FIG. 6 illustrates a flowchart of an operation of an embodiment of a detection circuit of a low power radio wave sensor of the AI-enabled activity detection and monitoring device.

FIG. 6 illustrates a flowchart of an operation of an embodiment of the detection circuit 107 of a low power radio wave sensor 104 of the AI-enabled activity detection and monitoring device 100 shown in FIG. 1. In an embodiment, the detection circuit 107 detects a moving object in the operating field of the AI-enabled device 100 using a radio frequency signal, for example, a Wi-Fi® radio signal. When an object moves around the operating field of the AI-enabled device 100, the object disturbs the radio signal in the operating field and causes a multipath radio propagation in the steady state radio signal. The detection circuit 107 captures different signal levels of the radio signal caused by the moving object. As illustrated in FIG. 6, the detection circuit 107 receives 601 a first radio signal of strength, for example, A, in the operating field, and subsequently receives 602 a second radio signal of strength, for example, B, in the operating field. The detection circuit 107 then computes 603 a difference between the radio signal strengths, that is, A−B, and compares 604 the difference with a predefined signal level delta threshold 605, for example, T, where T refers to a noise threshold in the operating field or a radio frequency signal level received by the radio wave sensor 104, measured, for example, in a millivolts range. The detection circuit 107 determines 606 whether the difference, A−B, is less than the predefined signal level delta threshold T. If the difference, A−B, is less than the predefined signal level delta threshold T, the detection circuit 107 performs 607 no action. If the difference, A−B, is not less than the predefined signal level delta threshold T, the detection circuit 107 detects 608 a moving object and proceeds to wake up 609 the AI analysis unit 110 illustrated in FIG. 1. The detection circuit 107 generates and transmits a wake-up signal to the wake-up module 114 of the AI analysis unit 110 illustrated in FIG. 1, to wake up 609 the AI analysis unit 110. On waking up, the AI analysis unit 110 triggers the full high-definition (HD) imager 108 illustrated in FIG. 1, to capture an image of the detected moving object for further analysis by one or more of the AI analyzers 112 and 113 illustrated in FIG. 1.

The detection circuit 107 of the low power radio wave sensor 104 extends the detecting capability of the AI analysis unit 110 even when an obstruction or a barrier, for example, a wall, blocks a field of view of the image sensor 103, for example, the low power quarter video graphics array (QVGA) imager, of the low power sensor unit 101 illustrated in FIG. 1. Since the detection of a moving object by the detection circuit 107 depends on a radio wave reflection, a moving shadow from external moving light sources does not cause a multipath effect, thereby eliminating a false detection caused by a moving shadow from the external moving light sources. The moving object detection accuracy is further improved by the operation of the full HD imager 108 with the AI-based image analyzer 112 illustrated in FIG. 1 as disclosed in the description of FIGS. 5A-5B. In an embodiment, additional radio wave sensors or other sensors are disposed around the target area in the operating field of the AI-enabled device 100 for further improving radio wave detection accuracy. In other embodiments, the AI-enabled device 100 is equipped with a radio wave receiver having an enhanced sensitivity and a well-tuned antenna to further improve radio wave detection accuracy.

Figure 7:
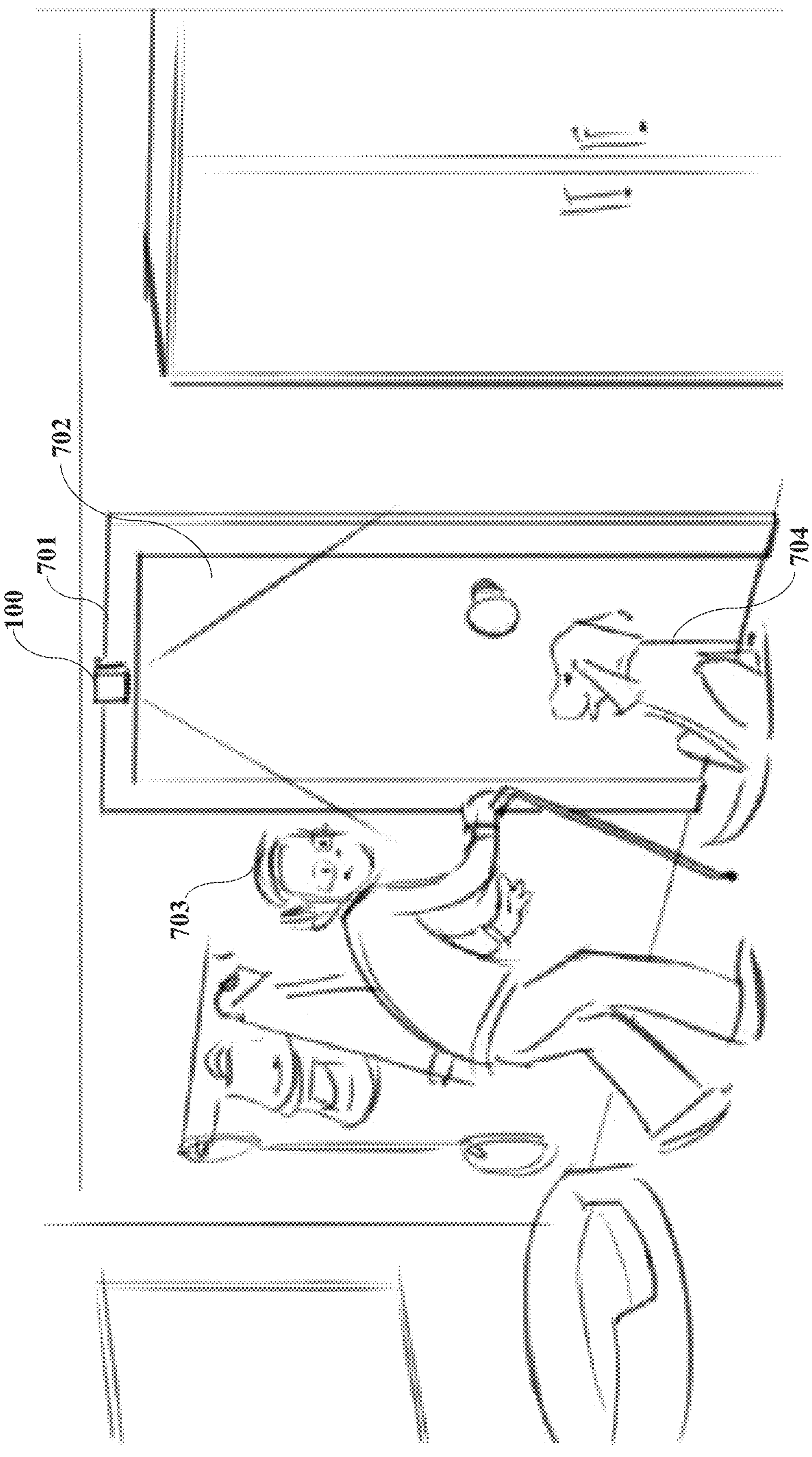
FIG. 7 illustrates an exemplary implementation of the AI-enabled activity detection and monitoring device in a home environment.

FIG. 7 illustrates an exemplary implementation of the AI-enabled activity detection and monitoring device 100 in a home environment. In an embodiment, the AI-enabled device 100 disclosed herein is configured as a smart threshold activity sensor or an intelligent threshold monitor for detecting and monitoring objects and their activities proximal to or across a threshold defined by a barrier, for example, a door 702. In an embodiment, the AI-enabled device 100 is configured to be positioned on or proximal to a barrier, for example, a door 702, for detecting, recognizing, monitoring, and reporting a state of the barrier and the objects entering, exiting, and passing by the barrier. In the exemplary implementation of the AI-enabled device 100 in a home environment illustrated in FIG. 7, the AI-enabled device 100 is positioned on an upper section of a door frame 701 of the door 702, thereby allowing the AI-enabled device 100 to monitor, capture, and analyze any objects, for example, people 703, animals 704, etc., passing by the threshold created by the door 702. For purposes of illustration, the AI-enabled device 100 is shown to be positioned on the upper section of the door frame 701 in FIG. 7; however, the AI-enabled device 100 may be positioned at any location on top of, below, or near the door frame 701 or the door 702 for detecting and monitoring the state of the door 702 and objects, for example, 703, 704, etc., and their activities near or across the threshold of the door 702. In an embodiment, the AI-enabled device 100 is configured to be retrofitted or installed into the door frame 701 or the door 702 without any drilling. In another embodiment, the AI-enabled device 100 is configured to be integrated into the door frame 701 or the door 702. When attached to the door frame 701, the AI-enabled device 100 monitors door states, for example, an open door state and a closed door state; detects, tracks, and recognizes objects passing through the threshold of the door 702; and identifies different activities occurring at the door threshold. The AI-enabled device 100 distinguishes between the objects in the operating field of the AI-enabled device 100. For example, the AI-enabled device 100 distinguishes between an adult, a child, a pet, a robot vacuum, etc., within the operating field of the AI-enabled device 100. The AI-enabled device 100 is also used, for example, in a garage entrance application, to monitor movements, that is, the comings and goings, of different types of vehicles and pedestrians.

In an embodiment, the AI-enabled device 100 is configured to monitor and report the state of the door 702, that is, an open and close status of the door 702. In this embodiment, one or more sensors of the sensor unit 101 comprise position sensors, magnetic sensors, light sensors, etc., configured to detect the position of the door 702 against the door frame 701 and report the state of the door 702. In an embodiment, when the door 702 is opened, the imager sensor 103 in the sensor unit 101 shown in FIG. 1, detects the movement of the door 702 and sends a signal to the wake-up module 114 of the AI analysis unit 110 shown in FIG. 1, to wake up the AI analysis unit 110 from the sleep mode. The power management module 119, in communication with the wake-up module 114 illustrated in FIG. 1, then turns on the power to enable the full high-definition (HD) imager 108 to capture images of the movement of the door 702 and objects that pass through the threshold of the door 702. The AI-based image analyzer 112 then analyzes the images and confirms the detection of the door 702 being opened. Similarly, when the door 702 is closed, the image sensor 103 in the sensor unit 101 detects the movement of the door 702 and sends a signal to the wake-up module 114 of the AI analysis unit 110 to wake up the AI analysis unit 110 from the sleep mode. The power management module 119, in communication with the wake-up module 114, then turns on the power to enable the full HD imager 108 to capture images of the movement of the door 702. The AI-based image analyzer 112 then analyzes the images and confirms the detection of the door 702 being closed.

On determining the state of the door 702, the AI-enabled device 100 transmits information on the state of the door 702 to any electronic device that has a network connection, for example, a home user device 204, a remote user device 205, a cloud server 207, etc., via a network, for example, a Wi-Fi® network, directly or through the cloud 206 illustrated in FIG. 2. The AI-enabled device 100 generates a notification on the state of the door 702 with analytic results. The notification with the analytic results comprises, for example, door open or close state data with the time and date information. The AI-enabled device 100 transmits the notification with the analytic results to the cloud server 207 via the cloud 206 and also to the home user device 204 and the remote user device 205 via their respective networks to notify the respective users. In an embodiment, the AI-enabled device 100 sounds an alarm or generates an audio output through the speaker 125 operably coupled to the AI-enabled device 100 as illustrated in FIG. 1, to convey the state of the door 702. In an embodiment, the AI-enabled device 100 is operably coupled to a locking mechanism of a door locking assembly and is configured to activate and deactivate the locking mechanism for locking and unlocking the door 702, respectively, based on the state of the door 702 as disclosed in the description of FIGS. 8A-8D. The AI-enabled device 100 is configured to lock or secure the door 702 when the door 702 is closed. The AI-enabled device 100 is also configured to be controlled remotely using the home user device 204 or the remote user device 205 connected to a network to lock or unlock the door 702, and/or take relevant actions.

Figure 8A:
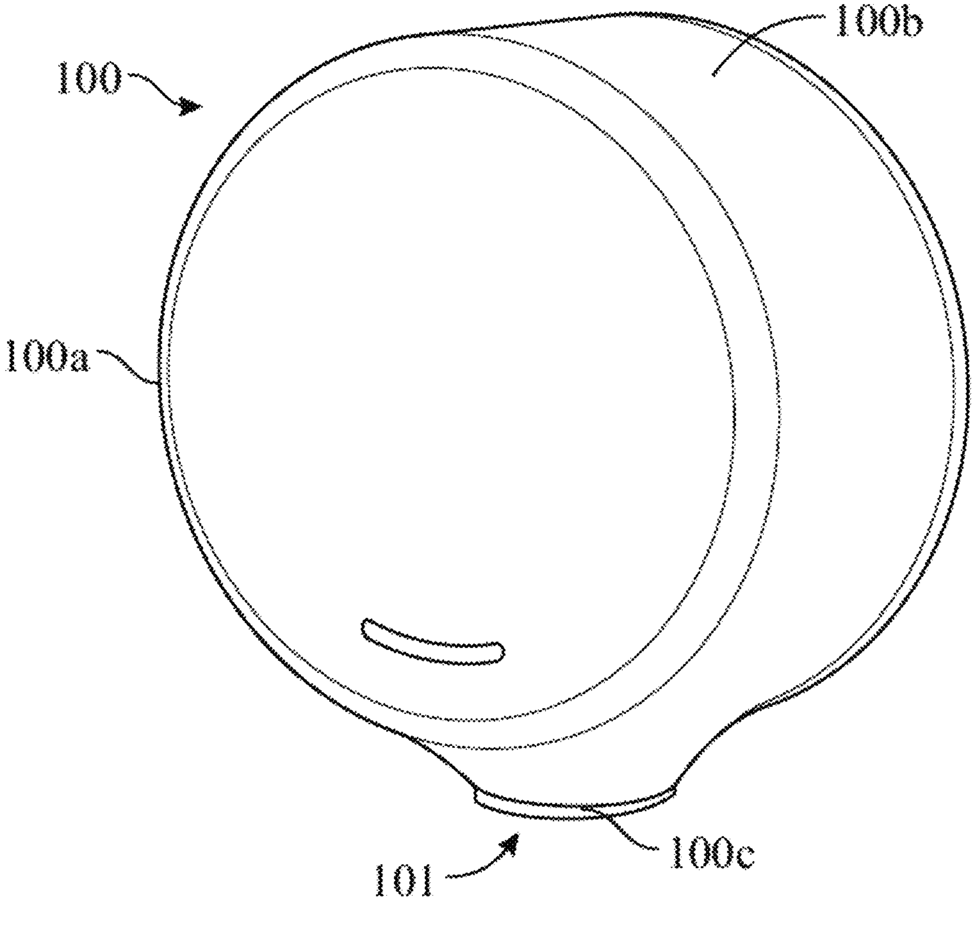
FIG. 8A illustrates a front perspective view of an embodiment of the AI-enabled activity detection and monitoring device.
Figure 8B:
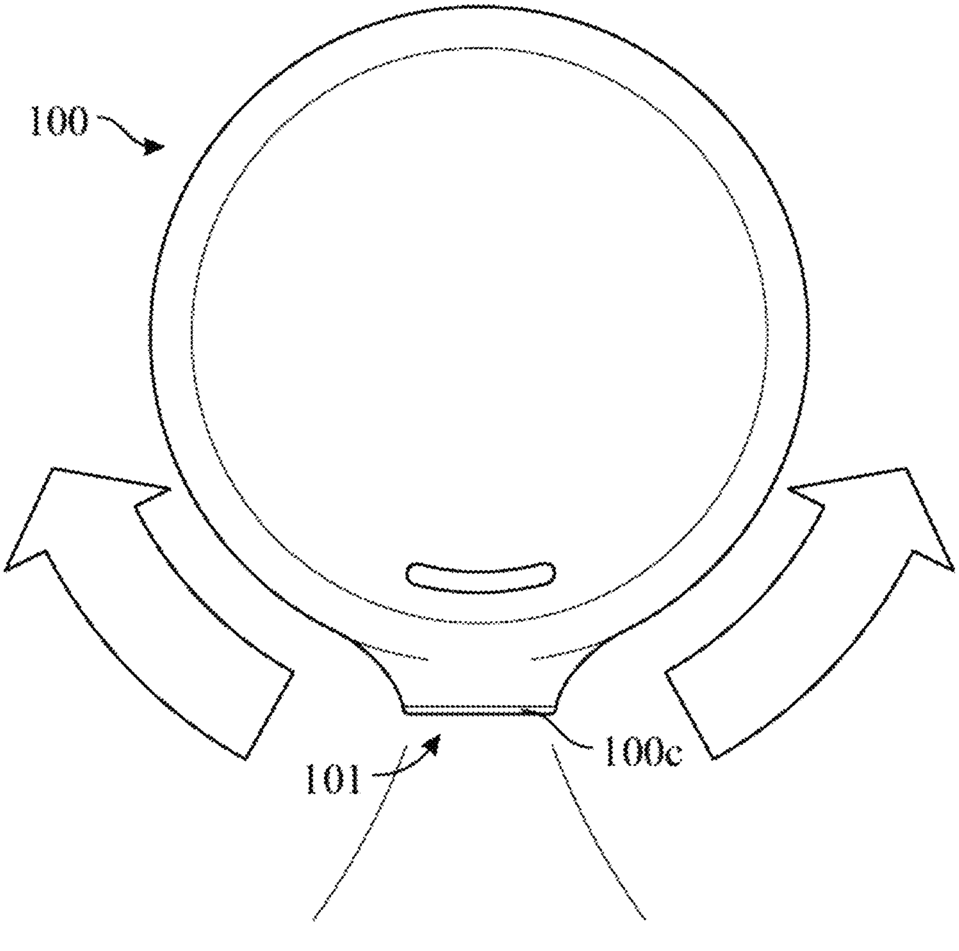
FIG. 8B illustrates a front elevation view of the embodiment of the AI-enabled activity detection and monitoring device shown in FIG. 8A.

FIG. 8A and FIG. 8B illustrate a front perspective view and a front elevation view, respectively, of an embodiment of the AI-enabled activity detection and monitoring device 100. In an embodiment, the AI-enabled device 100 is incorporated in a generally cylindrical housing 100*a* as illustrated in FIGS. 8A-8B. An outer surface 100*b* of the generally cylindrical housing 100*a* is made of a soft touch material for comfortable and convenient handling of the AI-enabled device 100. In an embodiment, the generally cylindrical housing 100*a* is made, for example, of plastic and/or metal to ensure rigidity of the generally cylindrical housing 100*a*. In an embodiment, the generally cylindrical housing 100*a* comprises a round form factor configured for easy mounting and aiming in a target area to be monitored. The generally cylindrical housing 100*a* accommodates all the sensors, electronic components, a battery, etc., of the AI-enabled device 100 therewithin. In an embodiment, the sensor unit 101 of the AI-enabled device 100 protrudes from one end 100*c* of the generally cylindrical housing 100*a*. The sensor unit 101 is manually adjustable and can be aligned towards the target area to be monitored, for example, towards a threshold area of a door, to easily detect objects, for example, people, pets, and things passing across the threshold area. The AI-enabled device 100 illustrated in FIGS. 8A-8B has a diameter of, for example, about 3 inches, and a thickness of, for example, about 1 inch.

Figure 8C:
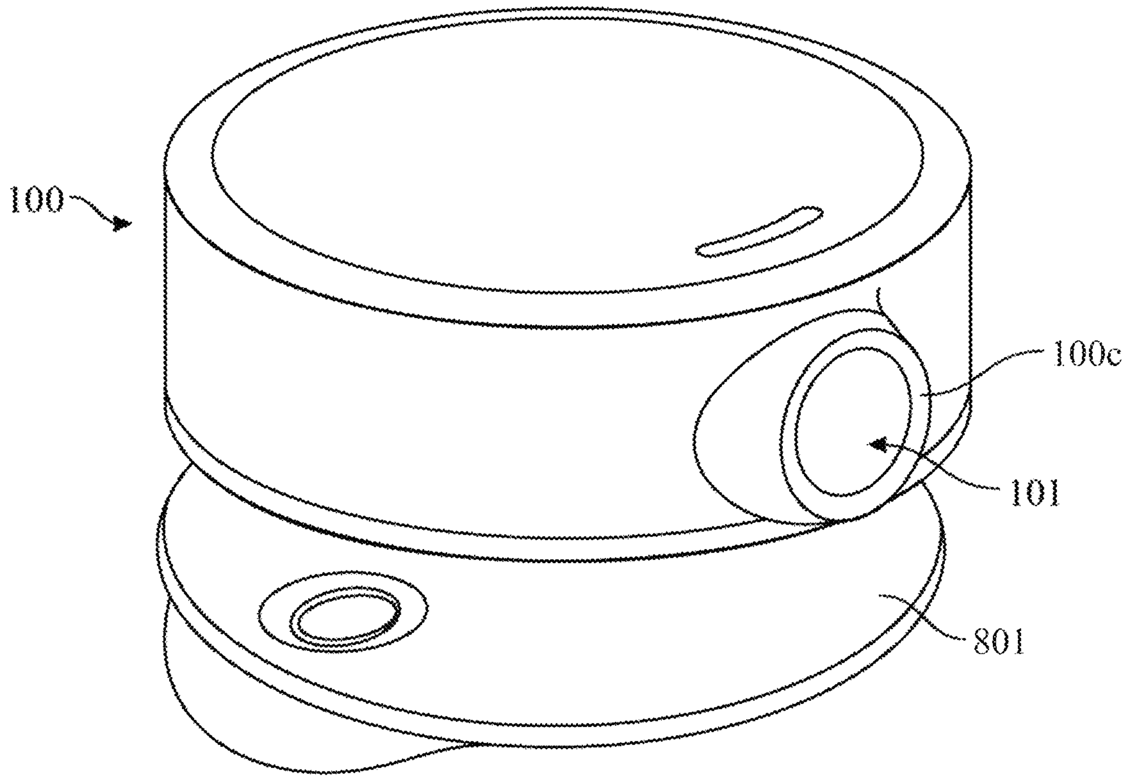
FIG. 8C illustrates a perspective view of the embodiment of the AI-enabled activity detection and monitoring device shown in FIG. 8A, operably coupled to a mounting bracket.

FIG. 8C illustrates a perspective view of the embodiment of the AI-enabled activity detection and monitoring device 100 shown in FIG. 8A, operably coupled to a mounting bracket 801. The AI-enabled device 100 is attached to a surface at a monitoring location of interest using a mounting bracket 801. In an embodiment, the mounting bracket 801 is a magnetic bracket attached to a surface, for example, a door frame, for mounting the AI-enabled device 100. In another embodiment, the AI-enabled device 100 is configured to be snap fitted onto the mounting bracket 801 that is attached to a surface at the monitoring location. The mounting bracket 801 with the AI-enabled device 100 mounted thereon can be attached to any surface at the monitoring location using fastening elements, for example, screws, adhesive materials, etc.

Figure 8D:
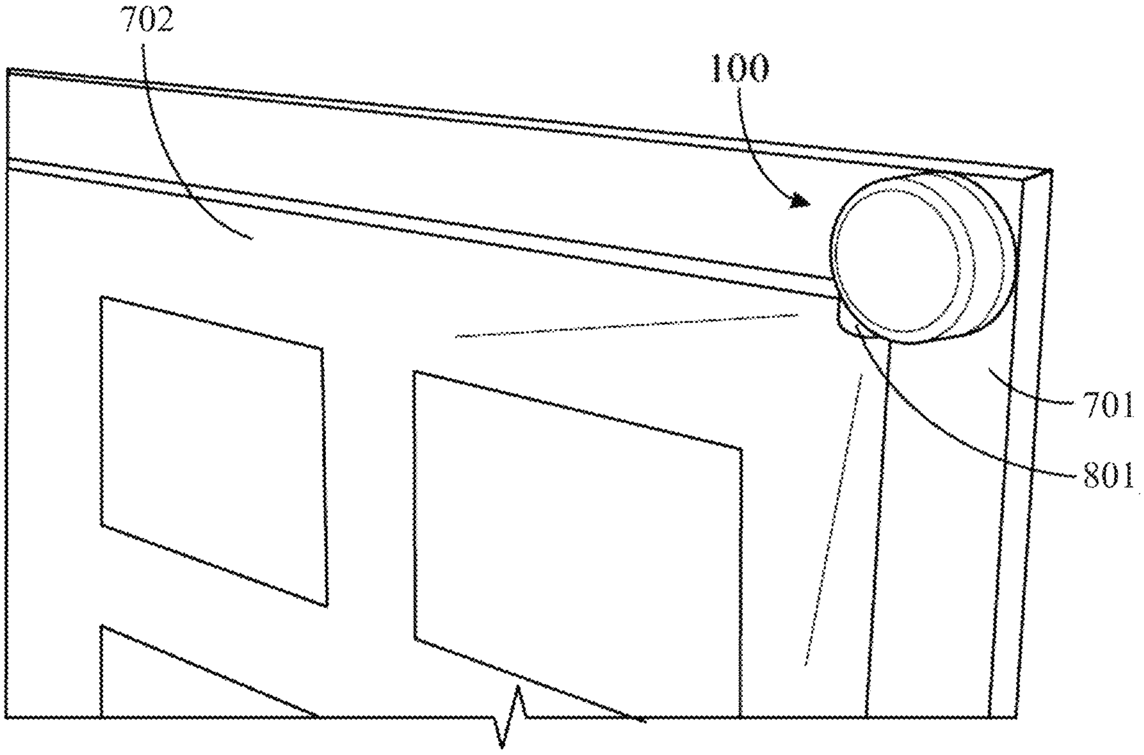
FIG. 8D illustrates a perspective view of the embodiment of the AI-enabled activity detection and monitoring device shown in FIG. 8A, mounted to a door frame via the mounting bracket.

FIG. 8D illustrates a perspective view of the embodiment of the AI-enabled activity detection and monitoring device 100 shown in FIG. 8A, mounted to a door frame 701 via the mounting bracket 801. In an embodiment, the AI-enabled device 100 is positioned on top of a door 702, for example, on an upper section of the door frame 701. The AI-enabled device 100 is securely mounted on the mounting bracket 801, which is attached to the door frame 701 as illustrated in FIG. 8D. The positioning of the AI-enabled device 100 on the top of the door 702 allows the AI-enabled device 100 to monitor and distinguish between objects, for example, people, pets, etc., crossing the threshold of the door 702. One or more of the sensors, for example, the thermal imager 109, of the AI-enabled device 100 illustrated in FIG. 1, detect temperature of the objects that are present in the operating field of the AI-enabled device 100 or that cross the threshold. Therefore, in addition to monitoring movements of the objects, for example, elderly persons, babies, pets, etc., the thermal imager 109 monitors their temperature. The AI-enabled device 100 unobtrusively detects and monitors the objects and their activities wirelessly, without intruding on the objects directly. In an example application, the AI-enabled device 100 is implemented as an activity monitor for the elderly, which detects and monitors an elderly person in the operating field near the door 702 in a home environment and generates analyzed and validated activity data comprising, for example, movements, temperature readings, etc., of the elderly person. The AI-enabled device 100 stores the activity data in the memory unit 118 of the AI-enabled device 100 illustrated in FIG. 1. The AI-enabled device 100 provides wireless access of the activity data to designated users, for example, nursing home personnel, caregivers, family members, etc. The AI-enabled device 100 also transmits the activity data to user devices, for example, home user devices, remote user devices, etc., of the designated users via a network, which allows them to monitor the elderly person's condition, health, visitors, and safety and provide care to the elderly person when needed. In another example application, the AI-enabled device 100 is attachable to a hood overlooking a stovetop. The full high-definition (HD) imager 108 of the AI-enabled device 100 shown in FIG. 1, is configured to detect activities occurring at the stovetop. The thermal imager 109 of the AI-enabled device 100 is configured to sense cooking temperature of cookware. If a piece of cookware is left without supervision, and its temperature exceeds a safety threshold for a predetermined period of time, the AI-enabled device 100 generates an alarm sound through the speaker 125 shown in FIG. 1. The AI-enabled device 100 also generates an urgent notification to notify home and remote users immediately.

Consider an example where the mounting bracket 801 with the AI-enabled device 100 securely mounted thereon is attached onto the top corner of a door frame 701 as illustrated in FIG. 8D. The sensor unit 101 of the AI-enabled device 100 illustrated in FIGS. 8A-8B, is manually aligned towards a threshold area of the door 702, for example, in a home environment for easy detection of people, pets, and things passing across the threshold area. In an example, the sensor unit 101 detects and measures an elderly person's movements inside the home environment and body temperature data wirelessly. One or more of the AI analyzers 111, 112, and 113 of the AI-enabled device 100 illustrated in FIG. 1, analyze the detected and measured data and generate activity data. After successful validation of the activity data, the AI-enabled device 100 transmits the validated activity data to the cloud server 207 via the cloud 206 illustrated in FIG. 2, for record storage. To protect the elderly person's privacy, the AI-enabled device 100 does not transmit image and/or video data to the cloud server 207. In an embodiment, the AI-enabled device 100 provides settings to allow users to select the type of data that may be transmitted to the cloud server 207. These settings allow the users to send image and/or video data to the cloud server 207 if required. The mobile application deployed on a user device compiles the elderly person's vital signs, moving path, and body temperature data together with a timed-data chart, allowing local/home users or remote users to know the elderly person's daily activities and wellness and provide peace of mind to the related caring parties.

Figure 9:
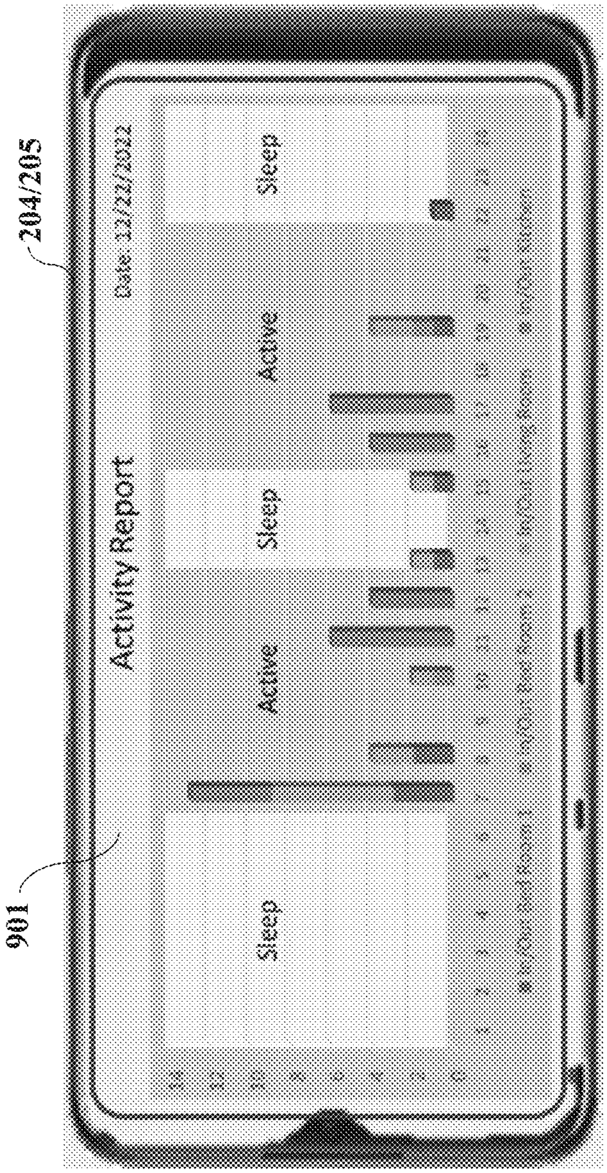
FIG. 9 illustrates an exemplary activity report rendered by the AI-enabled activity detection and monitoring device to a mobile application deployed on a user device.

FIG. 9 illustrates an exemplary activity report 901 rendered by the AI-enabled activity detection and monitoring device 100 shown in FIG. 1, to a mobile application deployed on a user device, for example, a home user device 204 and/or a remote user device 205 shown in FIG. 2. The mobile application deployed on the user device generates an activity report 901 by compiling a detected object's activity data, for example, moving path, location, sleep state, etc., together with a timed-data chart, and transmits the activity report 901 to a user device 204 and/or 205, thereby allowing local/home users or remote users to know the detected object's daily activities. As illustrated in FIG. 9, the activity report 901 comprises activity data, for example, when a detected object such as an elderly person moves in and out of one or more rooms such as bedrooms, a living room, a kitchen, etc., when the detected object is asleep or active, etc.

Figure 10A:
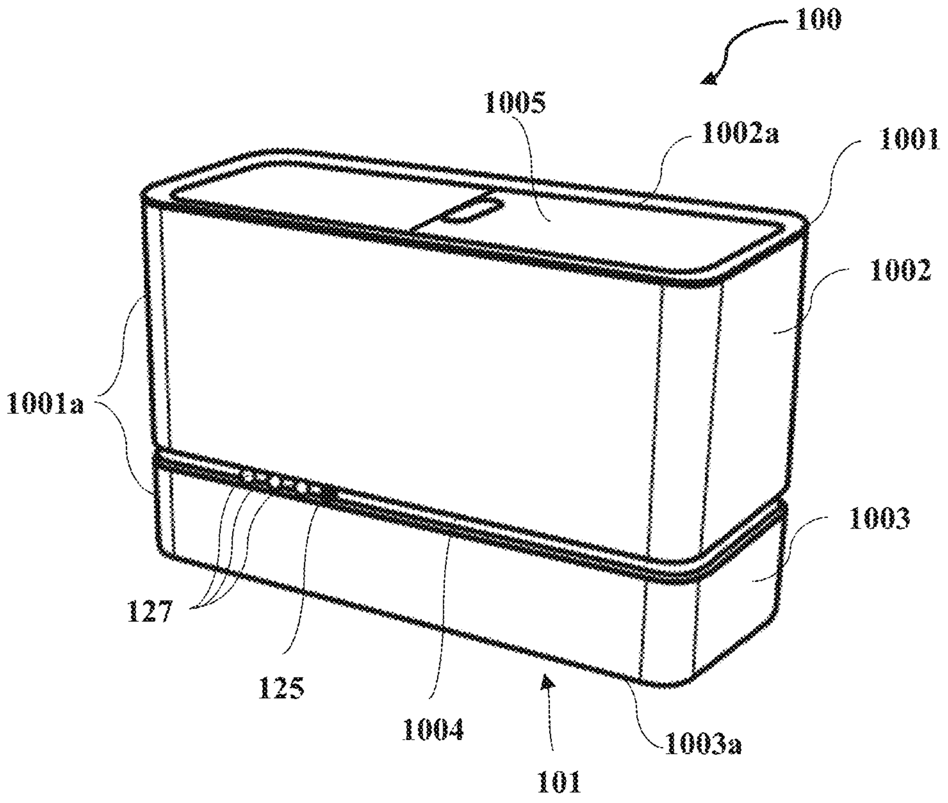
FIG. 10A illustrates a front perspective view of another embodiment of the AI-enabled activity detection and monitoring device.

FIG. 10A illustrates a front perspective view of another embodiment of the AI-enabled activity detection and monitoring device 100. In an embodiment, the AI-enabled device 100 is incorporated in a generally cuboidal housing 1001 as illustrated in FIGS. 10A-10D. The generally cuboidal housing 1001 comprises an upper section 1002 and a lower section 1003 separated by a mid-section 1004. An outer surface 1001*a* of the generally cuboidal housing 1001 is made of a soft touch material for comfortable and convenient handling of the AI-enabled device 100. In an embodiment, the generally cuboidal housing 1001 is made, for example, of plastic and/or metal to ensure rigidity of the generally cuboidal housing 1001. The generally cuboidal housing 1001 accommodates the sensor unit 101, the AI analysis unit 110 (not shown in FIG. 10A), electronic components, a battery (not shown), and other components of the AI-enabled device 100 therewithin. In an embodiment, a battery cover 1005 is disposed on an upper end 1002*a* of the upper section 1002 of the generally cuboidal housing 1001 to cover and protect the battery within the generally cuboidal housing 1001. The array of sensors of the sensor unit 101 is exposed at a lower end 1003*a* of the lower section 1003 of the generally cuboidal housing 1001. Output devices, for example, a speaker 125 for sounding an alarm, light indicators 127 such as light emitting diodes for emitting light indications, etc., are disposed at the mid-section 1004 of the generally cuboidal housing 1001.

Figure 10B:
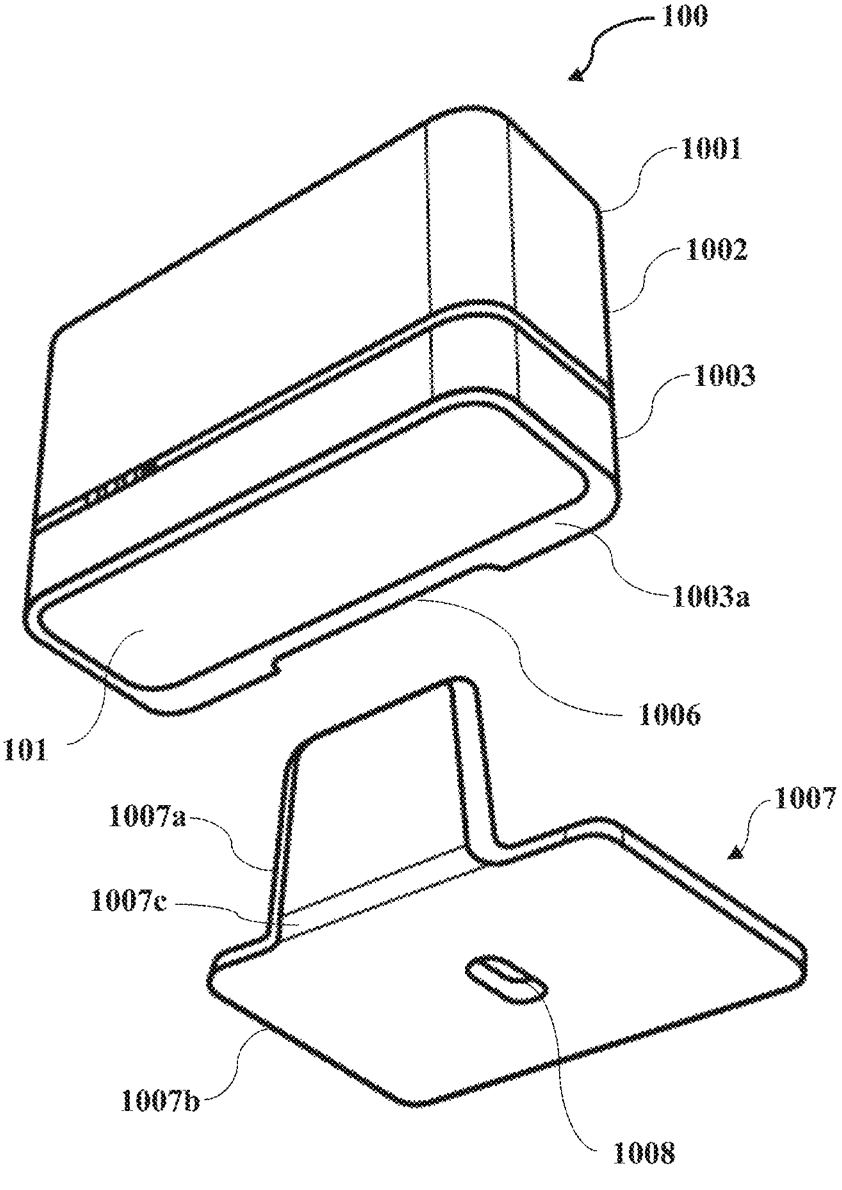
FIG. 10B illustrates a front, bottom perspective view of the embodiment of the AI-enabled activity detection and monitoring device shown in FIG. 10A, showing a mounting bracket for mounting the AI-enabled activity detection and monitoring device to an external member.
Figure 10C:
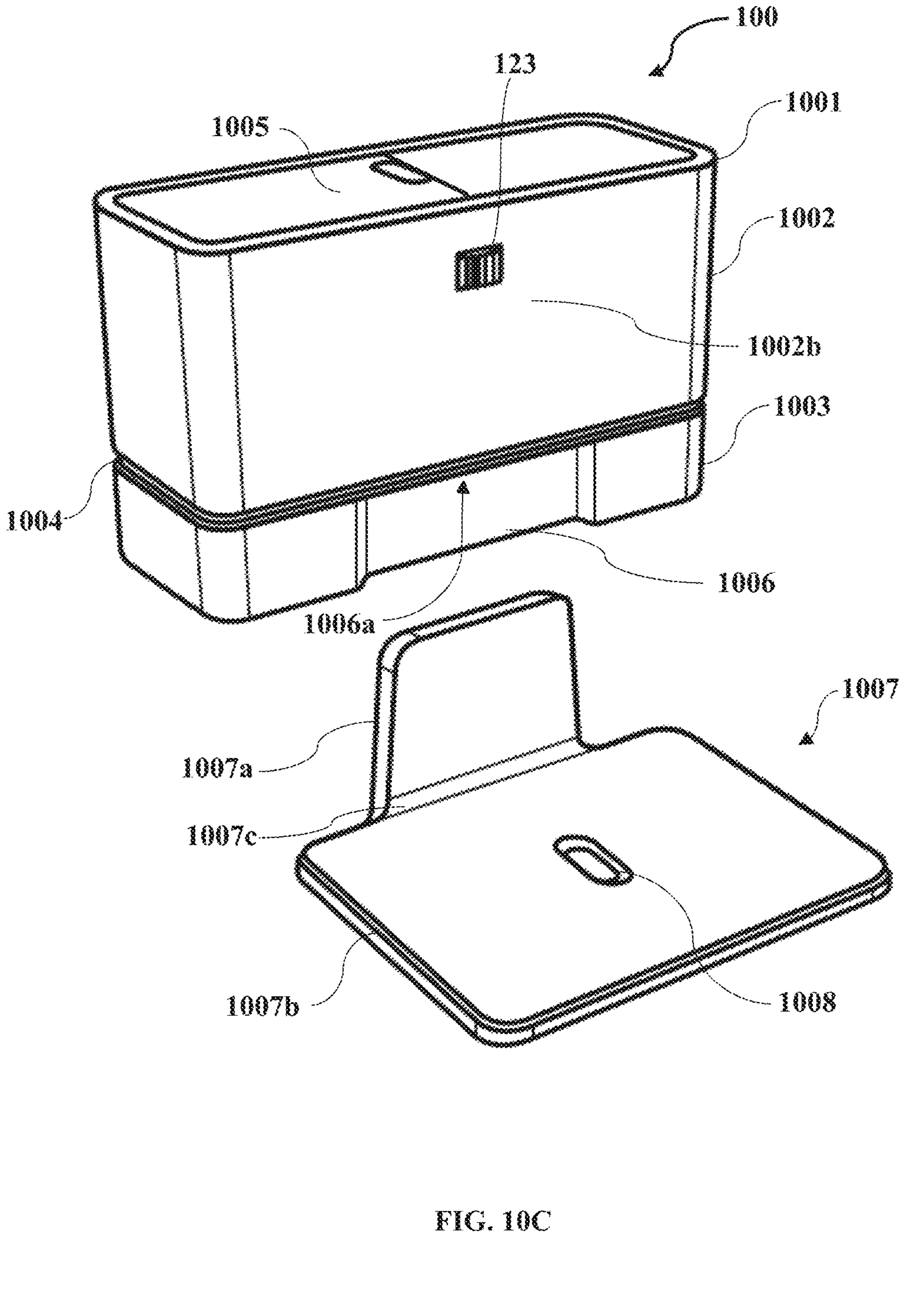
FIG. 10C illustrates a rear perspective view of the embodiment of the AI-enabled activity detection and monitoring device shown in FIG. 10A, showing the mounting bracket for mounting the AI-enabled activity detection and monitoring device to an external member.
Figure 10D:
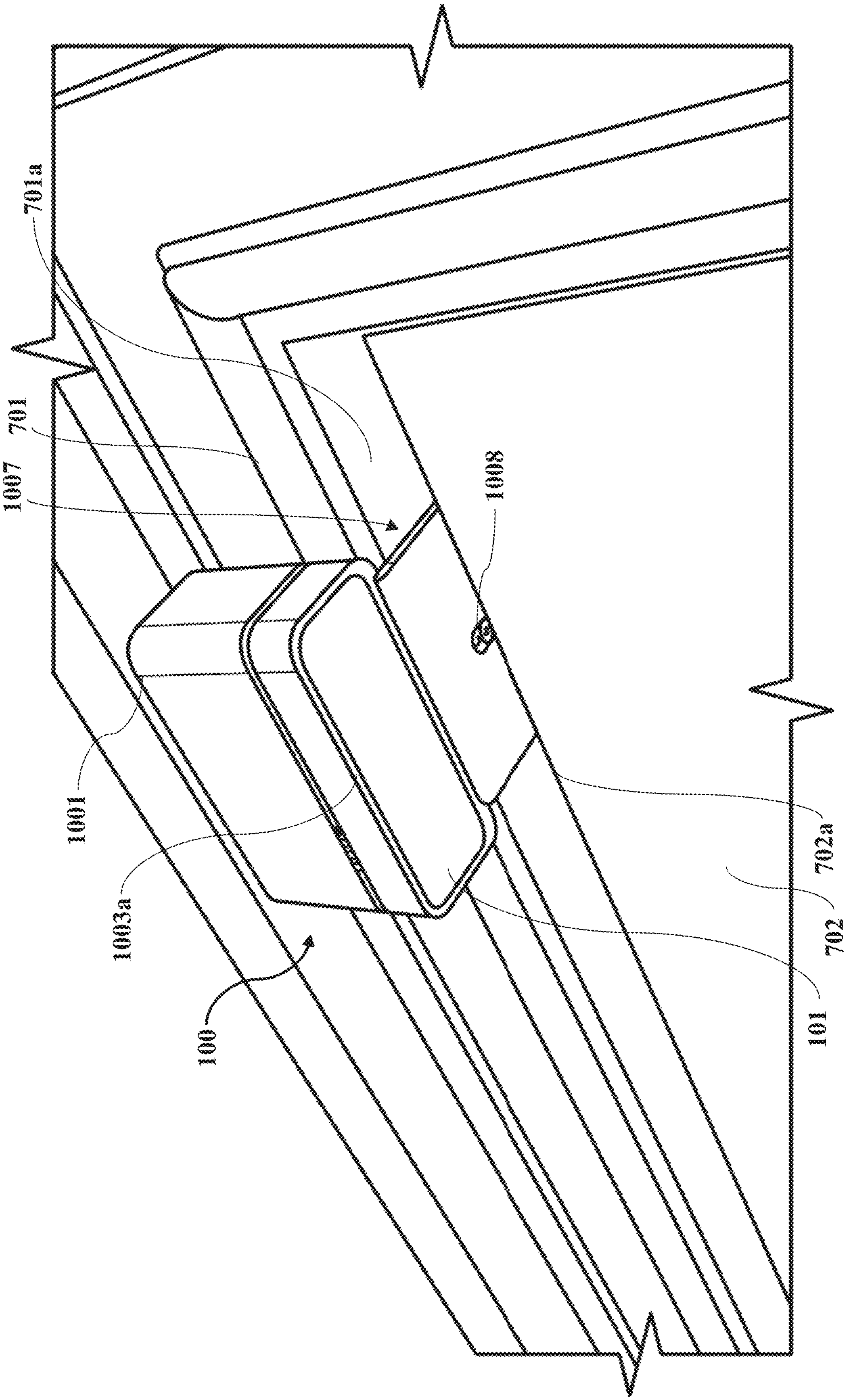
FIG. 10D illustrates a front, bottom perspective view of the embodiment of the AI-enabled activity detection and monitoring device shown in FIG. 10A, with the attached mounting bracket operably coupled to a door frame.

FIGS. 10B-10C illustrate a front, bottom perspective view and a rear perspective view, respectively, of the embodiment of the AI-enabled activity detection and monitoring device 100 shown in FIG. 10A, showing a mounting bracket 1007 for mounting the AI-enabled device 100 to an external member, for example, a door frame 701 shown in FIG. 10D. In an embodiment, the mounting bracket 1007 is made, for example, of bent steel, and is configured in an L-shape comprising a vertical side 1007*a* and a horizontal side 1007*b* as illustrated in FIGS. 10B-10C. The vertical side 1007*a* of the mounting bracket 1007 is substantially perpendicular to the horizontal side 1007*b* and is connected to the horizontal side 1007*b* via a mid-section 1007*c*. The mid-section 1007*c* of the mounting bracket 1007 is bent as illustrated in FIGS. 10B-10C. In an embodiment, the mounting bracket 1007 comprises an opening 1008 disposed on the horizontal side 1007*b* as illustrated in FIGS. 10B-10C. The opening 1008 is configured as a mounting hole to receive a fastener, for example, a screw, for mounting and securing the mounting bracket 1007 to the door frame 701. The sensor unit 101 is positioned on the lower end 1003*a* of the lower section 1003 of the generally cuboidal housing 1001 of the AI-enabled device 100 as illustrated in FIG. 10B, for detecting and monitoring objects and their activities within an operating field of the AI-enabled device 100. In an embodiment, the generally cuboidal housing 1001 further comprises a notch 1006 for receiving and securing the vertical side 1007*a* of the mounting bracket 1007 to a rear surface 1002*b* of the generally cuboidal housing 1001 as illustrated in FIG. 10C. The notch 1006 comprises an opening 1006*a* disposed at the mid-section 1004 of the generally cuboidal housing 1001 for inserting and securing the vertical side 1007*a* of the mounting bracket 1007, thereby securing the AI-enabled device 100 to the mounting bracket 1007. The notch 1006 securely holds the mounting bracket 1007 to the AI-enabled device 100. Also illustrated in FIG. 10C is the open/close switch 123 or a power switch configured for activating and deactivating the AI-enabled device 100.

FIG. 10D illustrates a front, bottom perspective view of the embodiment of the AI-enabled activity detection and monitoring device 100 shown in FIG. 10A, with the attached mounting bracket 1007 operably coupled to a door frame 701. The horizontal side 1007*b* of the mounting bracket 1007 is fastened to a bottom side 701*a* of an upper section of the door frame 701, for example, by inserting a screw into the opening 1008 in the horizontal side 1007*b* of the mounting bracket 1007 and drilling the screw into the bottom side 701*a* of the upper section of the door frame 701. As illustrated in FIG. 10D, the horizontal side 1007*b* of the mounting bracket 1007 is disposed between the bottom side 701*a* of the upper section of the door frame 701 and the upper end 702*a* of the door 702. The AI-enabled device 100 is then slid onto the vertical side 1007*a* of the mounting bracket 1007 through the notch 1006 at the rear of the generally cuboidal housing 1001 of the AI-enabled device 100 illustrated in FIG. 10C, and positioned at the upper section of the door frame 701 and above the door 702. The mounting bracket 1007 is attached to the rear surface 1002*b* of the generally cuboidal housing 1001 illustrated in FIG. 10C, by sliding or inserting the vertical side 1007*a* of the mounting bracket 1007 into the notch 1006 at the rear of the generally cuboidal housing 1001, and pushing the vertical side 1007*a* of the mounting bracket 1007 further into the opening 1006*a* of the notch 1006, for securing the AI-enabled device 100 to the mounting bracket 1007. In an embodiment, the vertical side 1007*a* of the mounting bracket 1007 is magnetically attached to the rear surface 1002*b* of the generally cuboidal housing 1001 using strong magnets. The AI-enabled device 100, that is positioned at the upper section of the door frame 701 and above the door 702 with the exposed sensor unit 101, detects and monitors objects crossing the threshold of the door 702 and their activities within an operating field of the AI-enabled device 100 as disclosed in the description of FIG. 7 and FIG. 8D.

Figure 11A:
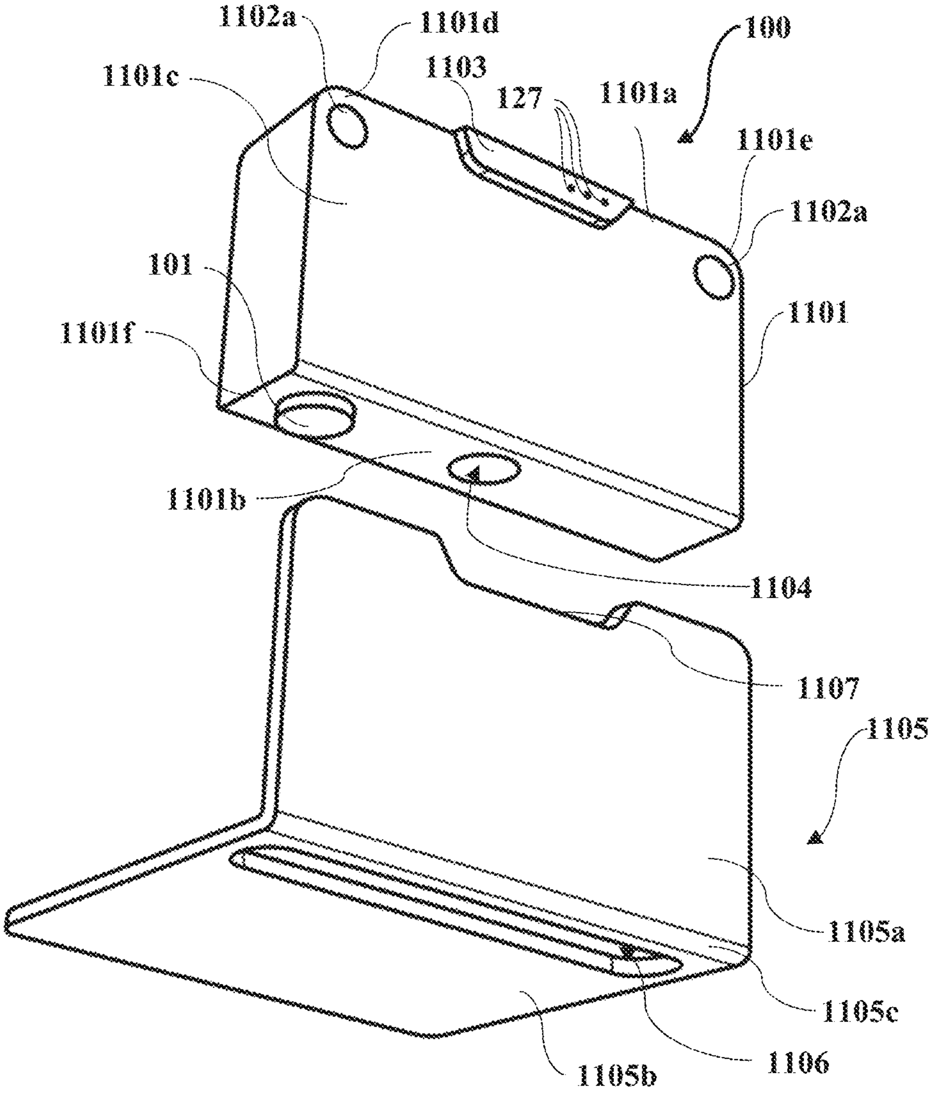
FIG. 11A illustrates a front, bottom perspective view of another embodiment of the AI-enabled activity detection and monitoring device, showing an embodiment of a mounting bracket for mounting the AI-enabled activity detection and monitoring device to an external member.
Figure 11B:
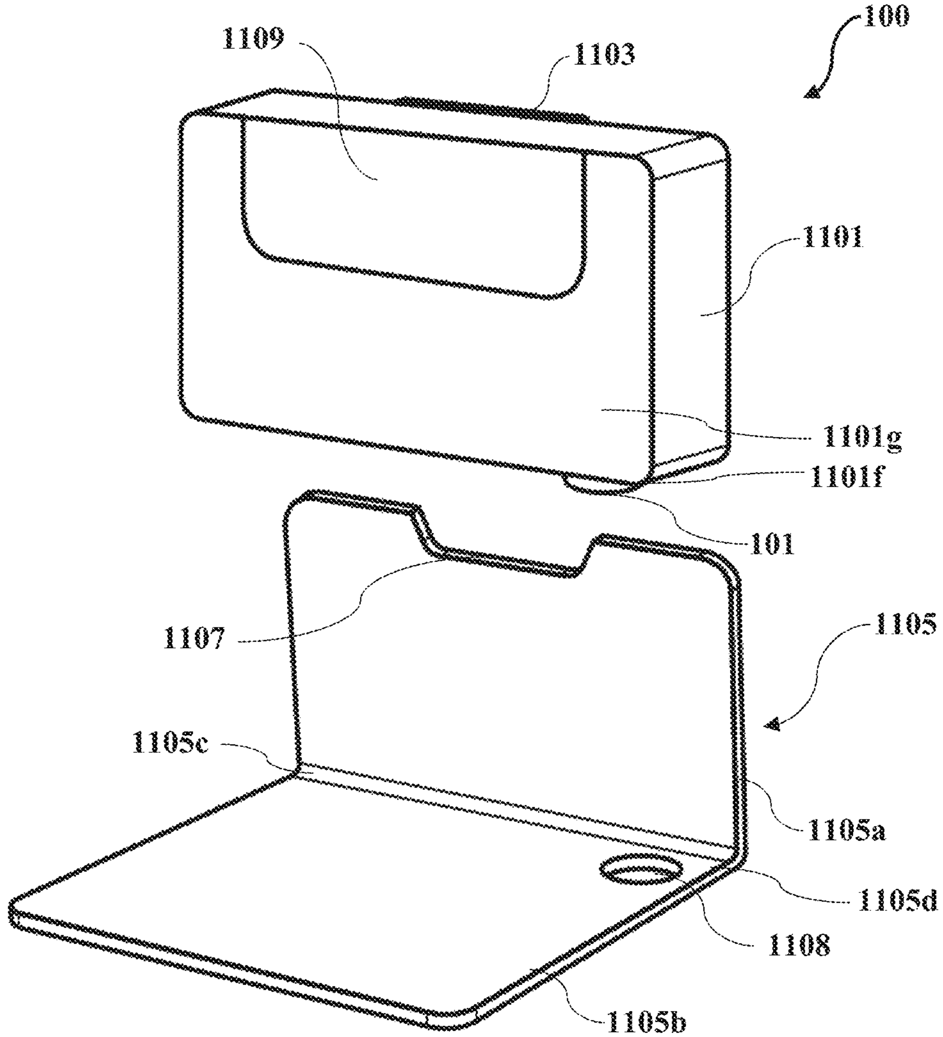
FIG. 11B illustrates a rear perspective view of another embodiment of the AI-enabled activity detection and monitoring device, showing another embodiment of the mounting bracket for mounting the AI-enabled activity detection and monitoring device to an external member.

FIGS. 11A-11B illustrate a front, bottom perspective view and a rear perspective view, respectively, of other embodiments of the AI-enabled activity detection and monitoring device 100, showing different embodiments of a mounting bracket 1105 for mounting the AI-enabled device 100 to an external member (not shown). In an embodiment, the AI-enabled device 100 is incorporated in a generally cuboidal housing 1101 as illustrated in FIGS. 11A-11B. Output devices, for example, light indicators 127, of the AI-enabled device 100 are disposed on a panel 1103 positioned on a front surface 1101*c* at the upper end 1101*a* of the generally cuboidal housing 1101. In an embodiment, the sensor unit 101 of the AI-enabled device 100 is configured to protrude from a lower end 1101*b* of the generally cuboidal housing 1101, at one of the bottom corners, for example, 1101*f*, of the generally cuboidal housing 1101. In an embodiment as illustrated in FIG. 11A, the sensor unit 101 and a locking assembly 1400 exemplarily illustrated in FIG. 14B are integrated in a single AI-enabled device 100. In this embodiment illustrated in FIG. 11A, the generally cuboidal housing 1101 comprises a generally circular opening 1104 configured on the lower end 1101*b* of the generally cuboidal housing 1101 for allowing a bolt member 1408 of the locking assembly 1400 illustrated in FIG. 14B, to move outwards and engage a linking member 1406 to lock an external member, for example, a door, and to move inwards and disengage from the linking member 1406 to unlock the external member. In an embodiment, the mounting bracket 1105 is made, for example, of bent steel, and is configured in an L-shape comprising a vertical side 1105*a* and a horizontal side 1105*b* as illustrated in FIGS. 11A-11B. The vertical side 1105*a* of the mounting bracket 1105 is substantially perpendicular to the horizontal side 1105*b* and is connected to the horizontal side 1105*b* via a mid-section 1105*c*. The mid-section 1105*c* of the mounting bracket 1105 is bent as illustrated in FIGS. 11A-11B.

In an embodiment as illustrated in FIG. 11A, the mounting bracket 1105 comprises an elongate opening 1106 disposed on the horizontal side 1105*b*, proximal to the mid-section 1105*c* of the mounting bracket 1105. The elongate opening 1106 of the mounting bracket 1105 is configured to receive the sensor unit 101 that protrudes from the lower end 1101*b* of the generally cuboidal housing 1101 of the AI-enabled device 100. Furthermore, when the mounting bracket 1105 is attached to the generally cuboidal housing 1101, the generally circular opening 1104 of the generally cuboidal housing 1101 is exposed in the elongate opening 1106 of the mounting bracket 1105, thereby allowing the bolt member 1408 of the locking assembly 1400 exemplarily illustrated in FIG. 14B, to move outwards and engage the linking member 1406 to lock an external member, for example, a door, and to move inwards and disengage from the linking member 1406 to unlock the external member. In another embodiment comprising the sensor unit 101 without the locking assembly 1400 as illustrated in FIG. 11B, instead of the elongated opening 1106, the mounting bracket 1105 comprises a generally circular opening 1108 disposed on the horizontal side 1105*b*, proximal to the mid-section 1105*c* of the mounting bracket 1105, at a corner 1105*d* of the horizontal side 1105*b*. The generally circular opening 1108 aligns with and receives the sensor unit 101 that protrudes from the lower end 1101*b* of the generally cuboidal housing 1101 of the AI-enabled device 100.

In an embodiment, the vertical side 1105*a* of the mounting bracket 1105 illustrated in FIGS. 11A-11B, is magnetically attached to the front surface 1101*c* of the generally cuboidal housing 1101 of the AI-enabled device 100 using strong magnets 1102*a* and 1102*b*. The strong magnets 1102*a* and 1102*b* are disposed on upper corners 1101*d* and 1101*e* of the generally cuboidal housing 1101, respectively, for attaching the vertical side 1105*a* of the mounting bracket 1105 to the front surface 1101*c* of the generally cuboidal housing 1101. In an embodiment, the strong magnets 1102*a* and 1102*b* are hidden beneath the front surface 1101*c* of the generally cuboidal housing 1101. The strong magnets 1102*a* and 1102*b* securely hold the generally cuboidal housing 1101 to the mounting bracket 1105. In an embodiment as illustrated in FIGS. 11A-11B, the mounting bracket 1105 comprises a notch 1107 configured to align with and secure to the panel 1103 of the AI-enabled device 100 when the mounting bracket 1105 is attached to the generally cuboidal housing 1101 of the AI-enabled device 100. The panel 1103 centers the generally cuboidal housing 1101 of the AI-enabled device 100 on the mounting bracket 1105. In an embodiment, a covering element, for example, a battery door 1109, for covering internal batteries of the AI-enabled device 100, is disposed on a rear surface 1101*g* of the generally cuboidal housing 1101 as illustrated in FIG. 11B. The battery door 1109 is configured to accommodate, for example, two CR2 batteries, within the generally cuboidal housing 1101 for powering the AI-enabled device 100.

Figure 12A:
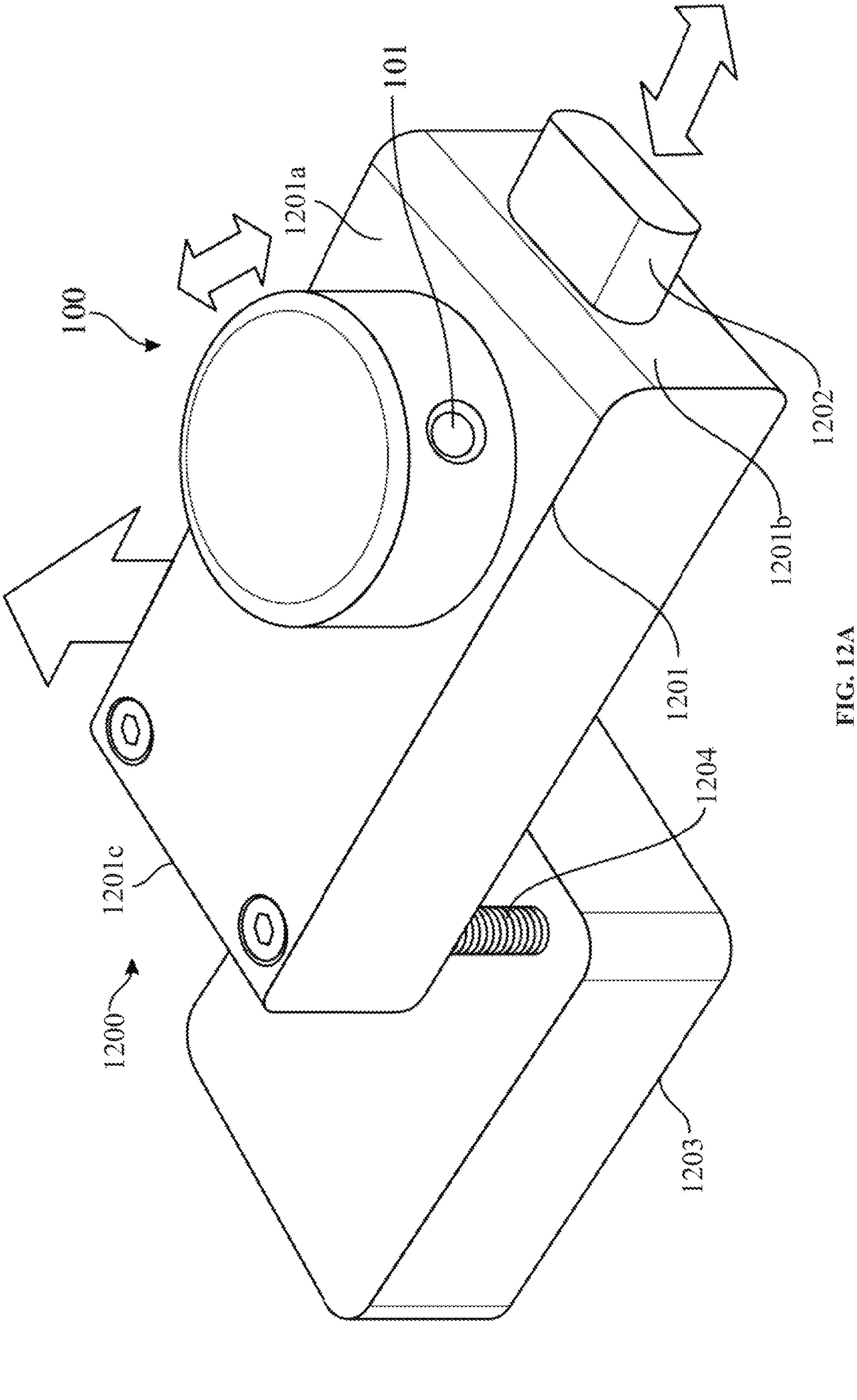
FIG. 12A illustrates a perspective view of an embodiment of the AI-enabled activity detection and monitoring device operably coupled to a lock housing of an embodiment of a locking assembly.

FIG. 12A illustrates a perspective view of an embodiment of the AI-enabled activity detection and monitoring device 100 operably coupled to a lock housing 1201 of an embodiment of a locking assembly 1200. In an embodiment, the AI-enabled device 100 is configured to be implemented with a locking assembly 1200, for example, an electronic bolt lock. In this embodiment, the AI-enabled device 100 operates as a wireless controlled smart lockbox and entry monitor. As illustrated in FIG. 12A, the locking assembly 1200 comprises a lock housing 1201 and a mounting bracket 1203. One end 1201*c* of the lock housing 1201 is adjustably attached to the mounting bracket 1203 using fasteners 1204, for example, screws, bolts, etc. The AI-enabled device 100 is operably coupled to an upper surface 1201*a* of the lock housing 1201 as illustrated in FIG. 12A. Depth of the AI-enabled device 100 is adjusted by adjusting the attachment between the lock housing 1201 and the mounting bracket 1203. Furthermore, the AI-enabled device 100 is adjustable on the upper surface 1201*a* of the lock housing 1201 to align the sensor unit 101 in a direction suitable for detecting and monitoring objects and their activities. For example, the sensor unit 101 is aligned to obtain a suitable camera angle for capturing images of the objects in the operating field of the AI-enabled device 100. A bolt member 1202 extends outwardly from the other end 1201*b* of the lock housing 1201. The bolt member 1202 is configured to move in an outward direction and an inward direction to engage and disengage from a recess 1206 of a linking member 1205 of the locking assembly 1200 as illustrated in FIG. 12B.

Figure 12B:
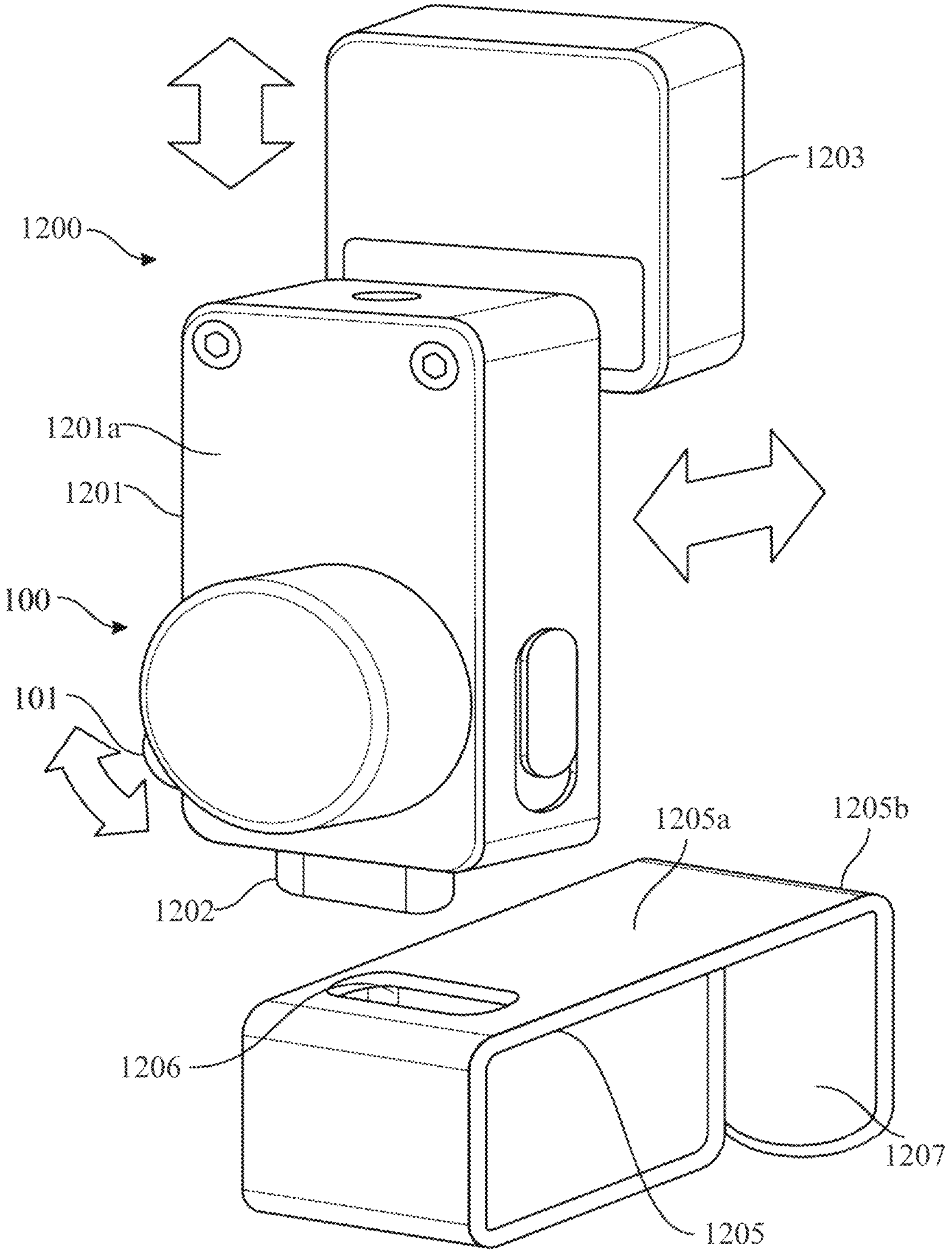
FIG. 12B illustrates a perspective view of the locking assembly with the AI-enabled activity detection and monitoring device shown in FIG. 12A, showing an embodiment of a linking member of the locking assembly.

FIG. 12B illustrates a perspective view of the locking assembly 1200 with the AI-enabled activity detection and monitoring device 100 shown in FIG. 12A, showing an embodiment of the linking member 1205 of the locking assembly 1200. As illustrated in FIG. 12B, the locking assembly 1200 further comprises a linking member 1205 configured to be operably coupled to an external member, for example, a door, for facilitating locking of the external member. The linking member 1205 comprises a recess 1206 extending downwardly from an upper surface 1205*a* of the linking member 1205. The recess 1206 of the linking member 1205 is configured to receive and secure the bolt member 1202 extending from the lock housing 1201 to lock the external member. In an embodiment, the linking member 1205 further comprises a hook element 1207 extending from one end 1205*b* of the linking member 1205. The hook element 1207 is configured to hook onto the external member for facilitating locking of the external member. The AI-enabled device 100 is operably coupled to an internal lock mechanism (not shown) that is connected to the bolt member 1202 of the locking assembly 1200.

Figure 12C:
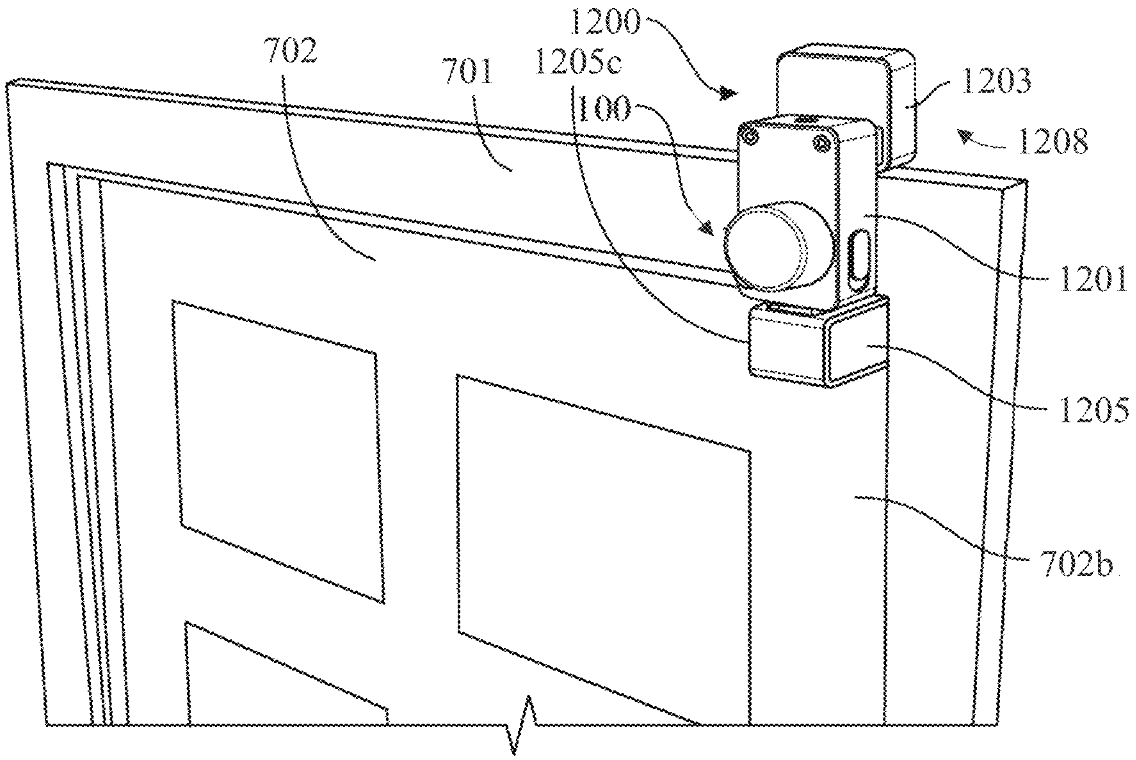
FIGS. 12C-12D illustrate perspective views showing a locked state of the locking assembly with the AI-enabled activity detection and monitoring device.
Figure 12D:
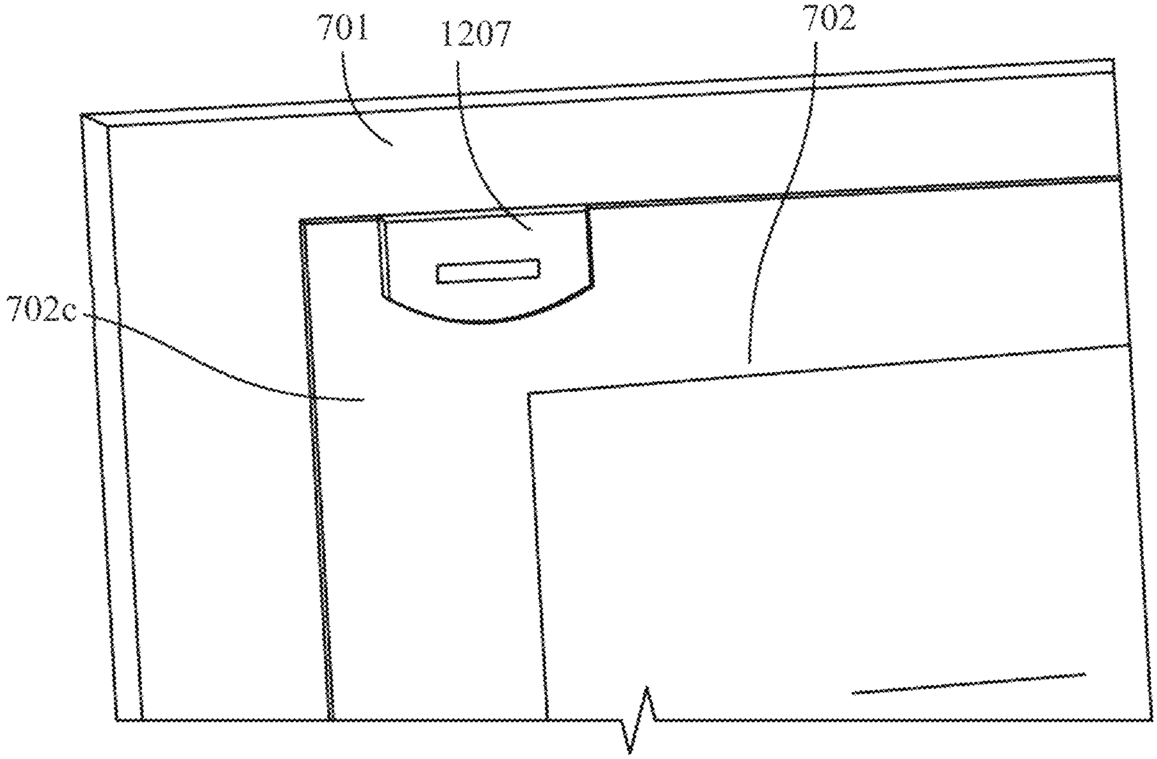

FIGS. 12C-12D illustrate perspective views showing a locked state of the locking assembly 1200 with the AI-enabled activity detection and monitoring device 100. In an embodiment, the AI-enabled device 100 is operably coupled to the locking assembly 1200 positioned on or proximal to a barrier, for example, a door 702, for detecting and monitoring a state of the door 702 and objects and their activities within an operating field of the AI-enabled device 100. As illustrated in FIG. 12C, the mounting bracket 1203 of the locking assembly 1200 is attached to a wall surface 1208 above a door frame 701. In an embodiment, the mounting bracket 1203 of the locking assembly 1200 is attached to an inner surface of the door frame 701. The lock housing 1201 with the AI-enabled device 100 coupled thereto extends downwardly from the mounting bracket 1203 and is disposed on an upper section of the door frame 701 as illustrated in FIG. 12C. The linking member 1205 of the locking assembly 1200 is hooked onto and attached to an upper corner of the door 702 such that one end 1205*c* of the linking member 1205 is disposed on one side 702*b* of the door 702 as illustrated in FIG. 12C, while the hook element 1207 is disposed on the opposing side 702*c* of the door 702 as illustrated in FIG. 12D. The recess 1206 of the linking member 1205 illustrated in FIG. 12B, is aligned with the bolt member 1202 of the lock housing 1201 to allow the bolt member 1202 to engage and disengage from the recess 1206 during locking and unlocking of the locking assembly 1200, respectively.

In an embodiment, the AI-enabled device 100 is operably coupled to an internal lock mechanism (not shown) disposed in the lock housing 1201. The AI-enabled device 100 is configured to activate and deactivate the internal lock mechanism for locking and unlocking the door 702, respectively, based on the state of the door 702. For example, when the sensor unit 101, in operable communication with one or more of the AI analyzers 111, 112, and 113 of the AI-enabled device 100, illustrated in FIG. 1 and FIGS. 8A-8B, detects a closed, unlocked state of the door 702, the controller 115 sends a command signal to the internal lock mechanism of the locking assembly 1200 via the output port 120 illustrated in FIG. 1, to move the bolt member 1202 in an outward direction, causing the bolt member 1202 to engage the recess 1206 of the linking member 1205 and lock the locking assembly 1200, and in turn, lock the door 702 against the door frame 701. The AI-enabled device 100 implemented with the locking assembly 1200 operates as a lockbox with an entry monitor. This embodiment of the AI-enabled device 100 is useful in commercial establishments, for example, hotels and other lodging establishments, which provide self check-in options to guests by digitizing the process and ensuring convenient management. For example, an owner of a lodging establishment may position the locking assembly 1200 with the AI-enabled device 100 mounted thereon at a door 702 of a lodging space such as a hotel room. The owner may then send an access key for a booking to a guest via a mobile application deployed on the guest's user device. The access key is configured to deactivate the internal lock mechanism of the locking assembly 1200 and unlock the door 702. Deactivation of the internal lock mechanism of the locking assembly 1200 moves the bolt member 1202 in an inward direction, causing the bolt member 1202 to disengage from the recess 1206 of the linking member 1205 and unlock the locking assembly 1200, and in turn, unlock the door 702 against the door frame 701. The guest can unlock the door 702 of the lodging space using the access key and self check-in. The AI-enabled device 100 monitors the number of people entering the lodging space and transmits a notification to the owner's user device regarding the number of people that entered the lodging space with the guest at check-in to verify whether the number of people matches the booking.

In the embodiment of the AI-enabled device 100 operably coupled to the locking assembly 1200, one or more of the AI analyzers 111, 112, and 113 of the AI analysis unit 110 detect and identify objects entering, exiting, and passing by the door 702, in the operating field of the AI-enabled device 100; distinguish between the identified objects; distinguish non-related sensor data; determine and monitor the state of the door 702 and activities of the identified objects; and validate the determined state of the door 702 and the determined activities. On successful validation, one or more of the AI analyzers 111, 112, and 113 trigger a command to activate and deactivate the internal lock mechanism of the locking assembly 1200 for locking and unlocking the door 702, respectively, based on the state of the door 702 as disclosed above.

Figure 13A:
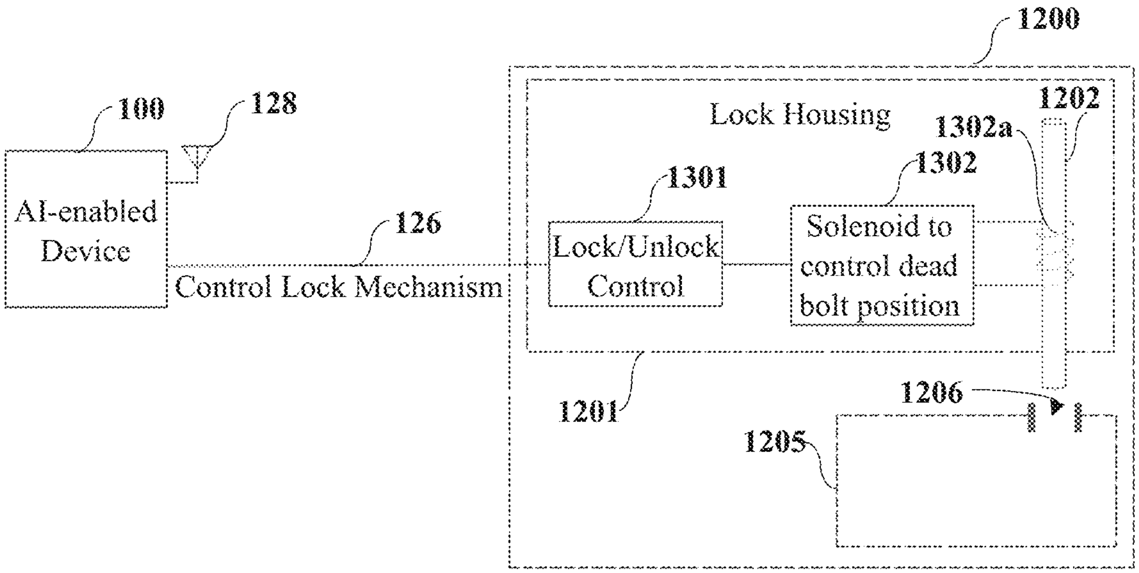
FIG. 13A illustrates a block diagram showing the AI-enabled activity detection and monitoring device operably coupled to an embodiment of the locking assembly via a control lock mechanism.

FIG. 13A illustrates a block diagram showing the AI-enabled activity detection and monitoring device 100 operably coupled to an embodiment of the locking assembly 1200 via a control lock mechanism 126. As illustrated in FIG. 13A, the locking assembly 1200 comprises a lock housing 1201 and a linking member 1205 as disclosed in the descriptions of FIGS. 12A-12D. In an embodiment, the lock housing 1201 comprises an internal lock mechanism, namely, a lock/unlock control unit 1301, and a solenoid 1302. The lock/unlock control unit 1301 is operably coupled to the control lock mechanism 126 and is configured to receive signals from the AI-enabled device 100 via the control lock mechanism 126 to activate or deactivate the solenoid 1302. The solenoid 1302 is configured to control a dead bolt position of the bolt member 1202 of the locking assembly 1200. The solenoid 1302 is electrically connected to the bolt member 1202, for example, via a coil 1302*a* made of copper wire. The linking member 1205 is attached to an external member, for example, a door. The linking member 1205 comprises a recess 1206 for receiving and securing the bolt member 1202 extending from the lock housing 1201 to lock the door. To unlock the door, the AI-enabled device 100 sends a signal to the lock/unlock control unit 1301 of the lock housing 1201 via the control lock mechanism 126 to power up and activate the solenoid 1302. Activation of the solenoid 1302 energizes and magnetizes the coil 1302*a* around the bolt member 1202, thereby magnetically drawing the bolt member 1202 in an inward direction towards the center of the coil 1302*a* and disengaging the bolt member 1202 from the recess 1206 of the linking member 1205, and in turn, unlocking the door. To lock the door, the AI-enabled device 100 sends another signal to the lock/unlock control unit 1301 of the lock housing 1201 via the control lock mechanism 126 to deactivate the solenoid 1302. Deactivation of the solenoid 1302 deenergizes and demagnetizes the coil 1302*a* around the bolt member 1202, thereby moving the bolt member 1202 in an outward direction away from the center of the coil 1302*a* to engage the recess 1206 of the linking member 1205 and lock the door.

Figure 13B:
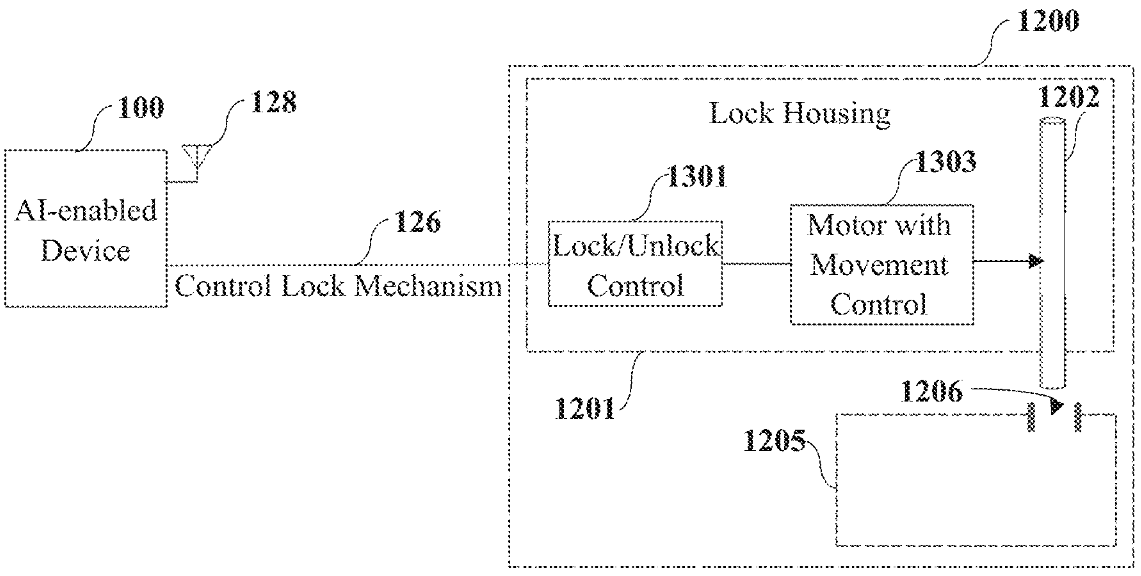
FIG. 13B illustrates a block diagram showing the AI-enabled activity detection and monitoring device operably coupled to another embodiment of the locking assembly via a control lock mechanism.

FIG. 13B illustrates a block diagram showing the AI-enabled activity detection and monitoring device 100 operably coupled to another embodiment of the locking assembly 1200 via a control lock mechanism 126. As illustrated in FIG. 13B, the locking assembly 1200 comprises a lock housing 1201 and a linking member 1205 as disclosed in the descriptions of FIGS. 12A-12D. In this embodiment, the lock housing 1201 comprises a lock/unlock control unit 1301 and a motor 1303 with movement control. The motor 1303 is configured to control the upward and downward movement of the bolt member 1202. The motor 1303 is controlled and directed by signals from the AI-enabled device 100. The lock/unlock control unit 1301, that is operably coupled to the control lock mechanism 126, is configured to receive a signal from the AI-enabled device 100 via the control lock mechanism 126 to move the motor 1303 in opposing directions. When a user, using a home user device or a remote user device, sends a signal to the AI-enabled device 100 to unlock a door, the AI-enabled device 100 sends a command signal to the lock/unlock control unit 1301 of the lock housing 1201 via the control lock mechanism 126 to power up and activate the motor 1303. In an embodiment, the motor 1303 is operably coupled to the bolt member 1202 via a gear system (not shown). Activation of the motor 1303 moves the gear system that is operably coupled to the bolt member 1202 in one direction, causing the bolt member 1202 to move in an inward direction, disengage from the recess 1206 of the linking member 1205, and unlock the door. When the user, using the home user device or the remote user device, sends a signal to the AI-enabled device 100 to lock the door, or when the sensor unit 101, in operable communication with one or more of the AI analyzers 111, 112, and 113 of the AI-enabled device 100 illustrated in FIG. 1 and FIGS. 8A-8B, detects a closed, unlocked state of the door, the AI-enabled device 100 sends a command signal to the lock/unlock control unit 1301 of the lock housing 1201 via the control lock mechanism 126 to move the motor 1303 in an opposing direction. Movement of the motor 1303 in the opposing direction moves the gear system in the opposing direction, causing the bolt member 1202 to move in an outward direction, engage the recess 1206 of the linking member 1205, and lock the door.

Figure 14A:
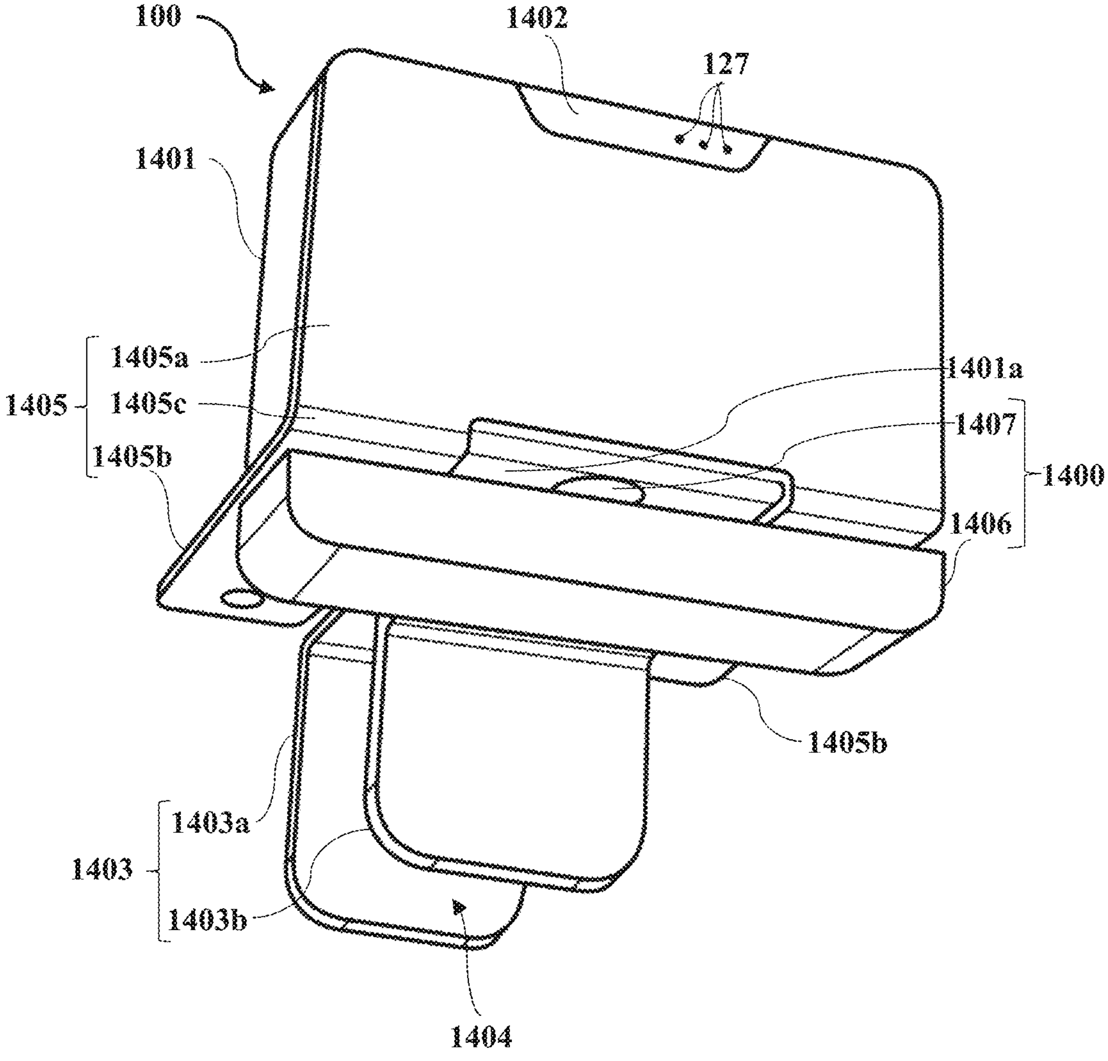
FIG. 14A illustrates a front perspective, assembled view of another embodiment of the AI-enabled activity detection and monitoring device operably coupled to another embodiment of a linking member of a locking assembly.
Figure 14B:
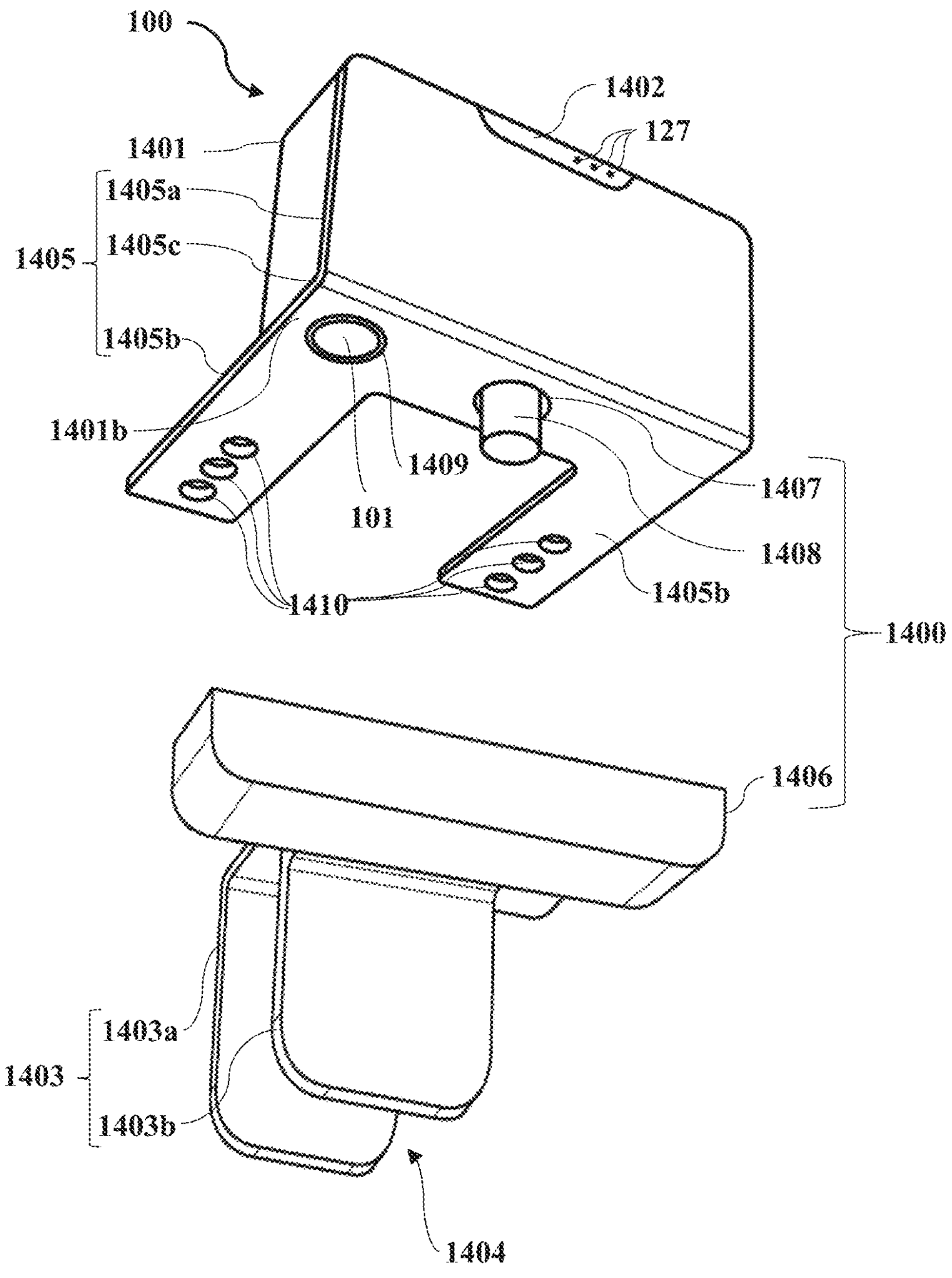
FIG. 14B illustrates a front, bottom perspective view of the embodiment of the AI-enabled activity detection and monitoring device shown in FIG. 14A, showing an embodiment of a locking assembly.

FIG. 14A illustrates a front perspective, assembled view of another embodiment of the AI-enabled activity detection and monitoring device 100 operably coupled to another embodiment of a linking member 1406 of a locking assembly 1400. In an embodiment, the AI-enabled device 100 is incorporated in a generally cuboidal housing 1401 as disclosed in the description of FIGS. 11A-11B. FIG. 14A illustrates a panel 1402 comprising light indicators 127 configured to provide light indications. A mounting bracket 1405 made, for example, of bent steel, is attached to the generally cuboidal housing 1401, for example, using strong magnets as disclosed in the description of FIGS. 11A-11B. In an embodiment, the mounting bracket 1405 is configured in an L-shape comprising a vertical side 1405*a* and a pair of horizontal arms 1405*b*, separated by a mid-section 1405*c*. The vertical side 1405*a* of the mounting bracket 1405 is substantially perpendicular to the pair of horizontal arms 1405*b*. In an embodiment, the generally cuboidal housing 1401 comprises a generally circular opening 1407 configured on a lower end 1401*a* of the generally cuboidal housing 1401 for allowing a bolt member 1408 of the locking assembly 1400 illustrated in FIG. 14B, to move outwards and engage with the linking member 1406 to lock an external member, for example, a door. When the mounting bracket 1405 is attached to the generally cuboidal housing 1401, the generally circular opening 1407 of the generally cuboidal housing 1401 is exposed in a space defined between the horizontal arms 1405*b* of the mounting bracket 1405. In an embodiment, the locking assembly 1400 further comprises a hook element 1403 attached to the linking member 1406. The hook element 1403 comprises opposing plates 1403*a* and 1403*b* configured to hook onto the external member and attach the linking member 1406 to the external member, thereby facilitating locking of the external member. In an example where the external member is a door, the hook element 1403 is configured as an over-door hook for receiving and securely attaching to the upper end of the door within a space 1404 defined between the opposing plates 1403*a* and 1403*b* of the hook element 1403.

FIG. 14B illustrates a front, bottom perspective view of the embodiment of the AI-enabled activity detection and monitoring device 100 shown in FIG. 14A, showing an embodiment of the locking assembly 1400. In an embodiment, the locking assembly 1400 comprises an internal lock housing (not shown) with a solenoid-driven or motor-driven bolt member 1408 similar to the lock housing 1201 illustrated in FIGS. 13A-13B. The sensor unit 101 and the AI analysis unit 110 of the AI-enabled device 100 shown in FIG. 1, are operably coupled to the locking assembly 1400 via the control lock mechanism 126 illustrated in FIGS. 13A-13B. In an embodiment as illustrated in FIG. 14B, when the mounting bracket 1405 is attached to a front surface of the generally cuboidal housing 1401, the sensor unit 101, disposed at a lower corner 1401*b* of the generally cuboidal housing 1401, protrudes through a generally circular opening 1409 configured on one of the horizontal arms 1405*b* of the mounting bracket 1405. In an embodiment, the mounting bracket 1405 further comprises screw holes 1410 configured on the horizontal arms 1405*b*. The screw holes 1410 are configured to attach the horizontal arms 1405*b* of the mounting bracket 1405, for example, to a bottom side 701*a* of an upper section of a door frame 701 as illustrated in FIGS. 15A-15C and FIG. 16C, using fasteners, for example, screws. The mounting bracket 1405 further comprises another generally circular opening 1407 configured to allow movement of the bolt member 1408 of the locking assembly 1400 in an outward direction and an inward direction into and out of a recess 1411 of the linking member 1406 illustrated in FIG. 14C, for locking and unlocking a door 702, respectively. The bolt member 108 is configured to pass through the generally circular opening 1407 of the mounting bracket 1405 for reducing stress on the generally cuboidal housing 1401. The door 702 is attached to the linking member 1406 via the hook element 1403.

Figure 14C:
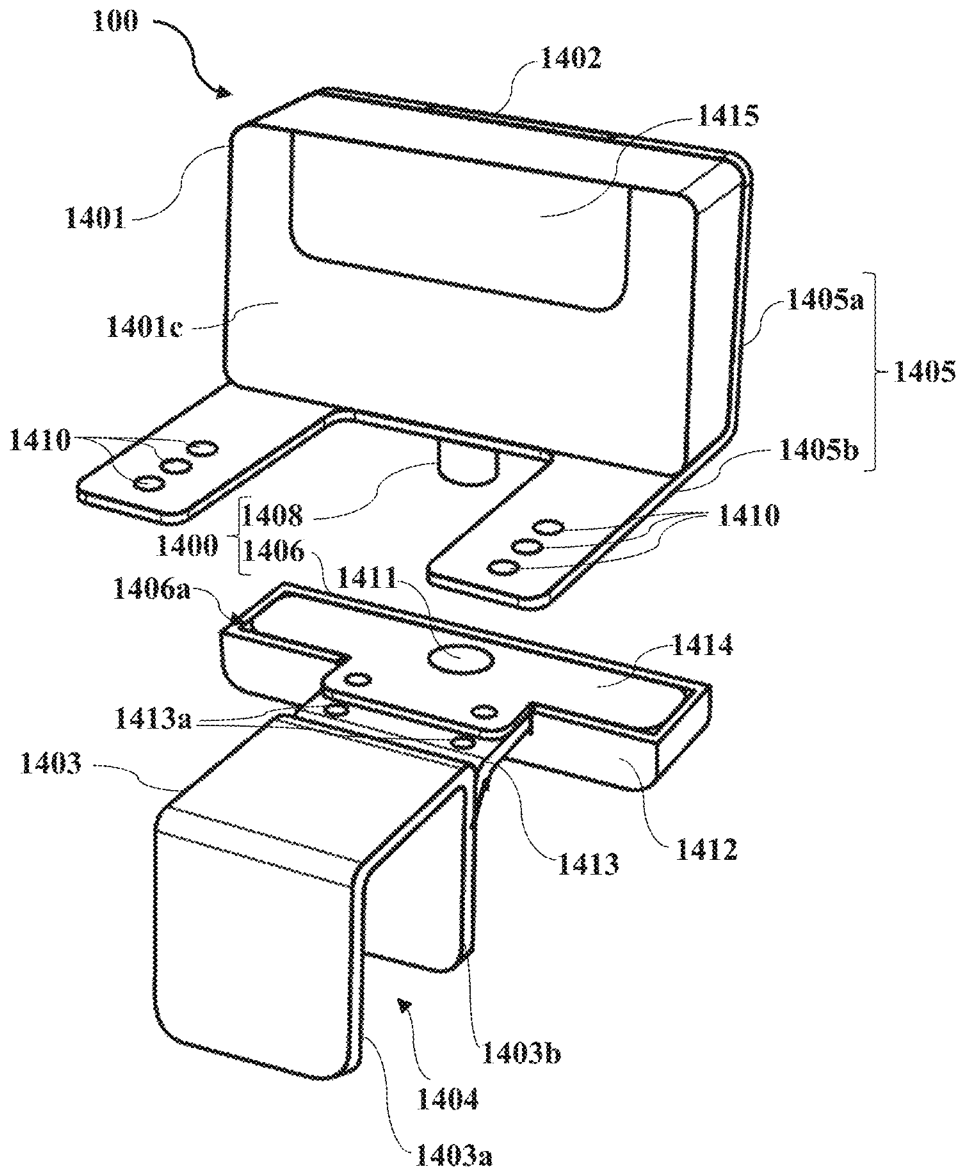
FIG. 14C illustrates a rear, top perspective view of the embodiment of the AI-enabled activity detection and monitoring device shown in FIG. 14A, showing the embodiment of the locking assembly.

FIG. 14C illustrates a rear, top perspective view of the embodiment of the AI-enabled activity detection and monitoring device 100 shown in FIG. 14A, showing the embodiment of the locking assembly 1400. The rear perspective view in FIG. 14C illustrates a covering element, for example, a battery door 1415, disposed on a rear surface 1401*c* of the generally cuboidal housing 1401 of the AI-enabled device 100. The battery door 1415 covers and protects one or more batteries of the AI-enabled device 100, accommodated in the generally cuboidal housing 1401. The rear perspective view in FIG. 14C further illustrates the hook element 1403 attached to the linking member 1406 of the locking assembly 1400. The hook element 1403 comprises opposing plates 1403*a* and 1403*b* defining a space 1404 therebetween. The space 1404 between the opposing plates 1403*a* and 1403*b* of the hook element 1403 accommodates an upper end of an external member, for example, a door, thereby allowing the hook element 1403 to hook onto the door and attach the linking member 1406 to the door. In an embodiment, the hook element 1403 is attached to the linking member 1406 via a connecting bracket 1413. In an embodiment, the connecting bracket 1413 comprises openings 1413*a* configured to secure the linking member 1406 onto the hook element 1403 using fasteners, for example, screws. In another embodiment, the openings 1413*a* of the connecting bracket 1413 allow for a multi-position horizontal adjustment, for example, a 3-position horizontal adjustment, of the linking member 1406. In an embodiment, a covering element 1414 is disposed in a receptacle 1406*a* of the linking member 1406 for covering the sensor unit 101 of the AI-enabled device 100, when the door, to which the linking member 1406 is attached via the hook element 1403, is closed. The covering element 1414 comprises a generally circular recess 1411 in fluid communication with the receptacle 1406*a* of the linking member 1406. The recess 1411 in the linking member 1406 is configured to receive the bolt member 1408 of the locking assembly 1400 for locking the door. In an embodiment, strong magnets (not shown) are positioned in the receptacle 1406*a* of the linking member 1406 at a location 1412 shown in FIG. 14C, for magnetically attaching the linking member 1406 to the mounting bracket 1405 when the door is closed as illustrated in FIGS. 16B-16C.

Figure 15A:
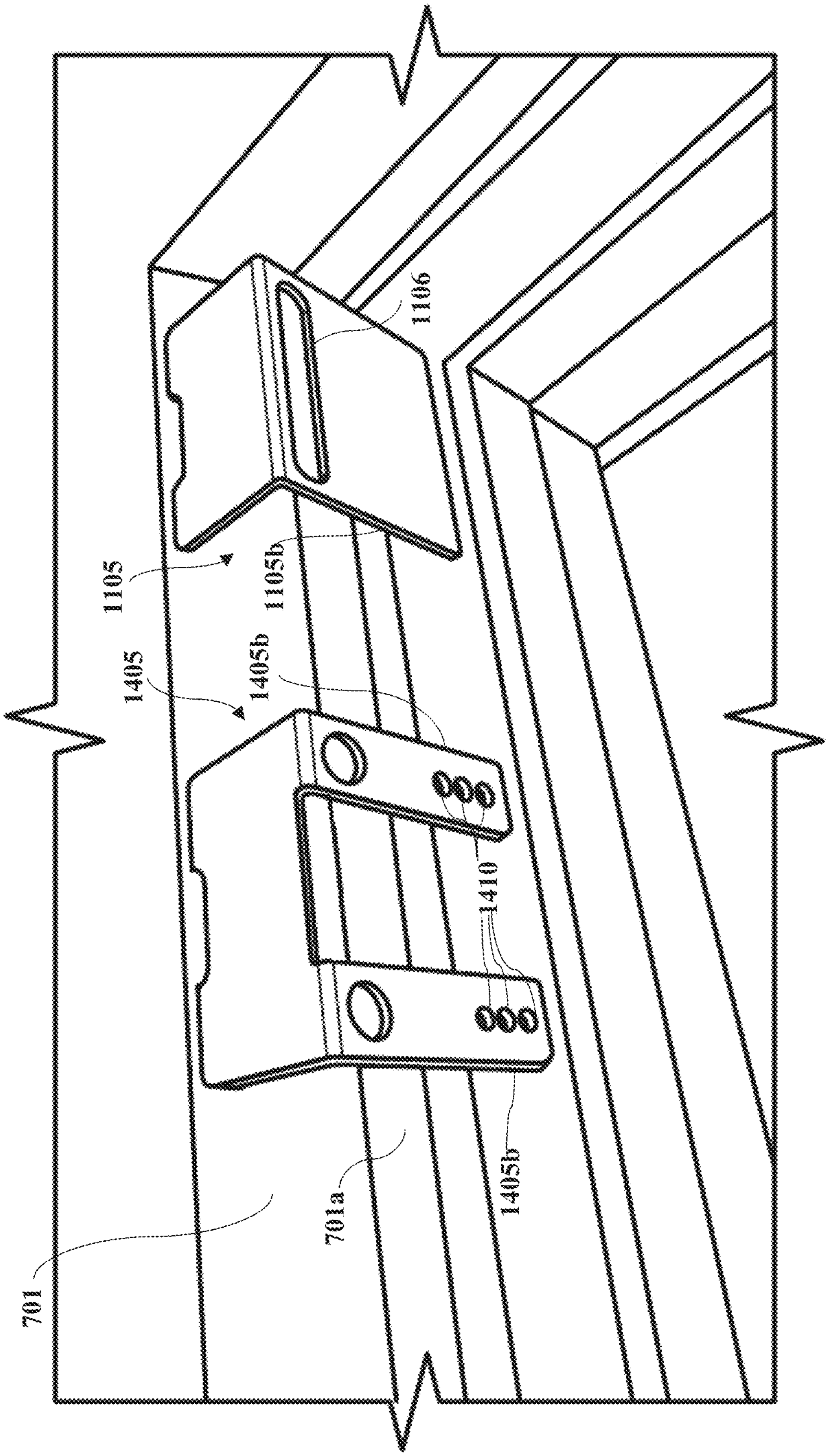
FIGS. 15A-15D illustrate bottom perspective views showing mounting of two embodiments of the AI-enabled activity detection and monitoring device shown in FIG. 11A and FIG. 14A to a door frame via respective mounting brackets.
Figure 15B:
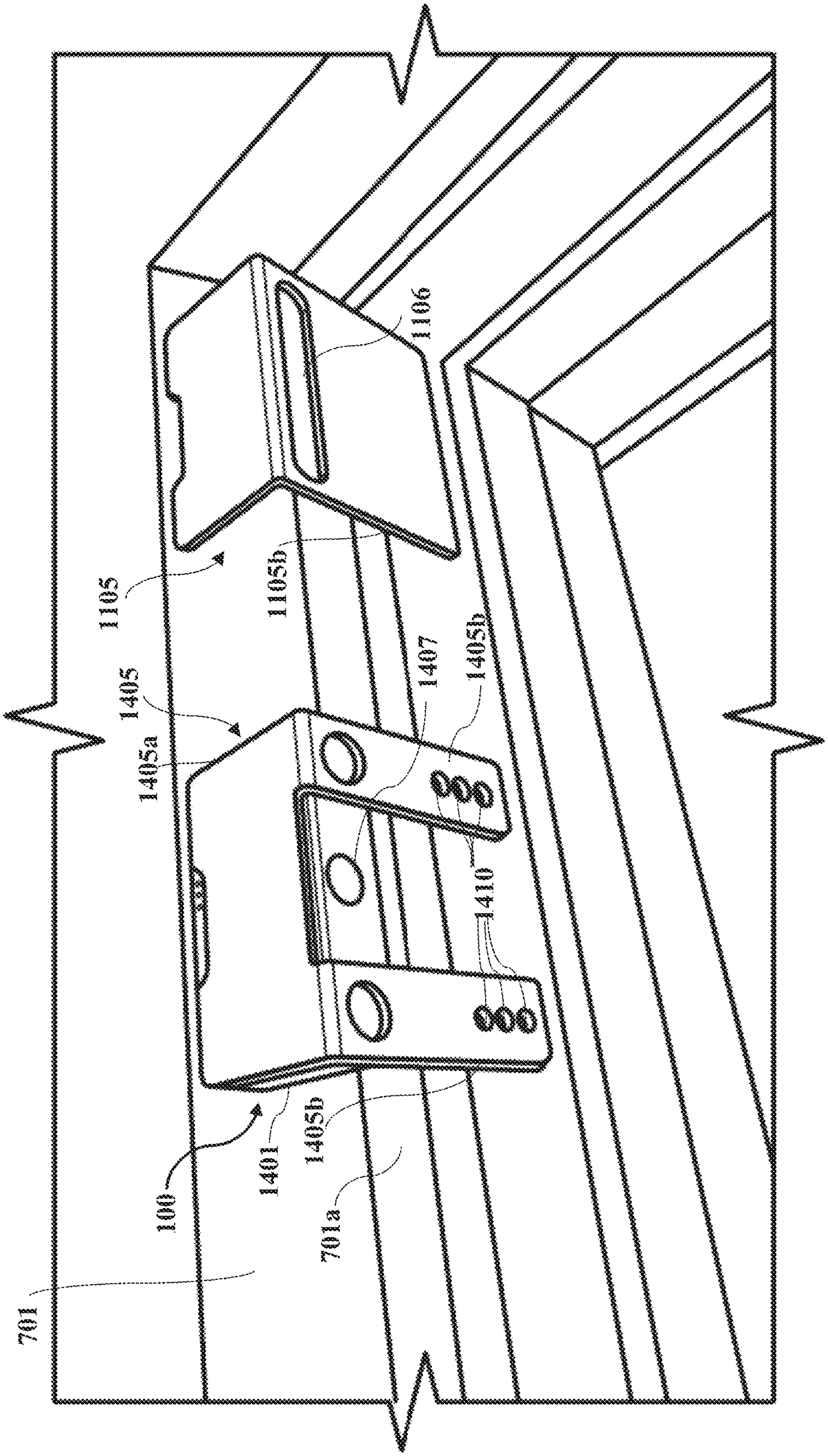
Figure 15C:
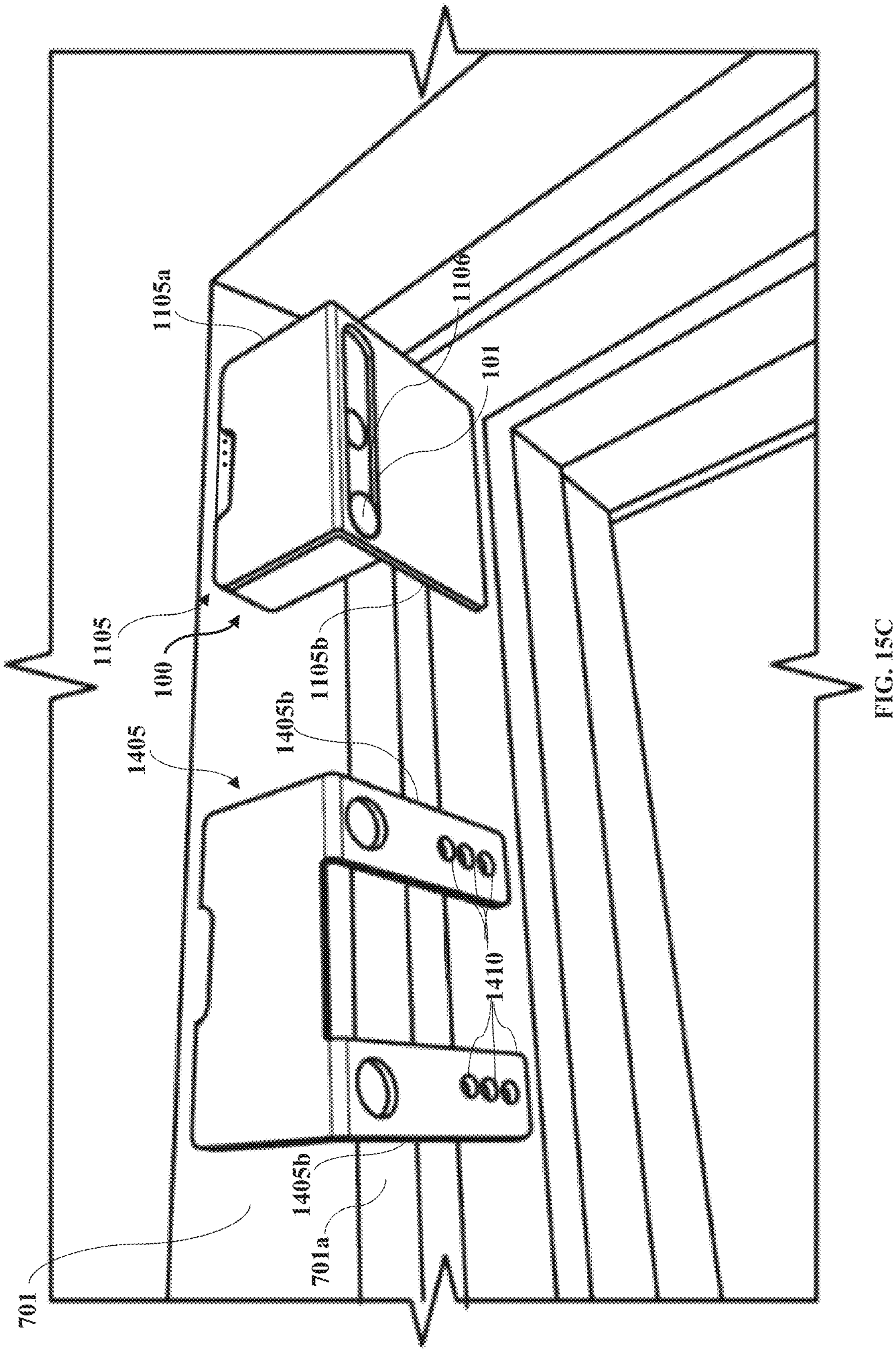

FIGS. 15A-15D illustrate bottom perspective views showing mounting of two embodiments of the AI-enabled activity detection and monitoring device 100 shown in FIG. 11A and FIG. 14A, to a door frame 701 via respective mounting brackets 1105 and 1405. As illustrated in FIG. 15A, a mounting bracket 1405 for mounting an embodiment of the AI-enabled device 100 with a locking assembly 1400 shown in FIGS. 14A-14C, and another mounting bracket 1105 for mounting another embodiment of the AI-enabled device 100 without the locking assembly 1400, are attached to a bottom side 701*a* of an upper section of the door frame 701. In an embodiment, the mounting bracket 1405 is attached to the bottom side 701*a* of the upper section of the door frame 701, for example, by drilling screws into the screw holes 1410 of the horizontal arms 1405*b* of the mounting bracket 1405. In an embodiment, the mounting bracket 1105 is magnetically attached to the bottom side 701*a* of the upper section of the door frame 701, for example, using strong magnets. In another embodiment, the mounting bracket 1105 is attached to the bottom side 701*a* of the upper section of the door frame 701, for example, using adhesive materials. FIG. 15B illustrates the embodiment of the AI-enabled device 100 with the locking assembly 1400 attached to the vertical side 1405*a* of the mounting bracket 1405, for example, using strong magnets. FIG. 15C illustrates the other embodiment of the AI-enabled device

100 attached to the vertical side 1105*a* of the mounting bracket 1105, for example, using strong magnets.

Figure 15D:
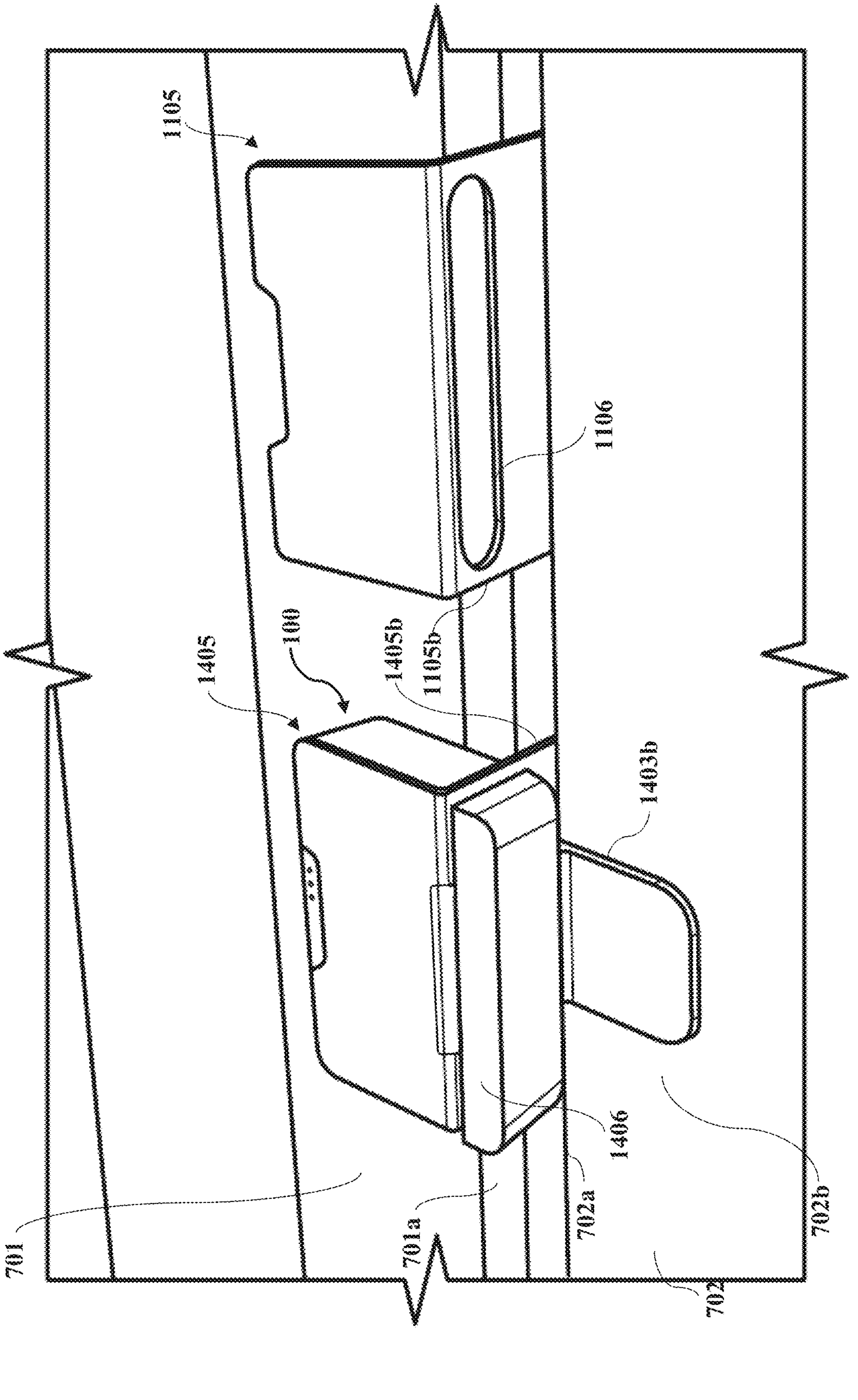

FIG. 15D illustrates the positioning of the mounting brackets 1105 and 1405 above the door 702, at the bottom side 701*a* of the upper section of the door frame 701. FIG. 15D also illustrates the attachment of the hook element 1403 shown in FIGS. 14A-14C, to the upper end 702*a* of the door 702. The upper end 702*a* of the door 702 securely fits in the space 1404 defined between the plates 1403*a* and 1403*b* of the hook element 1403 illustrated in FIGS. 14A-14C. One plate 1403*a* (not shown in FIG. 15D) of the hook element 1403 lies flush against one side (not shown) of the door 702, while the other plate 1403*b* of the hook element 1403 lies flush against the other side 702*b* of the door 702 as illustrated in FIG. 15D. When the door 702 is open, the linking member 1406 is detached from the AI-enabled device 100 that is mounted on the door frame 701 via the mounting bracket 1405. When the door 702 is closed, the linking member 1406 aligns with the AI-enabled device 100 mounted on the door frame 701, thereby allowing the door 702 to be locked using the locking assembly 1400. When the lock/unlock control unit (not shown) of the locking assembly 1400 receives a lock command signal from the sensor unit 101 or the AI analysis unit 110 of the AI-enabled device 100, the solenoid-driven or motor-driven bolt member 1408 moves in an outward direction, passes through the generally circular opening 1407 of the generally cuboidal housing 1401 of the AI-enabled device 100 illustrated in FIG. 15B, and plunges into the recess 1411 of the linking member 1406 illustrated in FIGS. 14B-14C, to lock the door 702. When the lock/unlock control unit of the locking assembly 1400 receives an unlock command signal from the sensor unit 101 or the AI analysis unit 110 of the AI-enabled device 100, the solenoid-driven or motor-driven bolt member 1408 moves in an inward direction out of the recess 1411 of the linking member 1406 and into the lock housing of the locking assembly 1400, to unlock the door 702.

Figure 16A:
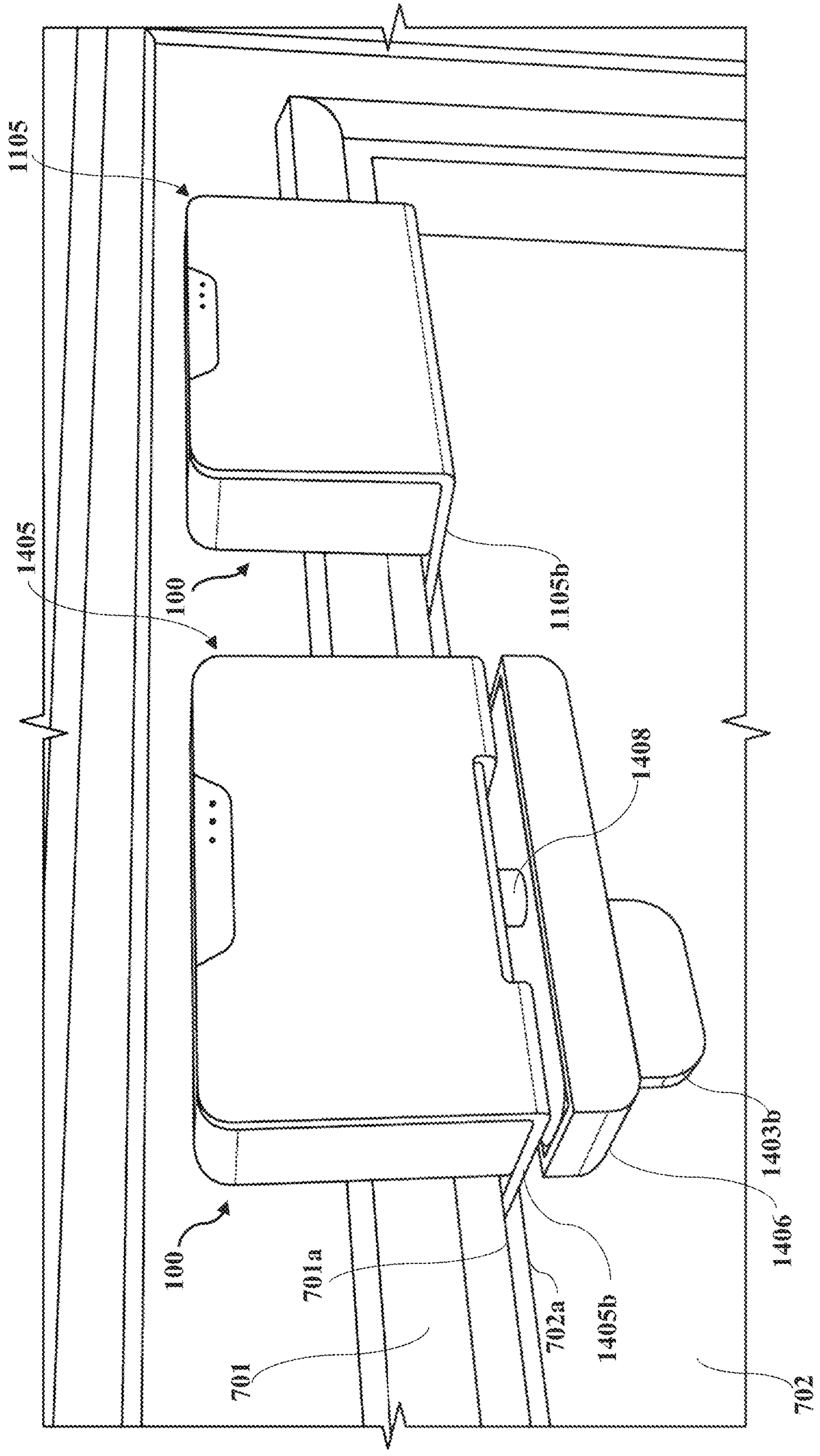
FIG. 16A illustrates a front perspective view showing two embodiments of the AI-enabled activity detection and monitoring device as shown in FIG. 11A and FIG. 14A, operably coupled to a door frame.
Figure 16B:
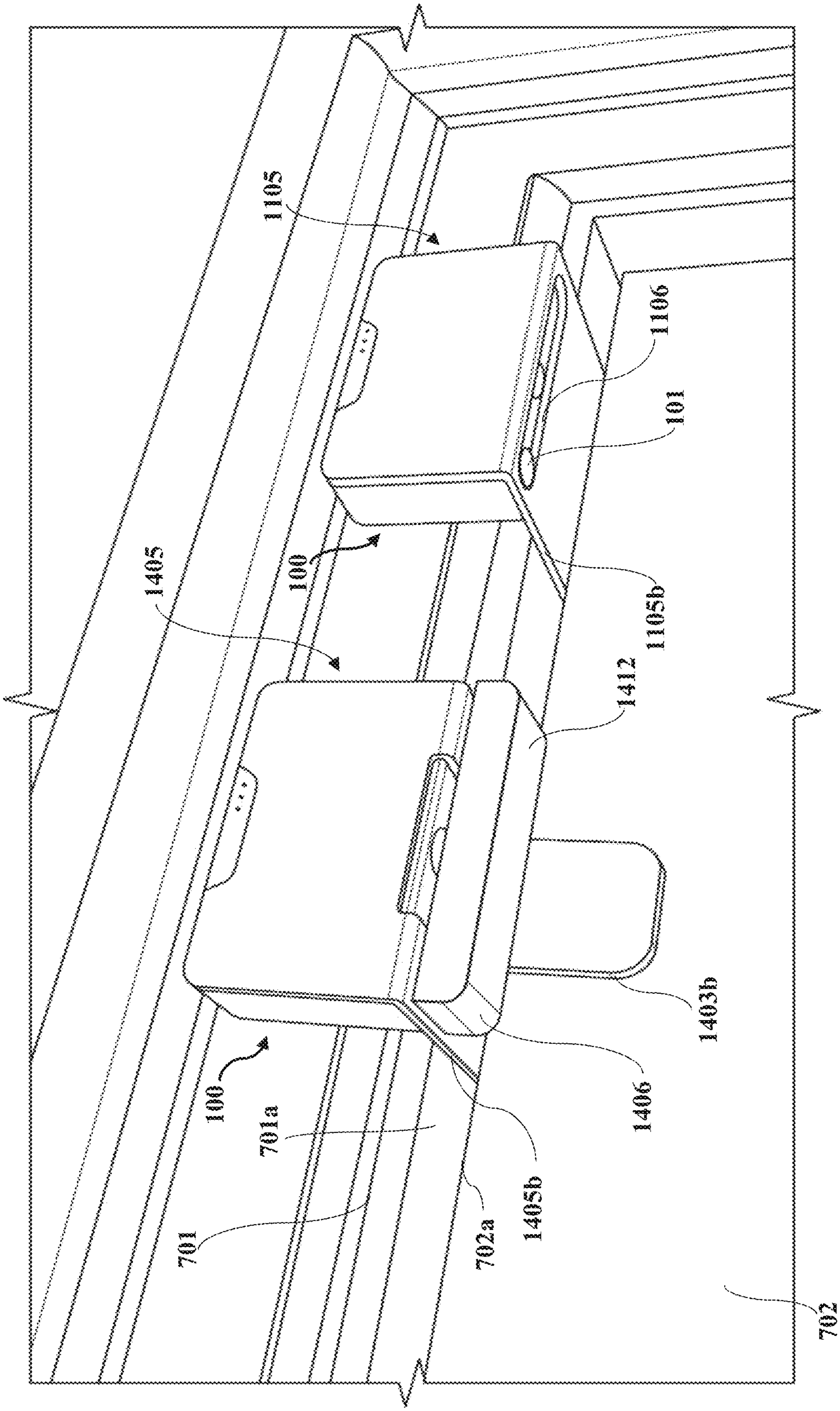
FIGS. 16B-16C illustrate bottom perspective views showing the two embodiments of the AI-enabled activity detection and monitoring device shown in FIG. 11A and FIG. 14A, operably coupled to a door frame.
Figure 16C:
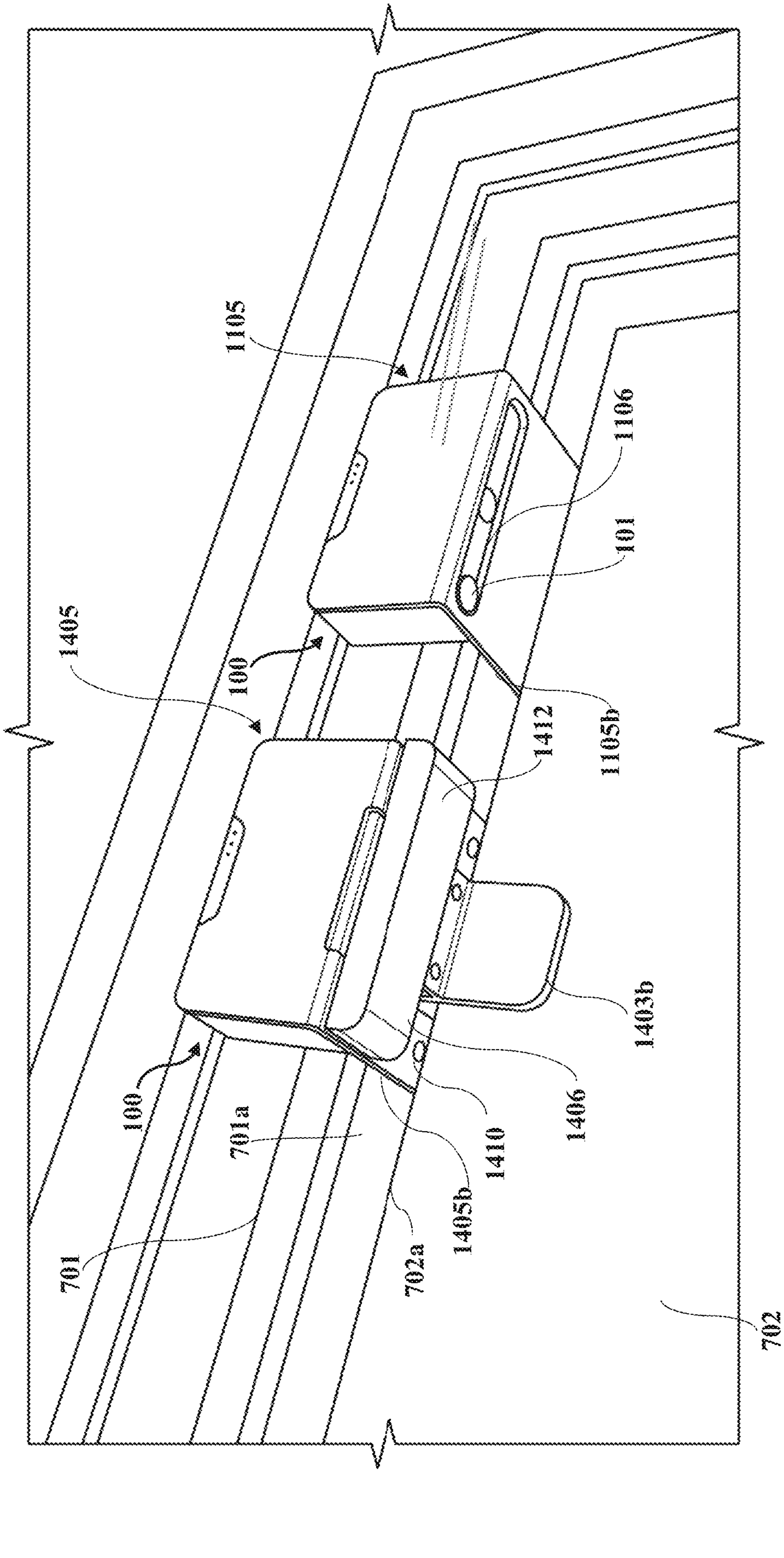

FIG. 16A and FIGS. 16B-16C illustrate a front perspective view and bottom perspective views, respectively, showing two embodiments of the AI-enabled activity detection and monitoring device 100 as shown in FIG. 11A and FIGS. 14A, operably coupled to a door frame 701. FIGS. 16A-16C show positioning of the mounting brackets 1105 and 1405 with the two embodiments of the AI-enabled device 100, between the upper end 702*a* of the door 702 and the bottom side 701*a* of the upper section of the door frame 701. That is, when the door 702 is closed, the horizontal arms 1405*b* of the mounting bracket 1405 and the horizontal side 1105*b* of the mounting bracket 1105 are disposed between the upper end 702*a* of the door 702 and the bottom side 701*a* of the upper section of the door frame 701. FIGS. 16B-16C show the sensor unit 101 of the AI-enabled device 100 passing through the elongate opening 1106 of the mounting bracket 1105. The strong magnets (not shown) that are positioned at the location 1412 of the linking member 1406 shown in FIGS. 16B-16C, magnetically attach the linking member 1406 to the mounting bracket 1405 when the door 702 is closed. FIG. 16A illustrates the bolt member 1408 of the locking assembly 1400 shown in FIGS. 14B-14C, engaged with the linking member 1406, thereby locking the door 702.

The AI-enabled device 100 comprising the sensor unit 101 and the AI analysis unit 110 illustrated in FIG. 1, provide an improvement in sensor and monitoring technology. In the AI-enabled device 100 disclosed herein, the design and the flow of interactions between the sensor unit 101, the AI analysis unit 110, and the action execution unit 124 illustrated in FIG. 1 are deliberate, designed, and directed. Every multi-modal sensor data element captured by the sensor unit 101, is configured by the AI analysis unit 110 to steer the multi-modal sensor data element towards a finite set of predictable outcomes. The AI analysis unit 110 implements one or more specific computer programs to direct each multi-modal sensor data element towards a set of end results. The interactions designed by the AI analysis unit 110 allow the AI analysis unit 110 to detect and identify objects in the operating field of the AI-enabled device 100; distinguish between the identified objects; distinguish non-related sensor data, determine and monitor activities of the identified objects; and generate and validate activity data from the determined activities; and from the validated activity data, through the use of other, separate and autonomous computer programs, execute one or more of multiple actions in real time based on the validation of the activity data. The multi-modal sensor data element capture and analysis are used as triggers to generate and validate activity data. To perform the above disclosed method steps requires multiple separate computer programs and subprograms, the execution of which cannot be performed by a person using a generic computer with a generic program.

The AI-enabled device 100 disclosed herein utilizes an array of sensors, for example, sound sensors, image sensors, radio wave sensors, etc., for detecting and monitoring objects and their activities within an operating field. By combining and processing multi-modal sensor data elements, for example, soundbites, images, radio waves, etc., captured by the array of sensors, the AI-enabled device 100 pinpoints whereabouts and/or trajectories of moving objects within the operating field. The AI-enabled device 100 also validates the objects within a targeted monitored area in the operating field, thereby improving detection rates over conventional methods. If a field of view of any one or more sensors in the array of sensors of the sensor unit 101 is obstructed, for example, by a wall, another one or more of the sensors in the array of sensors are configured to operate and extend the detection capability of the AI analysis unit 110 illustrated in FIG. 1. The AI-enabled device 100 disclosed herein, powered by the AI analyzers 111, 112, and 113 illustrated in FIG. 1, and driven by multiple AI techniques, substantially reduces manual efforts and time consumed by users in detecting and monitoring objects and their activities in an operating field of the AI-enabled device 100, thereby allowing users to be quickly notified and to remotely monitor an operating field. Moreover, the AI-enabled device 100 eliminates unwanted data and human error. The AI-enabled device 100 reduces errors and improves the chances of reaching accuracy with a greater degree of precision. The evolving AI techniques implemented herein based on repeated and continuous learning, training, and retraining of AI models through dynamic real-time data are far beyond what a human user can accomplish in a reasonable and practical manner.

The AI-enabled device 100 is useful in situations and applications such as surveillance, security, and tracking applications that require monitoring of objects, for example, humans such as babies, children, patients, elderly persons, etc., animals such as pets, vehicles, pedestrians, a stovetop, etc., within an area and execution of actions based on activities of the objects. For example, the AI-enabled device 100 allows a caregiver to know where an infant, a pet, or an elderly person is at all times, whether they had a fall or are injured, whether they entered, exited, or passed by a door or any threshold, whether the door is unlocked or locked, etc. The AI-enabled device 100 comprising the sensor unit 101 and the AI analysis unit 110 operates in an integrated manner to perform the above disclosed functionalities using AI techniques that result in high object detection accuracy and low false detection rates. The AI-enabled device 100 distinguishes between objects having similar characteristics. The AI-enabled device 100 integrates and maintains a series of different multi-modal sensors, for example, sound, image, thermal, video, radio wave and other radiation sensors in a single sensor unit 101, which is operably coupled to the AI analysis unit 110 that analyzes the captured sensor data while distinguishing non-related sensor data, and generates validated and reliable object detection results, while precluding false alarms. Moreover, when a real detection is made, the AI-enabled device 100 directly transmits notifications to user devices without delay, by precluding an intermediate communication from an edge device to a central server and then from the central server to a user device. The real-time notifications are useful in applications that require real-time responses and actions. Furthermore, the AI-enabled device 100 maintains privacy of objects by not transmitting image and video data of the objects captured by the sensor unit 101. Furthermore, the AI-enabled device 100 lowers power consumption by maintaining the majority of the AI-enabled device 100 in the sleep mode until awoken by the wake-up module 114 illustrated in FIG. 1.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the methods disclosed herein. In an embodiment, the computer programs that implement the methods and algorithms disclosed herein are stored and transmitted using a variety of media, for example, computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented as programmed elements, or non-programmed elements, or any suitable combination thereof.

Where databases are described such as the database 117 with one or more AI data libraries, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally in a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The foregoing examples and illustrative implementations of various embodiments have been provided merely for explanation and are in no way to be construed as limiting the embodiments disclosed herein. Dimensions of various parts of the device disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. An artificial intelligence-enabled device for detecting and monitoring objects and their activities within an operating field, the artificial intelligence-enabled device comprising:

a sensor unit comprising an array of sensors configured to capture multi-modal sensor data elements, the multi-modal sensor data elements comprising sound data, image data, and environmental data associated with the objects along with timing data in the operating field of the artificial intelligence-enabled device, wherein the environmental data comprises thermal data, radio wave data, and other radiation data;

an artificial intelligence analysis unit operably coupled to the sensor unit, the artificial intelligence analysis unit comprising:

at least one processor;

a memory unit operably and communicatively coupled to the at least one processor and configured to store computer program instructions executable by the at least one processor;

one or more databases configured to store an artificial intelligence data library comprising a plurality of select datasets for facilitating an artificial intelligence-based analysis of the multi-modal sensor data elements;

one or more of a plurality of artificial intelligence analyzers built into the artificial intelligence analysis unit, and in operable communication with the artificial intelligence data library, configured to receive and locally analyze each and an aggregate of the multi-modal sensor data elements captured by the sensor unit, wherein, based on the analysis of the each and the aggregate of the multi-modal sensor data elements, the one or more of the artificial intelligence analyzers define computer program instructions, which when executed by the at least one processor, cause the at least one processor to:

detect and identify the objects in the operating field of the artificial intelligence-enabled device;

distinguish between the identified objects;

distinguish non-related sensor data;

determine and monitor activities of the identified objects; and generate and validate activity data from the determined activities; and a communication module configured to communicate with an electronic device via a network; and an action execution unit operably coupled to the artificial intelligence analysis unit, the action execution unit configured to execute one or more of a plurality of actions in real time based on the validation of the activity data.

2. The artificial intelligence-enabled device of claim 1, wherein the array of sensors comprises sound sensors with an array of microphones, image sensors, motion sensors, and environmental sensors, and wherein the plurality of artificial intelligence analyzers comprises:

a sound analyzer configured to receive and analyze the sound data captured by one or more of the microphones for identifying a type of a sound and a location of a source of the sound and excluding non-related sound data coming from outside and inside the operating field of the artificial intelligence-enabled device, wherein the sound analyzer is further configured to communicate with the image sensors to validate the analyzed sound data using the image data along with the timing data;

an image analyzer configured to receive and analyze the image data comprising still image data, moving image data, and thermal image data captured by one or more of the image sensors, and exclude non-related image data; and an environment analyzer configured to receive and analyze the environmental data comprising the thermal data, the radio wave data, and the other radiation data captured by one or more of the environmental sensors, and exclude non-related environmental data coming from outside the operating field of the artificial intelligence-enabled device.

3. The artificial intelligence-enabled device of claim 2, further comprising a full high-definition imager operably coupled to the artificial intelligence analysis unit and configured to capture one or more high-definition images of the detected objects, in communication with one or more of the image sensors of the sensor unit, for improved analysis of the image data by the image analyzer.

4. The artificial intelligence-enabled device of claim 1, wherein the artificial intelligence analysis unit further comprises a wake-up module in operable communication with a power management module built into the artificial intelligence analysis unit, wherein the wake-up module is configured to wake up the artificial intelligence analysis unit from a sleep mode on detection of incoming objects by the sensor unit, and wherein the sensor unit is configured to operate in a substantially low power mode, and wherein the artificial intelligence analysis unit is maintained in the sleep mode until awoken by the wake-up module.

5. The artificial intelligence-enabled device of claim 1, wherein the activity data comprises a type of a sound, a location of a source of the sound, type of each of the objects, location of the each of the objects, and trajectory and speed of movement and travel of the each of the objects.

6. The artificial intelligence-enabled device of claim 1, wherein the plurality of actions comprises:

controlling a lock mechanism of an external member to which the artificial intelligence-enabled device is attached, to change a state of the external member;

transmitting a notification to the electronic device via the network;

activating one or more light indicators operably coupled to the artificial intelligence-enabled device; and sounding an alarm operably coupled to the artificial intelligence-enabled device.

7. The artificial intelligence-enabled device of claim 1, wherein the one or more of the artificial intelligence analyzers define additional computer program instructions, which when executed by the at least one processor, cause the at least one processor to preclude the execution of the one or more of the plurality of actions and return the artificial intelligence analysis unit to a sleep mode if the activity data is invalid.

8. The artificial intelligence-enabled device of claim 1, wherein the artificial intelligence analysis unit further comprises:

one or more input ports; and a plurality of output ports operably connected to a plurality of output devices for the execution of the one or more of the plurality of actions based on the validation of the activity data, wherein the artificial intelligence-enabled device is configured to be one of programmatically controlled and remotely controlled to execute the one or more of the plurality of actions.

9. The artificial intelligence-enabled device of claim 8, wherein the plurality of output devices comprises:

a speaker configured to emit an audio output;

a control lock mechanism configured to lock and unlock an external member; and one or more light indicators configured to emit light indications.

10. The artificial intelligence-enabled device of claim 1, wherein the communication module of the artificial intelligence analysis unit is operably coupled to an antenna configured to communicate the activity data to the electronic device via the network, and wherein the electronic device is one of a client device, a server, a networking device, a network of servers, and a cloud server.

11. The artificial intelligence-enabled device of claim 1, wherein the communication module of the artificial intelligence analysis unit is configured to selectively communicate the activity data to a mobile application deployed on the electronic device of a predetermined, authorized user via the network to maintain privacy, wherein the mobile application is configured to compile the activity data along with physiological data of the identified objects and generate a timed data chart.

12. The artificial intelligence-enabled device of claim 1 configured to be positioned one of on and proximal to a barrier for detecting, recognizing, monitoring, and reporting a state of the barrier and the objects entering, exiting, and passing by the barrier.

13. The artificial intelligence-enabled device of claim 12 operably coupled to a lock mechanism of the barrier and configured to activate and deactivate the lock mechanism for locking and unlocking the barrier, respectively, based on the state of the barrier.

14. An artificial intelligence-enabled device operably coupled to a locking assembly positioned one of on and proximal to a barrier, for detecting and monitoring a state of the barrier and objects and their activities within an operating field of the artificial intelligence-enabled device, the artificial intelligence-enabled device comprising:

- a sensor unit comprising an array of sensors configured to capture multi-modal sensor data elements, the multi-modal sensor data elements comprising sound data, image data, and environmental data associated with the objects along with timing data in the operating field of the artificial intelligence-enabled device, wherein the environmental data comprises thermal data, radio wave data, and other radiation data; and
- an artificial intelligence analysis unit operably coupled to the sensor unit, the artificial intelligence analysis unit comprising:
  - at least one processor;
  - a memory unit operably and communicatively coupled to the at least one processor and configured to store computer program instructions executable by the at least one processor;
  - one or more databases configured to store an artificial intelligence data library comprising a plurality of select datasets for facilitating an artificial intelligence-based analysis of the multi-modal sensor data elements; and
  - one or more of a plurality of artificial intelligence analyzers built into the artificial intelligence analysis unit, and in operable communication with the artificial intelligence data library, configured to receive and locally analyze each and an aggregate of the multi-modal sensor data elements captured by the sensor unit, wherein, based on the analysis of the each and the aggregate of the multi-modal sensor data elements, the one or more of the artificial intelligence analyzers define computer program instructions, which when executed by the at least one processor, cause the at least one processor to:
    - detect and identify objects entering, exiting, and passing by the barrier, in the operating field of the artificial intelligence-enabled device;
    - distinguish between the identified objects;
    - distinguish non-related sensor data;
    - determine and monitor the state of the barrier and activities of the identified objects;
    - validate the determined state of the barrier and the determined activities; and
    - on successful validation, trigger a command to activate and deactivate a lock mechanism of the locking assembly for locking and unlocking the barrier, respectively, based on the state of the barrier.

15. The artificial intelligence-enabled device of claim 14, wherein the array of sensors comprises sound sensors with an array of microphones, image sensors, motion sensors, and environmental sensors, and wherein the plurality of artificial intelligence analyzers comprises:

- a sound analyzer configured to receive and analyze the sound data captured by one or more of the microphones for identifying a type of a sound and a location of a source of the sound and excluding non-related sound data coming from inside and outside the operating field of the artificial intelligence-enabled device, wherein the sound analyzer is further configured to communicate with the image sensors to validate the analyzed sound data using the image data along with the timing data;
- an image analyzer configured to receive and analyze the image data comprising still image data, moving image data, and thermal image data captured by one or more of the image sensors, and exclude non-related image data; and
- an environment analyzer configured to receive and analyze the environmental data comprising the thermal data, the radio wave data, and the other radiation data captured by one or more of the environmental sensors, and exclude non-related environmental data coming from outside the operating field of the artificial intelligence-enabled device.

16. The artificial intelligence-enabled device of claim 15, further comprising a full high-definition imager operably coupled to the artificial intelligence analysis unit and configured to capture one or more high-definition images of the detected objects, in communication with one or more of the image sensors of the sensor unit, for improved analysis of the image data by the image analyzer.

17. The artificial intelligence-enabled device of claim 14, wherein the artificial intelligence analysis unit further comprises a wake-up module in operable communication with a power management module built into the artificial intelligence analysis unit, wherein the wake-up module is configured to wake up the artificial intelligence analysis unit from a sleep mode on detection of incoming objects by the sensor unit, and wherein the sensor unit is configured to operate in a substantially low power mode, and wherein the artificial intelligence analysis unit is maintained in the sleep mode until awoken by the wake-up module.

18. The artificial intelligence-enabled device of claim 14, wherein the one or more of the artificial intelligence analyzers define additional computer program instructions, which when executed by the at least one processor, cause the at least one processor to execute one or more of a plurality of actions in real time based on the validation of the determined activities, wherein the plurality of actions comprises:

- transmitting a notification to an electronic device via a network;
- activating one or more light indicators operably coupled to the artificial intelligence-enabled device; and
- sounding an alarm operably coupled to the artificial intelligence-enabled device.

19. The artificial intelligence-enabled device of claim 14, wherein the one or more of the artificial intelligence analyzers define additional computer program instructions, which when executed by the at least one processor, cause the at least one processor to preclude the execution of the one or more of the plurality of actions and return the artificial intelligence analysis unit to a sleep mode, on unsuccessful validation of the determined activities.

20. The artificial intelligence-enabled device of claim 14, further comprising a communication module configured to communicate with an electronic device via a network, wherein the communication module is operably coupled to an antenna configured to selectively communicate activity data generated from the determined activities to the electronic device via the network to maintain privacy, and wherein the electronic device is one of a client device, a server, a networking device, a network of servers, and a cloud server.

* * * * *